US010838699B2

(12) United States Patent
Dayanandan

(10) Patent No.: US 10,838,699 B2
(45) Date of Patent: Nov. 17, 2020

(54) GENERATING DATA MAPPINGS FOR USER INTERFACE SCREENS AND SCREEN COMPONENTS FOR AN APPLICATION

(71) Applicant: Oracle International Corporation, Redwood Shores, CA (US)

(72) Inventor: Kailas Dayanandan, Thiruvananthapuram (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/801,890

(22) Filed: Nov. 2, 2017

(65) Prior Publication Data
US 2018/0203674 A1 Jul. 19, 2018

Related U.S. Application Data

(63) Continuation-in-part of application No. 15/613,122, filed on Jun. 2, 2017, now Pat. No. 10,733,754.
(Continued)

(30) Foreign Application Priority Data

Jun. 28, 2017 (IN) .............................. 201741022546

(51) Int. Cl.
*G06F 8/38* (2018.01)
*G06F 8/10* (2018.01)
(Continued)

(52) U.S. Cl.
CPC ................. *G06F 8/38* (2013.01); *G06F 8/10* (2013.01); *G06F 8/20* (2013.01); *G06F 8/35* (2013.01); *G06F 9/451* (2018.02); *G06F 3/048* (2013.01)

(58) Field of Classification Search
CPC ... G06F 8/38; G06F 9/451; G06F 8/10; G06F 8/35; G06F 8/20; G06F 3/048
See application file for complete search history.

(56) References Cited

U.S. PATENT DOCUMENTS 5,386,508 A 1/1995 Itonori et al.
5,404,441 A 4/1995 Satoyama
(Continued)

FOREIGN PATENT DOCUMENTS

CN 101030138 A 9/2007
CN 101464799 A 6/2009
(Continued)

OTHER PUBLICATIONS

Tsai et al., Generating user interface for mobile phone devices using template-based approach and generic software framework, Journal of Information Science and Engineering vol. 23, No. 4, Jul. 2007, pp. 1189-1211.
(Continued)

*Primary Examiner* — Daniel W Parcher
(74) *Attorney, Agent, or Firm* — Kilpatrick Townsend & Stockton LLP

(57) ABSTRACT

Techniques are disclosed for automating application development from requirements information for the application. The requirements information may comprise mockup images of GUI screens for the application, text information, and other information. A model is generated based upon the requirements information. The generated model can then subsequently be used to generate one or more implementations of the application. Generation of the model includes processing the requirements information to identify one or more data objects to be mapped or associated with one or more GUI screens of the application, and further determining, for a particular data object mapped to a particular GUI screen, mappings between one or more components of the
(Continued)

particular screen to one or more components of the particular data object. The model stores information about the look-and-feel of the GUI screens and about mappings between data objects to screens and screen components to data object components.

19 Claims, 29 Drawing Sheets

Related U.S. Application Data

(60) Provisional application No. 62/447,834, filed on Jan. 18, 2017.

(51) Int. Cl.
   *G06F 8/35* (2018.01)
   *G06F 8/20* (2018.01)
   *G06F 9/451* (2018.01)
   *G06F 3/048* (2013.01)

(56) References Cited

U.S. PATENT DOCUMENTS

| | | | |
|---|---|---|---|
| 5,973,696 | A | 10/1999 | Agranat et al. |
| 6,434,598 | B1 | 8/2002 | Gish |
| 6,496,202 | B1 | 12/2002 | Prinzing |
| 7,100,118 | B1 | 8/2006 | Klask |
| 7,146,347 | B1 | 12/2006 | Vazquez et al. |
| 7,334,216 | B2 | 2/2008 | Molina-moreno et al. |
| 7,392,162 | B1 | 6/2008 | Srinivasan et al. |
| 7,620,885 | B2 | 11/2009 | Moulckers et al. |
| 7,702,417 | B2 | 4/2010 | Ravish et al. |
| 7,861,217 | B2 | 12/2010 | Ciolfi |
| 8,006,224 | B2 | 8/2011 | Bateman et al. |
| 8,015,541 | B1 | 9/2011 | Srinivasan et al. |
| 8,306,255 | B1 | 11/2012 | Degnan |
| 8,484,626 | B2 | 7/2013 | Nagulu et al. |
| 8,762,873 | B2 | 6/2014 | Pnueli et al. |
| 8,943,468 | B2 | 1/2015 | Balasubramanian |
| 9,135,151 | B2 | 9/2015 | Betak et al. |
| 9,170,778 | B2 | 10/2015 | Ivmark et al. |
| 9,195,572 | B2 | 11/2015 | Rossi |
| 9,261,950 | B2 | 2/2016 | Gu et al. |
| 9,323,418 | B2 | 4/2016 | Divita et al. |
| 9,338,063 | B2 | 5/2016 | Ligman et al. |
| 9,430,141 | B1 | 8/2016 | Lu et al. |
| 9,459,780 | B1 | 10/2016 | Smith et al. |
| 9,619,209 | B1 | 4/2017 | Allen et al. |
| 9,665,350 | B1 | 5/2017 | Kalmar et al. |
| 10,255,085 | B1 | 4/2019 | Valsaraj et al. |
| 10,489,126 | B2 | 11/2019 | Kumar et al. |
| 2002/0169658 | A1 | 11/2002 | Adler |
| 2006/0106798 | A1 | 5/2006 | Wen et al. |
| 2010/0115434 | A1 | 5/2010 | Yagi et al. |
| 2010/0131916 | A1 | 5/2010 | Prigge |
| 2011/0035345 | A1* | 2/2011 | Duan .............. G06F 17/30873 706/12 |
| 2011/0047488 | A1* | 2/2011 | Butin .............. G06F 3/04842 715/762 |
| 2011/0099499 | A1* | 4/2011 | Pnueli .............. G06F 8/38 715/771 |
| 2011/0214107 | A1 | 9/2011 | Barmeir et al. |
| 2012/0166978 | A1* | 6/2012 | Singh .............. G06F 8/38 715/762 |
| 2012/0230546 | A1 | 9/2012 | Hua et al. |
| 2013/0254686 | A1 | 9/2013 | Sun |
| 2014/0006962 | A1 | 1/2014 | Gu et al. |
| 2014/0098209 | A1* | 4/2014 | Neff .............. A61B 5/0033 348/77 |
| 2014/0282217 | A1* | 9/2014 | Musa .............. G06F 3/0481 715/781 |
| 2015/0020006 | A1 | 1/2015 | Kotzer |
| 2015/0046783 | A1 | 2/2015 | O'Donoghue et al. |
| 2016/0034441 | A1* | 2/2016 | Nguyen .............. G06F 17/2765 715/234 |
| 2016/0147434 | A1 | 5/2016 | Lee et al. |
| 2016/0163052 | A1 | 6/2016 | Kim |
| 2016/0239186 | A1 | 8/2016 | Skripkin |
| 2016/0353030 | A1* | 12/2016 | Gao .............. H04N 5/23293 |
| 2017/0060368 | A1* | 3/2017 | Kochura .............. G06F 9/451 |
| 2017/0277518 | A1 | 9/2017 | Krishnan et al. |
| 2018/0203571 | A1 | 7/2018 | Dayanandan |
| 2018/0349730 | A1 | 12/2018 | Dixon et al. |
| 2019/0371008 | A1 | 12/2019 | Peterson |

FOREIGN PATENT DOCUMENTS

| | | |
|---|---|---|
| CN | 107273117 A | 10/2017 |
| CN | 107454954 A | 12/2017 |
| CN | 107516005 A | 12/2017 |
| WO | 2005038648 A1 | 4/2005 |
| WO | 2016162678 A1 | 10/2016 |
| WO | 2012162686 A1 | 11/2019 |

OTHER PUBLICATIONS

Da Cruz et al., Automatic Generation of User Interface Models and Prototypes from Domain and Use Case Models, User Interfaces, available online at https://pdfs.semanticscholar.org/145d/356469c4cbbe76377c7b12a18715c018e5f7.pdf, Source: User Interfaces book edited by Rita Matrai, May 2010, Intech, Croatia, 26 pages.

Programming Graphical User Interface (GUI), GUI Programming—Java Programming Tutorial, available online at http://www3.ntu.edu.sg/home/ehchua/programming/java/j4a_gui.html (retrieved Mar. 22, 2016), Mar. 2014 (last modified), 47 pages.

U.S. Appl. No. 15/996,311, filed Jun. 1, 2018, 102 pages.

GitHub—tonybeltramelli/pix2code: pix2code: Generating Code from a Graphical User Interface Screenshot, https://github.com/tonybeltramelli/pix2code, (retrieved Nov. 30, 2017), pp. 1-4.

Miller, This Startup Uses Machine Learning to Turn UI Designs Into Raw Code, https://www.fastcodesign.com/90127911/this-startup-uses-machine-learning-to-turn-ui-designs-into-raw-code, Jun. 2, 2017, (retrieved Nov. 30, 2017), 3 pages.

Kobielus, Machine Learning Will Do Auto-Programming's Heavy Lifting, Dataversity, data governance Winter Conference, Dec. 4-8, 2017, http://www.dataversity.net/machine-learning-will-auto-programmings-heavy-lifting/, Jun. 26, 2017, 2 pages.

No More Coding, Aricent, Development Agility, The Augmented Programmer, https://www.aricent.com/articles/no-more-coding, Jun. 30, 2017, 3 pages.

Mou et al., On End-to-End Program Generation from User Intention by Deep Neural Networks, Software Institute, School of EECS, Peking University, Beijing 100871, P.R. China, Oct. 25, 2015, 4 page.

Das et al., Contextual Code Completion Using Machine Learning, 2015, 6 pages.

UX Wireframing & Prototyping, Sendinthefox, Mobile Experience Designer, retrieved from http://www.sendinthefox.com/mobile-ux-wireframes-prototyping/ on Feb. 24, 2018, Copyright 2018, 10 pages.

Larsen, From Sketches to Functional Prototypes: Extending WireframeSketcher with Prototype Generation, Master of Science in Informatics, Norwegian University of Science and Technology, Department of Computer and Information Science, Dec. 2014 (submission date), 115 pages.

How to Create a Wireframe for Desktop Application, Visual Paradigm Community Circle, retrieved from https://circle.visual-paradigm.com/docs/user-experience-design/wireframe/how-to-create-a-wireframe-for-desktop-application/ on Feb. 24, 2018, Copyright 2018, Updated on Dec. 22, 2017, 42 pages.

SASH(s) Visual Designer, Wireframes I Use, A Reference for User Experience and Interaction Design Beginners, retrieved from http://www.sashsingh.com/wireframes-i-use/ on Feb. 24, 2018, 13 pages.

(56) References Cited

OTHER PUBLICATIONS

Buttons—UI Controls, iOS Human Interface Guidelines, available online at https://developer.apple.com/ios/human-interface-guidelines/ui-controls/buttons/, (retrieved Jun. 1, 2017), 2017, 2 pages.
Common Interfaces of Feature Detectors, OpenCV 2.4.13.2 documentation, 2011-2014, (retrieved Jun. 1, 2017), 11 pages.
iOS Human Interface Guidelines: iOS App Anatomy, developer.apple.com, Apple Inc., Copyright 2014, Updated Oct. 20, 2014, 2 pages.
iOS Human Interface Guidelines, iOS Design Themes, Oct. 20, 2017, 3 pages.
How to create an app for free: easy app maker Appy Pie best app builder, available online at http://www.appypie.com/, 2017, 10 pages.
Master Detail, Oracle Alta UI, available online at http://www.oracle.com/webfolder/ux/mobile/pattern/masterdetail.html, 2017, 15 pages.
Mobile app for ios, SAP Business One Version 1.11.x, Q1 2017, 17 pages.
Mobile-Persistence, Github Inc., available online at https://github.com/oracle/mobile-persistence, 2017, 1 page.
Navigation, Patterns—Material design guidelines, available online at https://material.io/guidelines/patterns/navigation.html, (retrieved Jan. 19, 2018), 30 pages.
Code Conventions for the Java Programming Language: 9. Naming Conventions, Oracle Technology Network, Copyright 1999, Sun Microsystems, Inc., available online at http://www.oracle.com/technetwork/java/index.html, (retrieved Oct. 20, 2017), 2 pages.
Java Code Conventions, Sun Microsystems, Inc., Sep. 12, 1997, Copyright 1997, 24 pages.
Ramer—Douglas—Peucker algorithm, Wikipedia, available online at https://en.wikipedia.org/wiki/Ramer%E2%80%93Douglas%E2%80%93Peucker_algorithm, 2017, 4 pages.
Sales Cloud (@salescloud), Twitter, available online at https://twitter.com/salescloud, 2017, 10 pages.
Canny , A Computational Approach to Edge Detection, IEEE Transactions on Pattern Analysis and Machine Intelligence, vol. PAMI-8, No. 6, 1986, 20 pages.
Del Corro et al., ClausIE: Clause-Based Open Information Extraction, International World Wide Web Conference Committee (IW3C2), Jan. 13, 2013, 11 pages.
Enslen et al., Mining Source Code to Automatically Split Identifiers for Software Analysis, International Working Conference on Mining Software Repositories, 2009, 10 pages.
Fader et al., Identifying Relations for Open Information Extraction, proceedings of the 2011 Conference on Empirical methods in Natural Language Processing, Jul. 27-31, 2011, pp. 1535-1545.
Forssen, Maximally stable colour regions for recognition and matching, IEEE Conference on Computer Vision and Pattern Recognition, Jun. 17-22, 2007, 8 pages.
Khambati et al., Model-driven Development of Mobile Personal Health Care Applications, 23rd IEEE/ACM International Conference on Automated Software Engineering, Sep. 15-19, 2008, 4 pages.
Otsu , A Threshold Selection Method from Gray-Level Histograms, IEEE Transactions on Systems, Man, and Cybernetics, vol. 9, Issue 1, Jan. 1979, pp. 62-66.
Pilehvar et al., Align, Disambiguate and Walk: A Unified Approach for Measuring Semantic Similarity, Proceedings of the 51st Annual Meeting of the Association for Computational Linguistics, Aug. 4-9, 2013, pp. 1341-1351.
The 6 Principles of Design, Visually, Inc., http://visually/6-principles-design, Oct. 23, 2017, pp. 1-8.
Lu et al., Discovering Interacting Artifacts from ERP Systems (Extended Version) 2015, 62 pages.
Barnett et al., Bootstrapping Mobile App Development, In Proceedings of the 37th IEEE International Conference on Software Engineering—vol. 2 (ICSE '15), vol. 2 IEEE Press, Piscataway, NJ, USA, 2015, pp. 657-660.
Building a complex Universal Windows Platform (UWP) app; UWP app developer, Microsoft Docs, Feb. 8, 2017, pp. 1-17 (last 4 pages blank).
Ling, Decision Marking Transition for MauKerja.my, Dribbble, https://dribbble.com/shots/2066972-Decision-Making-Transition-for-MauKerja-my, Oct. 23, 2017, Copyright-2017, pp. 1-5.
Response web design, https://in.pinterest.com/explore/responsive-web-design/, Oct. 23, 2017, 8 pages.
Bassett, Oracle® Cloud, Using Mobile Application Accelerator, 17.3.5, E88951-01, Sep. 2017, 164 pages.
Savva et al., ReVision: Automated Classification, Analysis and Redesign of Chart Images, In Proceedings of the 24th annual ACM symposium on User interface software and technology, UIST'11, Oct. 16-19, 2011, 10 pages.
Stanford CoreNLP—Natural Language Software, CoreNLP version 3.8.0, https://stanfordnlp.github.io/CoreNLP/, Jan. 23, 2018, 6 pages.
Alphabetical List of Part-of Speech Tags Used in the Penn Treebank Project, Penn Treebank P.O.S. Tags, https://www.ling.upenn.edu/courses/Fall_2003/ling001/penn_treebank_pos.html, Jan. 23, 2018, 2 pages.
Schramm et al., Rapid UI Development for Enterprise Applications: Combining Manual and Model-Driven Techniques, SAP Research Center Dresden, D.C. Petriu, N. Rouquette, Ø. Haugen (Eds.): Model Driven Engineering Languages and Systems, Models 2010, Part I, Lecture Notes in Computer Science vol. 6394, 2010, pp. 271-285, Springer, Berlin, Heidelberg.
Transcript and associated screen shots for YouTube video "MCS:89. Mobile Application Accelerator (MAX) Demo", Oracle Mobile, by Grant Ronald, published on May 9, 2016 (total length of video: 12:26) 29 pages.
Transcript and associated screen shots for YouTube video "How to Customize the Sales Cloud Mobile App" Demo Video Library, App Composer #44, Oracle, Fusion Applications Release 8, published on Oct. 15, 2014 (total length of video: 1:38) 5 pages.
Transcript and associated screen shots for YouTube video, "An Overview of Application Composer" Demo Video Library, Application Composer #68, Oracle. Fusion Application Release 11, published on Apr. 26, 2016 (total length of video: 5:28) 13 pages.
Suzuki et al., Topological Structural Analysis of Digitized Binary Images by Border Following. Computer Vision, Graphics, and Image Processing 30, 1985, pp. 32-46.
How to convert iOS UI to Android, Retrieved from http://androidux.com/work/beginner-guide/, Oct. 23, 2017, 16 pages.
Pleuss et al., Model-driven Development and Evolution of Customized User Interfaces, VaMoS '13 Proceedings of the Seventh International Workshop on Variability Modelling of Software-intensive Systems; Article 18, 2013, 10 pages.
Beckley, Android Design Guidelines, mutualmobile, Version 1, Feb. 2011, 31 pages.
Structure-Layout-Material Design, UI regions, retrieved from https://material.io/guidelines/layout/structure.html on Jan. 19, 2018, 24 pages.
Nguyen et al., Reverse Engineering Mobile Application User Interfaces With REMAUI, available online at http://ranger.uta.edu/~csallner/papers/nguyen15reverse.pdf, In Proc. 30th IEEE/ACM International Conference on Automated Software Engineering (ASE), Nov. 2015 (Nov. 9-13), pp. 248-259, 12 pages.
Yeh et al., Sikuli—Using GUI Screenshots for Search and Automation, available online at http://up.csail.mit.edu/projects/sikuli/sikuli-uist2009.pdf, UIST'09, Oct. 4-7, 2009, Victoria, British Columbia, Canada, Copyright 2009, 10 pages.
U.S. Appl. No. 15/996,311, First Action Interview Pilot Program Pre-Interview Communication dated May 29, 2019, 19 pages.
U.S. Appl. No. 15/996,311, Notice of Allowance dated Aug. 8, 2019, 16 pages.
Herault et al., "Sparse Probabilistic Classifiers", ACM, ICML '07 Proceedings of the 24th International Conference on Machine Learning, 2007, pp. 337-344.
Huang et al., "A Learning-Based Contrarian Trading Strategy via a Dual-Classifier Model", ACM Transactions on Intelligent Systems and Technology, vol. 2, Issue 3, 2011, pp. 1-20.
Khaddam et al., "Towards Task-Based Linguistic Modeling for Designing GUIs", ACM, 2015, pp. 1-10.

(56) References Cited

OTHER PUBLICATIONS

Rathod, "Automatic Code Generation with Business Logic by Capturing Attributes from User Interface via XML", 2016 International Conference on Electrical, Electronics, and Optimization Techniques (ICEEOT), 2016, pp. 1480-1484.

Sabraoui et al., "GUI Code Generation for Android Applications Using a MDA Approach", 2012 IEEE International Conference on Complex Systems (ICCS), 2012, 6 pages.

Storrle, "Model Driven Development of User Interface Prototypes: An Integrated Approach", ACM, ECSA '10 Proceedings of the Fourth European Conference on Software Architecture: Companion Volume, 2010, pp. 261-268.

U.S. Appl. No. 15/613,122, Non-Final Office Action dated Aug. 30, 2019, 36 pages.

Wu et al., Recursive Algorithms for Image Segmentation Based on a Discriminant Criterion, World Academy of Science, Engineering and Technology, vol. 1, No. 9, Available Online at: https://www.semanticscholar.org/paper/Recursive-Algorithms-for-Image-Segmentation-Based-a-Wu-Chen/9c7cce1c0407427bf86a3b1bfada97ba49a9c13a, 2007, pp. 2896-2901.

U.S. Appl. No. 15/613,122, Final Office Action dated Jan. 30, 2020, 39 pages.

Kovacevic et al., "Recognition of Common Areas in a Web Page Using Visual Information: A Possible Application in a Page Classification", 2002 IEEE International Conference on Data Mining, Available online at https://ieeexplore.ieee.org/document/1183910, 2002, pp. 250-257.

Pnueli et al., "Web Page Layout Via Visual Segmentation", LABS hp, Available online at https://www.hpl.hp.com/techreports/2009/HPL-2009-160.pdf, Jul. 21, 2009, 5 pages.

U.S. Appl. No. 15/613,122, Notice of Allowance dated Apr. 8, 2020, 7 pages.

Chinese Patent Application No. 201880041312.3, Office Action dated Sep. 11, 2020, 11 pages.

International Patent Application No. PCT/US2018/041038, International Preliminary Report on Patentability dated Aug. 27, 2020, 8 pages.

* cited by examiner

STATIC DYNAMIC SEGREGATOR

DATA OBJECTS IDENTIFIER

| 8:00 AM to 9:00 AM | Sales Meeting with JK Steel<br>1415 17th Ave. Denver, CO | ✓ | — 1210

Type
Meeting

Start
Thursday, 1/19/2015, 8:00 AM

End
Thursday, 1/19/2015, 9:00 AM

Account
Halpern, Inc, >

Opportunity
Elite Servers at Halpern, Inc. >

Lead
Elite Servers at Halpern, Inc. >

Primary Contact
Joshua Baker >

Owner
Lisa Jones >

Description
We will demo the Green Server 9600 and review the draft proposal document and presentation.

Private ⊙

Objectives +

Check contact's digital activity

Check server requests

Create quote

Invitees +

- Joshua Baker ☆ ?  >
  Senior Project Manager
- (MC) Michael Clayman ✕ >  — 1212
  Project Manager
- Mike Davidson ✓ >
  Senior Project Manager         — 1210

Attachments +

📄 Example Document
Joshua Goldman         5:12 PM >

FIG. 12C

MAPPING/PROPERTIES IDENTIFIER

Subject
<ORGANIZATION>Green Server Upgrade</ORGANIZATION>
Location
32 1st Rd., <LOCATION>Brisbane</LOCATION>, CA
Start
<DATE>Monday, Oct 19, 2015</DATE>, 7:30 PM
End
<DATE>Monday, Oct 19, 2015</DATE>, <TIME>8:30 PM</TIME>
Account
<ORGANIZATION>Reston Manufacturing</ORGANIZATION>
Opportunity
Green Server at <LOCATION>Reston</LOCATION>
Primary Contact
<PERSON>Julia Lee</PERSON>
Description
@
We will demo the <ORGANIZATION>Green Server</ORGANIZATION> 9600. We will review the draft proposal document and answer question regarding update.

FIG. 14C

| |
|---|
| Subject <br> Green Server Upgrade |
| Location <br> 32 1st Rd., Brisbane, CA |
| Start <br> Monday, Oct 19, 2015, 7:30 PM |
| End <br> Monday, Oct 19, 2015, 8:30 PM |
| Account <br> Reston Manufacturing |
| Opportunity <br> Green Server at Reston |
| Primary Contact <br> Julia Lee |
| Description <br> We will demo the Green Server 9600. We will review the draft proposal document and answer question regarding update. |
| |

FIG. 14E

| ●●●●○ Carrier | 9:41 AM | 100% |
|---|---|---|
| Cancel | | Save |

*Subject
Solution Briefing

Location
Halpern HQ: Room 1276

1502 — Type
Meeting >

All Day ⬜

*Start
Thursday, 1/19/2015, 8.00 AM

*End
Thursday, 1/19/2015, 9.00 AM

1504 — Repeat
Never >

Account
Halpern, Inc. >

Opportunity
Elite Servers at Halpern, Inc. >

FIG. 15

Deal Registrations

Pending (3) — 1704
All — 1706

Search — 1702

| Stryker Corp. | 2:50 PM |
| Jeremy Lopez | Approved > |
| Advantage Corp (Columb... | $40,000 |

| Stryker Corp. | 1:35 PM |
| Jeremy Lopez | > |
| Red Dog Corp (CHICAGO,... | $16,000 |

| Stryker Corp. | 1:31 PM |
| Jeremy Lopez | Approved > |
| Advantage Corp | $14,500 |

| Stryker Corp. | 1:28 PM |
| Jeremy Lopez | > |
| OBIA Textiles (Bangalore,... | €25,000 |

Deal Registrations    Opportunites

FIG. 17

GENERATING DATA MAPPINGS FOR USER INTERFACE SCREENS AND SCREEN COMPONENTS FOR AN APPLICATION

CROSS-REFERENCES TO RELATED APPLICATIONS

The present application is a non-provisional application of and claims the benefit and priority of India Provisional Application No. 201741022546, filed Jun. 28, 2017, entitled GENERATING MAPPINGS BETWEEN USER INTERFACE COMPONENTS AND DATA OBJECTS, the entire contents of which are incorporated herein by reference for all purposes.

The present application is also a continuation-in-part application of U.S. Non-Provisional application Ser. No. 15/613,122, filed Jun. 2, 2017, entitled GENERATING A GRAPHICAL USER INTERFACE MODEL FROM AN IMAGE, which in turns claims priority from U.S. Provisional Application No. 62/447,834, filed Jan. 18, 2017, entitled GENERATING A GRAPHICAL USER INTERFACE MODEL FROM AN IMAGE. The entire contents of the Ser. No. 15/613,122 and 62/447,834 applications are incorporated herein by reference for all purposes.

BACKGROUND

In a typical application development life cycle, before an application is created, requirements information is defined or gathered for the application. The requirements information may be put together based upon customer or client surveys, marketing surveys, and other sources of information that drive the functionalities to be included in the application to be developed. The requirements information thus typically describes the desired functionalities for the application. For example, the requirements information may describe the application's desired graphical user interface (GUI). For example, the requirements information may include mock-up images of various screens for the application, the design and look-and-feel of the screens, transitions between screens, and the like. In addition to mockup images of the screens, the requirements information may also include a text portion description desired functionality of the application, including functionality of the GUI screens. The requirements information for an application may also include other information.

The requirements information for an application may be documented in a requirements document or specification, which is then used to create or develop the application. For example, during a development phase, the requirements document may be provided to an engineering organization comprising engineers or developers who are tasked with writing the code for implementing the application based upon the requirements document. These developers have to understand the requirements information and then manually write code to create an application that implements the functionalities and the GUI as described in the requirements document.

The development of an application from requirements thus involves substantial manual effort by the application developers. It requires the developers to study the requirements document, understand the requirements information including understanding the desired functionalities and GUI screens, and then write code to implement the application. It also requires the application developers to have knowledge about the application development platform to be used for developing the application and also knowledge about the specific target system or platform (e.g., iOS® or Android®, mobile or desktop) for which the application is to be developed. As a result, quite often, developers with specific expertise are needed for the development. All this causes the application development phase to be tedious, time consuming, labor-intensive, and expensive.

BRIEF SUMMARY

The present disclosure is related to application development, and more particularly, to techniques for automating the development of an application from requirements information for the application. Various inventive embodiments are described herein, including methods, systems, non-transitory computer-readable storage media storing programs, code, or instructions executable by one or more processors, and the like.

In certain embodiments, the requirements information for an application may comprise information identifying the GUI for the application along with functionality for the application. The GUI for the application may include one or more screens (or GUI screens), with each screen comprising one or more user interface components (e.g., buttons, text entry boxes, drop-down lists, drop-down menus, labels, icons, tables). The requirements information for the application may include one or more mockup images of the GUI screens to be included in the application's GUI. The requirements information may also include text information describing the application's GUI and the application's desired functionality and behavior.

In certain embodiments, a model is generated for an application based upon the application's requirements information. The generated model can then subsequently be used to generate code that implements the application. In some embodiments, an executable may be generated based upon the model, where the executable has a GUI and functionality as described in the requirements information for the application.

In certain embodiments, the model generated for an application includes information for the GUI of the application. The model may encapsulate information corresponding to the one or more GUI screens for the application. For each screen, the model may include information identifying one or more user interface components included in the screen. For each GUI screen, the model may also include information about the structure of the GUI screen including information identifying a hierarchical organization of the user interface components (e.g., a container hierarchy of the user interface components) on the screen. The model may also include information about the functions to be associated with the screens and the user interface components on the screens.

In certain embodiments, for a screen, the model includes information identifying one or more data objects that are mapped to that screen. Additionally, for a particular data object mapped to a particular screen, the model may also include information about how individual components of the GUI screen are mapped to components (e.g., fields, elements, attributes) of the particular data object. In this manner, the model not only includes information about the GUI screens, but for a screen, also includes information indicative of one or more data objects mapped to that screen, and further of mappings between components of the mapped data objects to components of the screen. The model thus encapsulates how data is to be displayed on the various components of the screen and the source of the data such that the look and feel of the screen, as described in the requirements information, is reproduced.

The application model is generated based upon the requirements information for the application. In certain embodiments, building a model for an application includes analyzing and processing the requirements information, including analyzing the mockup images included in the requirements information and the text information included in the requirements information. Based upon the analysis, functionality may be determined for a GUI screen. For example, in some embodiments, a screen may be categorized to a particular functional category (e.g., EDIT, LIST, DETAIL, etc.). For a GUI screen, the analysis and processing may be used to determine the structure of the screen including identifying the multiple GUI components on the screen. The various features and other information extracted from the requirements information for a GUI screen may then be compared to information about available data objects to identify one or more data objects to be mapped to the screen, and further to identify mappings between components of the screen to components of the mapped data objects.

For a screen, the mapping of a data object to that screen identifies a source data object from which is to be displayed by that screen. Additionally, a mapping between a particular component of the screen and a particular component of the mapped data object indicates that the data stored by that particular data object component is to be associated with and displayed by the particular component of the screen. Accordingly, a mapping from a particular data object component to a particular GUI screen component identifies the source of data for that particular GUI screen.

Information indicative of the mappings between data objects and GUI screens, and mappings between GUI screen components and data objects components is stored by the model generated for the application based upon the requirements information for the application. In this manner, a model generated for an application encapsulates not only the look and feel of the application but also encompasses the data objects for the application and how the data objects map to the GUI screens. The model can then be used to automatically generate code that implements a functional application that not only implements the view aspect (e.g., GUI look and feel) for the application but also provides the data connectivity (e.g., source of data) for the application.

A model generated for an application based upon the requirements information for the application can be used by various downstream consumers of the model. For example, a downstream consumer may use the model to, automatically and substantially free of any manual coding, generate an implementation of the application. The implementation may be an executable implementation of the application executable by one or more processors. The same model can be used by different consumers. For example, a first consumer may use the model for generating an executable application version for a first platform (e.g., iOS®) and a second consumer may use the same model to automatically generate a second executable version of the application for a different platform (e.g., Android®). As another example, the model can be used to generate a functional working application using an application development tool such as Application Composer provided by Oracle Corporation®. For example, the model can be used to generate a functional working application on one or more application composer sites.

In certain embodiments, requirements information for an application may be received, where the requirements information comprises an image of a GUI screen for the application and text information. A set of components included in the GUI screen may be determined from the requirements information, where the set of components may include a first component. Based upon the requirements information, a first data object to be mapped to the GUI screen may be identified from a plurality of data objects. Further, based upon the requirements information, a mapping between the first component from the set of components and a first component of the first data object may be determined. An application model may then be generated for the application. The application model may comprise information indicative of the GUI screen, the set of components, information identifying a mapping between the first data object and the GUI screen, and information identifying a mapping between the first component of the first data object and the first component. The application model enables an implementation of the application to be generated.

The application model may be used to generate one or more implementations of the application. For example, the application model may be used to generate a first implementation of the application for a first platform (e.g., iOS®). The same application model may be used to generate a second implementation of the application for a second platform (e.g., Android®), wherein the second platform is different from the first platform.

In certain embodiments, a functionality category may also be determined for the GUI screen based upon the requirements information. In one embodiment, the functionality category may be one of EDIT, LIST, or DETAIL. Determining the functionality category may comprise determining, based upon the requirements information, whether the GUI screen comprises a GUI component used for displaying a list of values, components for editing for entering or editing values entered in the plurality of GUI components, or components that display details related to a business data object.

Various different techniques may be used for identifying the first data object to be mapped to the GUI screen. In certain embodiments, a text token from the image. The text token maybe determined to be a static component (as opposed to a dynamic component) and may be used to search information related to the plurality of data objects. The first data object may be identified based upon the search results. In some embodiments, searching may include, for each data object in the plurality of data objects, determining whether identification information for the data object fully or partially matches the text token. In certain embodiments, the GUI screen image may be segmented image into a multiple segments, the multiple segments including a header segment of the GUI scree. The text token used may be a title extracted from the header segment.

Various different processing may be performed to determine if the text token is a static or a dynamic component. The processing may include performing named entity recognition processing on the text token, performing part of speech tagging on the text token, and other types of processing.

In certain embodiments, the first component may be a text token extracted from the image. Determining the mapping between the first component from the set of components and a first component of the first data object may include determining that the text token is a static component, searching information related to the first data object using the text token, and identifying the first component of the first data object based upon the searching.

In certain embodiments, the first component may be a first text token extracted from the image and the set of components may comprise a second text token. In such a scenario, determining the mapping between the first component and a first component of the first data object may comprise determining that the first text token is a dynamic component, determining that the first text token is associated with the second text token, determining that the second text token is a static component, searching information related to the first data object using the second text token, and identifying the first component of the first data object based upon the searching.

In certain embodiments, the first component from the set of components may be a first text token. Determining the set of components in the GUI screen may comprise segmenting the image into a plurality of segments, the plurality of segments including a header segment of the GUI screen and a body segment of the GUI screen, extracting a second text token from the header segment, and extracting the first text token from the body segment. Further, identifying the first data object to be mapped to the GUI screen may comprise searching information related to the plurality of data objects using the second text token, and identifying the first data object based upon searching the information related to the plurality of data objects. Determining the mapping between the first component from the set of components and the first component of the first data object may comprise searching information related to the first data object using the first text token, and identifying the first component of the first data object based upon the searching of the information related to the first data object.

One or more data objects may be mapped to a GUI screen. The same data object could be mapped to multiple GUI screen for an application. In certain embodiments, it may be determined that a new data object, which is not included in the existing plurality of data objects, is to be created for the GUI screen.

The foregoing, together with other features and embodiments will become more apparent upon referring to the following specification, claims, and accompanying drawings.

BRIEF DESCRIPTION OF THE DRAWINGS

FIGS. 12A, 12B, 12C, and 12D depict examples of mockup images of GUI screens that may be included in requirements information for an application.

FIGS. 14A-14E depict an example of a process for extracting GUI components from a mockup GUI screen for an application according to certain embodiments.

FIG. 15 depicts a mockup image of a GUI screen that may be included in requirements information for an application.

FIG. 17 depicts a mockup image of a GUI screen that may be included in requirements information for an application.

DETAILED DESCRIPTION

Figure 1:
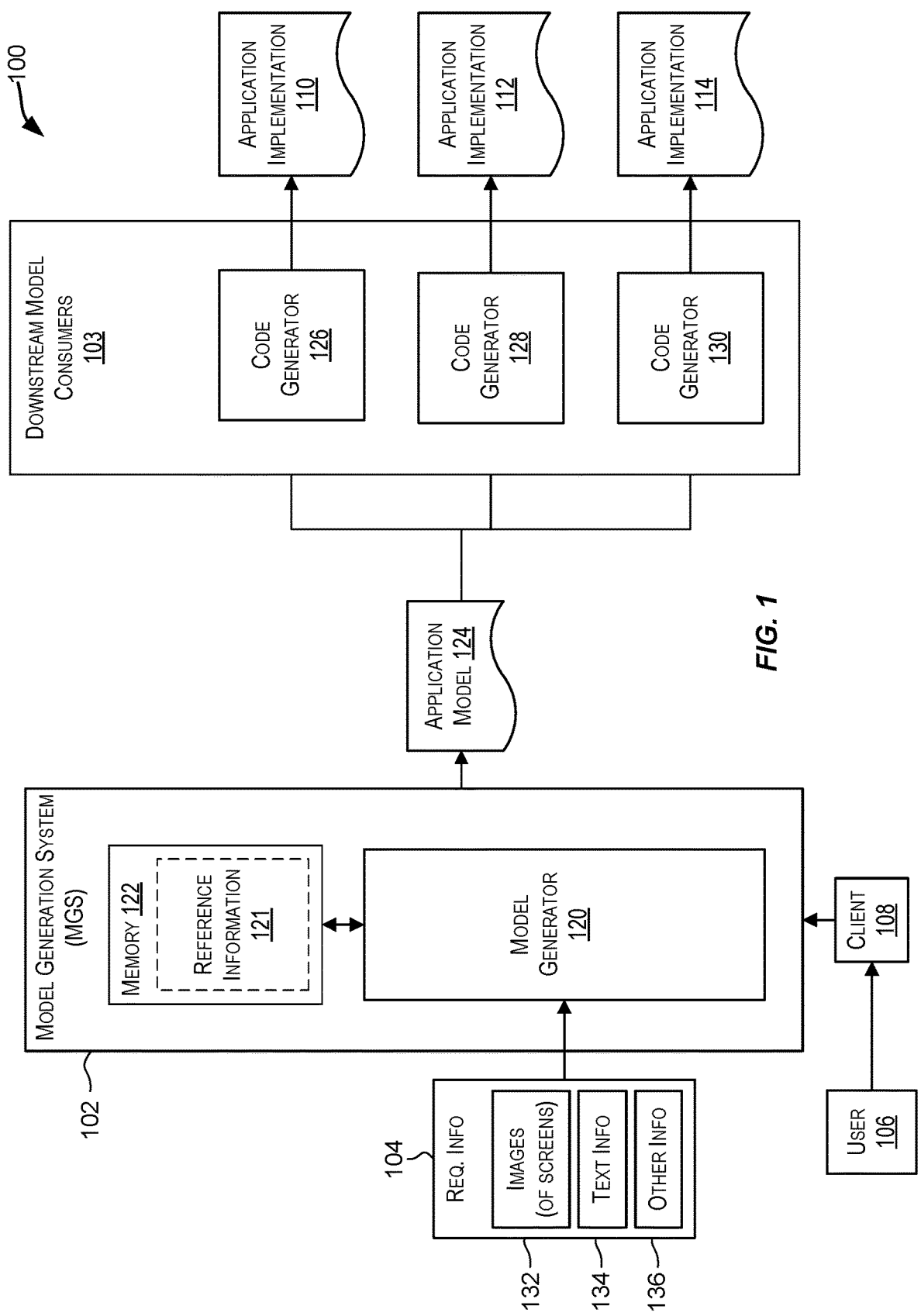
FIG. 1 depicts a simplified high level diagram of a system for generating a model for an application based upon requirements information for the application according to certain embodiments, where the generated model can be used by downstream consumers to automatically generate one or more implementations of the application.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure is related to application development, and more particularly, to techniques for automating the development of an application from requirements information for the application. Various inventive embodiments are described herein, including methods, systems, non-transitory computer-readable storage media storing programs, code, or instructions executable by one or more processors, and the like.

In certain embodiments, the requirements information for an application may comprise information identifying the GUI for the application along with functionality for the application. The GUI for the application may include one or more screens (or GUI screens), with each screen comprising one or more user interface components (e.g., buttons, text entry boxes, drop-down lists, drop-down menus, labels, icons, tables). The requirements information for the application may include one or more mockup images of the GUI screens to be included in the application's GUI. The requirements information may also include text information describing the application's GUI and the application's desired functionality and behavior.

In certain embodiments, a model is generated for an application based upon the application's requirements information. The generated model can then subsequently used to generate code that implements the application. In some embodiments, an executable may be generated based upon the model, where the executable has a GUI and functionality as described in the requirements information for the application.

In certain embodiments, the model generated for an application includes information for the GUI of the application. The model may encapsulate information corresponding to the one or more GUI screens for the application. For each screen, the model may include information identifying one or more user interface components included in the screen. For each GUI screen, the model may also include information about the structure of the GUI screen including information identifying a hierarchical organization of the user interface components (e.g., a container hierarchy of the user interface components) on the screen. The model may also include information about the functions to be associated with the screens and the user interface components on the screens.

In certain embodiments, for a screen, the model includes information identifying one or more data objects that are mapped to that screen. Additionally, for a particular data object mapped to a particular screen, the model may also include information about how individual components of the GUI screen are mapped to components (e.g., fields, elements, attributes) of the particular data object. In this manner, the model not only includes information about the GUI screens, but for a screen, also includes information indicative of one or more data objects mapped to that screen, and further of mappings between components of the mapped data objects to components of the screen. The model thus encapsulates how data is to be displayed on the various components of the screen and the source of the data such that the look and feel of the screen, as described in the requirements information, is reproduced.

The application model is generated based upon the requirements information for the application. In certain embodiments, building a model for an application includes analyzing and processing the requirements information, including analyzing the mockup images included in the requirements information and the text information included in the requirements information. Based upon the analysis, functionality may be determined for a GUI screen. For example, in some embodiments, a screen may be categorized to a particular functional category (e.g., EDIT, LIST, DETAIL, etc.). For a GUI screen, the analysis and processing may be used to determine the structure of the screen including identifying the multiple GUI components on the screen. The various features and other information extracted from the requirements information for a GUI screen may then be compared to information about available data objects to identify one or more data objects to be mapped to the screen, and further to identify mappings between components of the screen to components of the mapped data objects.

For a screen, the mapping of a data object to that screen identifies a source data object from which is to be displayed by that screen. Additionally, a mapping between a particular component of the screen and a particular component of the mapped data object indicates that the data stored by that particular data object component is to be associated with and displayed by the particular component of the screen. Accordingly, a mapping from a particular data object component to a particular GUI screen component identifies the source of data for that particular GUI screen.

Information indicative of the mappings between data objects and GUI screens, and mappings between GUI screen components and data object components is stored by the model generated for the application based upon the requirements information for the application. In this manner, a model generated for an application encapsulates not only the look and feel of the application but also encompasses the data objects for the application and how the data objects map to the GUI screens. The model can then be used to automatically generate code that implements a functional application that not only implements the view aspect (e.g., GUI look and feel) for the application but also provides the data connectivity (e.g., source of data) for the application.

A model generated for an application based upon the requirements information for the application can be used by various downstream consumers of the model. For example, a downstream consumer may use the model to, automatically and substantially free of any manual coding, generate an implementation of the application. The implementation may be an executable implementation of the application executable by one or more processors. The same model can be used by different consumers. For example, a first consumer may use the model for generating an executable application version for a first platform (e.g., iOS®) and a second consumer may use the same model to automatically generate a second executable version of the application for a different platform (e.g., Android®). As another example, the model can be used to generate a functional working application using an application development tool such as Application Composer provided by Oracle Corporation®. For example, the model can be used to generate a functional working application on one or more application composer sites.

For purposes of explanation, certain examples are described in this disclosure. These examples are however intended to be illustrative and not restrictive. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

FIG. 1 depicts a simplified high level diagram of a system 100 for generating a model for an application based upon requirements information for the application according to certain embodiments, where the generated model can be used by downstream consumers to automatically generate one or more implementations of the application. System 100 depicted in FIG. 1 is merely an example and is not intended to unduly limit the scope of claimed embodiments. One of ordinary skill in the art would recognize many possible variations, alternatives, and modifications. For example, in some implementations, system 100 may have more or fewer systems or components than those shown in FIG. 1, may combine two or more systems, or may have a different configuration or arrangement of systems.

As shown in FIG. 1, system 100 comprises a model generation system (MGS) 102 that is configured to receive requirements information 104 for an application as input and generate an application model 124 for the application based upon the requirements information. Application model 124 may then be consumed by one or more downstream consumers 103, who may generate one or more implementations 110, 112, 114, of the application based upon application model 124. Implementations 110, 112, 114 may be executable implementations of the application executable by one or more processors.

As indicated above, before an application is created, requirements information is defined or gathered for the application. Requirements information 104 may be put together based upon customer or client surveys, marketing surveys, and other sources of information that drive the look and feel of the application and the functionalities to be included in the application to be developed. Requirements information 104 may thus describe the application's desired graphical user interface (GUI) and the application's functionalities. Various different personnel may be involved in the preparation of requirements information 104 such as functional consultants, user experience (UX) designers, and the like.

Requirements information 104 may be stored in various forms. For example, requirements information 104 may be stored in the form of one or more requirements documents (sometime also referred to as requirement specifications). These requirement documents may then be provided as input to model generation system 102.

In certain embodiments, such as the embodiment depicted in FIG. 1, requirements information 104 may include one or more images 132, text information 134, and other information 136. Images 132 may include one or more mock-up images of one or more screens included in the GUI for the application. Images 132 may depict the design and look-and-feel of the screens, transitions between screens, and the like. Images 132 may be received in one of various different formats such as a bitmap file, a JPEG file, a PNG (Portable Network Graphics) file, a GIF file, a PDF file, and the like. Various different techniques may be used to generate images 132. For example, images 132 may include an image that is a photograph captured using an image capture device such as a camera, a scanner, and the like. As another example, images 132 may include an image that is a screenshot, for example, a screenshot of a screen of an existing application, where the to-be-developed application is to have a similar GUI screen as the existing application (e.g., the existing application could be a previous version of the application for which a new version of the application is to be developed).

Images 132 may include images generated using an application such as an image editing application (e.g., various image editing applications provided by Adobe Corporation®). Images 132 may also include images generated using software applications capable of creating or editing images such as various word processors (e.g., MS WORD®), diagramming applications (e.g., Visio®), and other applications.

The GUI of the application to be developed and for which requirements information 104 is received may comprise one or more screens. When the GUI comprises multiple screens, an image in images 132 may depict a single screen or multiple screens. In certain embodiments, images 132 may be received as a sequence or may have an ordering, where the sequence or ordering identifies the flow between the screens depicted by the images.

The application that is to be developed based upon requirements information 104 may be one or various types of applications including but not restricted to a mobile application (e.g., an application executable by a mobile device), a desktop application, a web application, an enterprise application, and the like. The application may be targeted for one of various different types of devices (e.g., smart phones, tablets, laptops, desktop computers, etc.) and platforms (e.g., iOS® platform, Android® platform, etc.). For example, image 132 may include one or more images of one or more GUI screens for a mobile application designed to execute on an Apple iPhone®, where the screens span the entirety of the mobile device's screen real estate or a portion thereof.

As depicted in FIG. 1, requirements information 104 may also include text information 134. Text information 134 may provide a textual description of the application's functionalities, including but not limited to, the look and feel of the screens (e.g., the design or structure of a screen, user interface components of a screen, fonts used, colors (e.g., foreground, background colors) used on the screen, and the like), the functionalities of the screens and their user interface components, the data to be displayed by the screens and their user interface components, and the like. Text information 134 may also describe transitions between the multiple screens. In certain embodiments, requirements information 104 may optionally also include other information 136 such as user interface guidelines information that defines the general look and feel to be used throughout the application.

In a typical traditional application environment, an application is built based upon requirements information 104. For example, requirements information 104 may be provided to an engineering organization comprising engineers or developers who are tasked with writing the code for implementing the application based upon requirements information 104. These developers have to understand the requirements information 104 and then manually write code to create that implements the functionalities and the GUI of the application as defined in requirements information 104. The (Model, View, Controller) (also referred to as "MVC") paradigm or patent may be followed for building the application.

In certain embodiments, model generation system 102 is configured to take requirements information 104 as input and automatically generate an application model 124, which can then be used to automatically generate an implementation of the application. The implementation may include code and logic implementing the application. The implementation may be an executable implementation that can be executed by one or more processors.

Model generation system 102 may comprise one or more subsystems that are configured to work together to generate application model 124. These subsystems may be implemented in software (e.g., code, instructions, program) executed by one or more processing units (e.g., processors, cores) of a computer system, in hardware, or combinations thereof. The software may be stored on a non-transitory storage medium (e.g., on a memory device) such as in memory 122. For example, in the embodiment depicted in FIG. 1, model generation system 102 comprises a model generator subsystem 120. In alternative embodiments, model generation system 102 may include multiple subsystems. In certain embodiments, model generator subsystem may include multiple subsystems.

Model generation system 102 may use various different techniques to build application model 124 from requirements information 104. For example, model generation system 102 may process and analyze requirements information 104 to determine the one or more GUIs screens specified for the application, and for each GUI screen, the set of user interface components included on that screen and the physical layout of the user interface components. In certain embodiments, this processing may include, for example, for a GUI screen, partitioning the screen image into one or more segments or partitions, determining a set of user interface components (e.g., buttons, drop down lists, segments, etc.) that are included in each of the partitions and their attributes titles or values (e.g., labels, sizes), determining the physical layout of the partitions within the GUI screen and the physical layout of the GUI components within the partitions including determining hierarchical containment relationships between segments or partitions, and determining functionality to be associated with one or more of the GUI components. Additional description and examples of processing that may be performed by model generation system 102 for determining the GUI screens and their layout are described below and also provided in the various provisional and non-provisional applications from which the present application claims priority and whose contents are incorporated by reference in the present application.

In certain embodiments, model generation system 102 is also configured to process and analyze requirements information 104 to identify one or data objects corresponding to one or more one screens and store mappings between the data objects and the corresponding screens. Additionally, based upon requirements information 104, model generation system 102 may be configured to, for a GUI screen of the application, determine a set of user interface components included in the screen, and for one or more of the user interface components, determine data object components to be mapped to the user interface components. Information indicative of the various mappings (e.g., data objects to GUI screens mappings, data object components to GUI screen components mappings) may be stored as part of application model 124.

The mapping between a data object and a GUI screen identifies the source of data for the GUI screen. One or more data objects may be mapped to a GUI screen. A data object can also be mapped to multiple GUI screens for an application. The mapping between a data object component (e.g., a field or element or attribute of a data object) and GUI screen component identifies the source of data for the GUI screen component. A data object component can be mapped to one or more GUI screen components.

In certain embodiments, the processing performed by model generation system 102 may be guided by reference information 121 that is accessible to model generation system 102. For example, as shown in the embodiment depicted in FIG. 1, reference information 121 may be stored in memory 122. In some other embodiments, reference information 121 may also be stored in a remote location from model generation system 102. In yet other embodiments, portions of reference information may be stored in a memory 122 local to model generation system 102 while other portions may be stored remotely from model generation system 102.

Reference information 121 may include various types of information. For example, in certain embodiments, reference information 121 may include various rules that guide the processing performed by model generation system 102. For example, reference information 121 may include rules that model generation system 102 may use to determine one or more GUI screens specified for the application, and for each GUI screen, the set of user interface components included on that screen and the physical layout of the user interface components. Reference information 121 may also include rules that model generation system 102 may use to identify one or data objects to be mapped or associated with one or more screens and to build an application model 124 storing these mappings. Reference information 121 may also include rules that model generation system 102 may use to identify mappings between data objects components and GUI screen components and to generate application model 124 storing these mappings. Various different types of processing may be performed on requirements information 104 to determine the various mappings. This processing may also be guided by reference information 121.

In certain embodiments, the processing or portions of processing performed by model generation system 102 may be performed using machine learning techniques. Information related to these machine learning techniques (e.g., models used for machine learning, data for training the models, application of the models, feedback information for improving the model accuracy, etc.) may also be included in reference information 121. In certain embodiments, a combination of rules based processing and machine learning based techniques may be used by model generation system 102.

Reference information 121 may also include information about the various data objects that are available. The information for a data object may include information such as the name (or identity) of the data object, the components (e.g., attributes, elements, or field names) of the data object, the type of data stored by the data object, connectivity and storage information for the data object, and the like. Model generation system 102 may use this information to identify a data object to be mapped to a GUI screen and also to identify mappings between data object components and GUI screen components. The data objects may be stored locally or remotely from model generation system 102.

In certain embodiments, reference information 121 may be configured by a user (e.g., a programmer) or administrator of model generation system 102. In some other embodiments, reference information 121 may be built using one or more machine-learning techniques. For example, according to a supervised learning technique, reference information 121 may be a model that is built using training data, where the supervised model is then used to generate application model 124.

In certain embodiments, application model 124 may be persisted to one or more files generated by model generation system 102. The information in an application model 124 may be encoded using various formats. In certain embodiments, the model information may be encoded in a markup language such as Extensible Markup Language (XML) or jQuery. For example, model generation system 102 may generate one or more XML files that together represent application model 124. The generated file(s) may be stored in memory 122 or in some other memory location accessible to model generation system 102.

Application model 124 may then be used by one or more downstream model consumers 103. For example, model consumers 103 may be configured to generate one or more application implementations 110, 112, and 114 based upon application model 124. Application implementations 110, 112, and 114 may each be based on information specified in application model 124. Since application model 124 is generated based upon requirements information, an application implementation generated based upon application model 124 has functionality as described in requirements information 104. For example, application model 124 may include information identifying a particular GUI window or screen comprising a particular set of GUI components and mapped to a particular set of data objects. An application implementation (e.g., the code or instructions implementing the application) generated based upon the application model includes code and logic for instantiating the particular GUI screen with the particular set of GUI components and mapped to the particular set of data objects.

Accordingly, the application implementation implements GUI screens and the data objects connectivity as described by application model 124, which in turn is generated based upon requirements information 104. For example, if application model 124 specifies a particular screen including a set of user interface components arranged in a particular physical layout, then that screen and the particular physical layout is implemented by the application implementation. If the application model 124 specifies a particular function for a particular user interface component, then an application implementation generated based upon the model includes logic for implementing that particular function and associating the function with the particular user interface component. In certain embodiments, the application implementation may provide a hook enabling a particular user interface component to be hooked or linked with code implementing a particular function to be associated with that particular user interface component. If the application model 124 specifies particular mappings between GUI screens and data objects and between GUI screen components and data object components, then the application implementation includes logic for implementing those mappings. In certain embodiments, an application implementation may include code that provides a hook that enables a developer to hook or add additional code implementing additional functionality to the application implementation. The implementation In certain embodiments, model consumers 103 may include one or more code generators 126, 128, and 130 that are configured to take application model 124 as input and generate code implementations of the application, possibly in different programming languages and/or for different platforms. A code generator may take application model 124 as input and generate code implementing the application in a language specific to that code generator. The implementation may be an executable implementation of the application executable by one or more processors. For instance, code generator system 126 may take model 124 as input and generate an implementation 110 in a first language for a first platform (e.g., for iOS® platform). Code generator system 128 may generate implementation 112 in a second language using application model 124 for the iOS® platform, and code generator system 130 may generate implementation 114 using application model 124 for an Android® platform. A code implementation may then be compiled (or interpreted, or some other processing performed on it) to generate an executable version of the application. In certain embodiments, application model 124 may be passed to one or more downstream consumers, for example, code generators 126, 128, and 130, by model generation system 102 without first being persisted to a file.

As indicated above, code generators 126, 128, 130 may each be configured to generate code using a specific language and for a particular platform (e.g., Windows®, Android®, iOS® platforms). Accordingly, implementations 110, 112, and 114 may be different from each other and specific to a particular programming language and/or device or platform. In this manner, a single application model 124 can be used to generate different GUI implementations 110, 112, and 114 for different languages, platforms, and devices.

In certain embodiments, application model 124 may be used to generate code for automated testing of an application implementation. To facilitate the generation of automated testing of an implementation, in certain embodiments, the auto-generated application implementation may additionally comprise labels, annotations, and other data that identify, for example, GUI components within the GUI of the application. These labels, annotations, and other data may then be used by automated testing suites to identify GUI components and GUI functions within the application implementation. Automated testing suites may then generate and/or run tests tailored to thoroughly test the GUI components and GUI functions of the application implementation.

In certain embodiments, application implementations 110, 112, and 114 may each correspond to a code template that implements the application's functionality. A code template may be made up of one or more source code files containing high-level code (which may comprise methods, functions, classes, event handlers, etc.) that can be compiled or interpreted to generate an application executable that can be executed by one or more processors of a computer system. In this manner, a runnable implementation of the application can be automatically generated based upon application model 124, where the runnable implementation encapsulates the look and feel of the application, the functionalities of the application, and mapping or associations to data objects corresponding to the application, as described in the application's requirements information. Developers may further augment the code template implementation with additional code to complete or enhance (e.g., add additional functionality) the application's code base. For example, code generator system 126 may be configured to receive one or more files comprising markup code corresponding to model 124 and output an application implementation 110 comprising one or more source code files by translating the markup code (e.g., XML) into (high-level) source code (e.g., Java, C++, or other language).

Another example of a downstream application is the Application Composer provided by Oracle Corporation®. Application Composer is a browser-based tool that business analysts and administrators, not just programmers, can use to customize Oracle Sales Cloud. Using this tool, one can make data model changes which previously could only be made by experienced application developers and not business users. For example, a user can use the tool to create a new data object with associated components (e.g., fields, elements, attributes) and then create new desktop pages to expose that object to users. Application Composer is a "design time at run time" tool, which means that a user can navigate to the Application Composer tool directly from a Sales Cloud application, make the desired changes, and see most changes take immediate effect, without having to sign back into the application. In certain versions, Application Composer allows new screens to be added to an application or to change the contents of existing screens of a mobile application by configuring them remotely at a server.

In certain embodiments, the teachings described in this disclosure can be used to identify the new screens to be added and the changes to be made to existing screens from requirements information. For example, for an Enterprise Application, based on the requirements information, the existing business objects may either be customized or new business objects may be created. The teachings described herein can be used to identify a new business object to be created or to identify modifications to be made to an existing business object. The model generated by model generation system 102 based upon the requirements information can be used to automate this processing in Application Composer.

For example, newly derived or created business objects may require a new set of screens to expose the data of the data objects. A typical set of screens for the business objects may include screens for view the details of an instance of this type of business object and to edit an instance of this business object. These screens are usually specified in the application requirements. For example, from the mockup images present in the application requirements, the functionality or type of screen can be identified. The screen mockup and the text description in the requirements information may contain details of information that need to be shown on the screen. Constant or static components like placeholder text or titles which do not change for different instances of the business object can be identified, and the dynamic components that change for different instances of the business objects can be identified. For example, the text token component "Start Date" in a GUI screen represents a constant or static component that remains the same for all instances. On the other hand, a text token component such as "12 Oct. 2016" represents a dynamic value component, where the value displayed by this component changes for different instances of the business objects. As part of the processing, static components and dynamic components (e.g., value "12 Oct. 2016") are identified. For example, the attribute or field of the business object could have a label "Begin date". The teachings described herein can be used to identify the constant and dynamic components on the GUI screen and to also identify the attributes of the business object from which the values are to be fetched and shown in GUI screen. Typically, in the case of Application Composer, an engineer takes the application requirements, manually identifies if business objects need to be created or edited, and then looks at the text and mockup images in the requirements information to identify the screen(s). The engineer then edits the screen by modifying fields to be displayed on the screen. The teachings described herein can be used to automate the steps traditionally performed manually by the engineer.

Another example of a downstream application could be an extension of Application Composer. As described in U.S. Non-Provisional application Ser. No. 15/613,122, GUI components or elements on a screen, their visual characteristics and functions (e.g., delete, add, save etc.) performed when invoking them (wherever applicable like button) are extracted from the requirements information. The data which is displayed on these GUI elements can then be automatically identified and the data on which a function corresponding to a GUI element is performed. Typically the application GUI has GUI screens with GUI elements or components which are selected by a user of the application to perform various functions. So the functions performed by the user on a screen can be identified using the GUI components or elements on the screen. In this manner, the U.S. Non-Provisional application Ser. No. 15/613,122 and the present disclosure together completely define the model (data), view (GUI) and controller (function) of a well-defined data centric application such as a mobile application, an enterprise mobile application, and the like.

Model generation system 102 may provide one or more interfaces that enable a user 106 to interact with model generation system 102, either directly or via a client device 108. These user interfaces may include, for example, various GUIs, command line interfaces (CLIs), and other interfaces. In certain embodiments, model generation system 102 may be part of an integrated development environment (IDE).

Client device 108 may be of different types, including, but not limited to a personal computer, a desktop computer, a mobile or handheld device such as a laptop, smart phone, tablet, etc., or other types of devices. In certain embodiments, client device 108 may be communicatively coupled with model generation system 102 directly or via a communication network. The communication network can be of various types and may include one or more communication networks. Examples of the communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications between client device 108 and GUI model generation system 102 including both wired and wireless protocols such as IEEE 802.XX suite of protocols, TCP/IP, IPX, SAN, AppleTalk®, Bluetooth®, and other protocols.

User interactions with model generation system 102 may take various forms. A user may provide application requirements information 104 to model generation system 102 via these interactions using one or more interfaces provided by model generation system 102. In certain embodiments, outputs (e.g., application model 124) of model generation system 102 or information about the status of the processing may be communicated by model generation system 102 to client 108 and presented to user 106 via client 108. For example, information related to application model 124 may be presented to a user 106. User 106 may then review application model 124 for accuracy, and if needed, may make changes to application model 124. In this manner, user 106 may provide feedback on application model 124 generated by model generation system 102. Model generation system 102 may then use the feedback to update reference information 121. The updated reference information 121 may then be used for generating future generations of application model 124. For example, if user 106, while reviewing application model 124, determines that one of the GUI components indicated in the model is incorrectly identified, the user may provide feedback (i.e., corrections) to model generation system 102 via client device 108. Model generation system 102 may then update the application model 124 based on the user feedback. In this manner, the feedback loop from the user enables the accuracy of model generation system 102 to be improved over time.

As described above, model generation system 102 is configured to automatically generate application model 124 based upon reference information 121. Application model 124 is thus generated from requirements information 104 in an automated manner and substantially free from any manual user interventions. Further, the same application model 124 may be used for generating application implementations for different devices, platforms, and/or languages. Application model 124 may be used by downstream model consumers to generate application implementations in an automated manner. For example, an application implementation may be generated based upon application model 124 without having to manually write code for the implementation. In certain embodiments, an implementation may be executable implementation executable by one or more processors. In other embodiments, an implementation may comprise code, logic, etc. implementing the application. Such an implementation may then be compiled or interpreted to generate an executable implementation of the application. In this manner, an executable application implementation may be automatically generated from requirements information 104 in an automated manner, and substantially free from any manual user interventions or having to manually write code or logic for the application. This level of automation substantially speeds up the application development cycle and reduces the development costs. The application model 124 may also be used to generate tests for automating the testing of application implementations.

Figure 2:
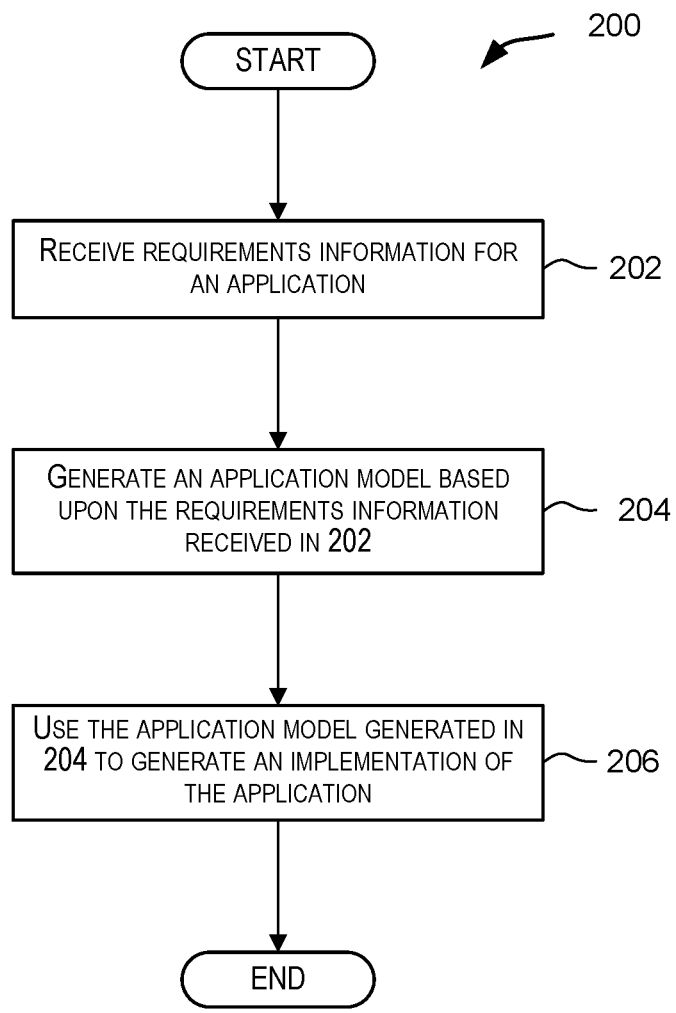
FIG. 2 depicts a simplified flowchart depicting high-level processing performed for generating an implementation of an application based upon requirements information for the application according to certain embodiments.

FIG. 2 depicts a simplified flowchart 200 depicting high-level processing performed for generating an implementation of an application based upon requirements information for the application according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by model generation system 102.

As shown in FIG. 2, processing may start at 202 when model generation system 102 receives requirements information for an application for which an implementation is to be generated. In certain embodiments, model generation system 102 may receive a signal, where the signal identifies the application. Model generation system 102 may then determine a storage location where the requirements information for that application is stored and access the requirements information from that storage location. In some embodiments, the signal received by model generation system 102 may itself contain the requirements information.

Model generation system 102 may receive the signal in various ways. In some embodiments, the signal may be received in response to a user request requesting the generation of an implementation for an application. For example, in the embodiment depicted in FIG. 1, a user 106 may use client device 108 to interact with model generation system 102 and cause a signal to be sent to model generation system 102 instructing the model generation system 102 to generate an implementation for a particular application based upon requirements information for that particular application. In some instances, the user may also provide the requirements information for the application. In other instances, the user may identify a storage location from where model generation system 102 can access the requirements information for the application. Model generation system 102 may then access the requirements information from that storage location. In yet other embodiments, given information identifying an application, model generation system 102 may automatically determine where the requirements information for the application is stored and then access the requirements information from that storage location.

In certain instances, the requirements information for the application may be stored in multiple possibly distributed storage locations. In such instances, model generation system 102 may be configured to access the requirements information from these multiple locations.

In certain embodiments, a program executed by client device 108 may enable the user to interface and interact with model generation system 102. For example, the program may be part of an integrated development environment (IDE) that provides facilities and tools for users (e.g., programmers) to build software applications. In such an environment, an IDE may provide a tool that enables generation of an implementation for an application based upon requirements information for the application. A user may use this tool to identify an application and also provide requirements information for the application (or provide information identifying one or more storage locations from where model generation system 102 can access the requirements information for the application).

At 204, model generation system 102 is configured to generate an application model based upon the requirements information received in 202. For example, model generator 120 of model generation system 102 may be configured to process the requirements information and build the application model. In certain embodiments, once model generation system 102 has accessed the requirements information, the processing in 204 may be performed in an automated manner by model generation system 102 without requiring any user input or intervention or with very little user input or intervention.

The application model generated in 204 can then be used for various downstream purposes. For example, as depicted in FIG. 2, at 206, the application model generated in 204 may be used to generate one or more implementations of the application. For example, a code generator (e.g., one or more of code generators 126, 128, and 130 depicted in FIG. 1) may take the application model generated in 204 as input and output an implementation for the application. In certain embodiments, the implementation may be an executable implementation of the application executable by one or more processors. In other embodiments, the implementation may include code and logic for implementing the application. The implementation may then be compiled or interpreted by generate an executable application.

Figure 3:
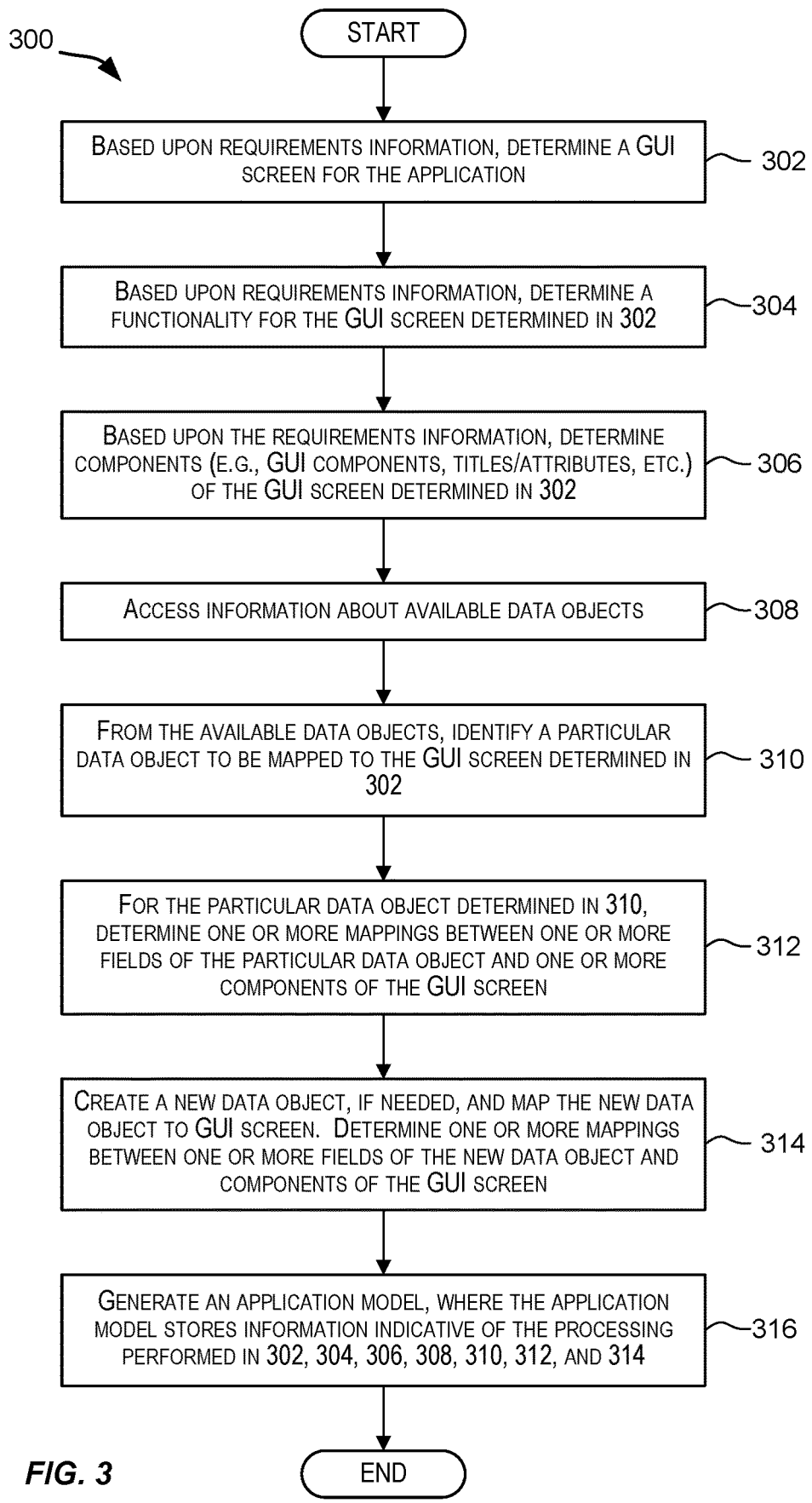
FIG. 3 depicts a simplified flowchart depicting high-level processing performed for generating an model for an application based upon requirements information for the application according to certain embodiments.

FIG. 3 depicts a simplified flowchart 300 depicting high-level processing performed for generating a model for an application based upon requirements information for the application according to certain embodiments. In certain embodiments, the processing in depicted in FIG. 3 may be performed as part of the processing performed in 204 in FIG. 2. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by model generator 120 of model generation system 102.

For sake of simplicity, flowchart 300 depicted in FIG. 3 and the associated description provided below describes processing for a single GUI screen for the application. This however is not intended to be limiting. In alternative embodiments, the requirements information may identify multiple GUI screens for an application. In some such scenarios, the processing depicted in FIG. 3 (or some of the processing) may be repeated for each GUI screen for the application. Further, in FIG. 3, for sake of simplicity, it is assumed (e.g., in 310) that a single data object maps to the particular GUI screen. This again is not intended to be limiting. In some alternative embodiments, multiple data objects may map to a single GUI screen. In the case where multiple data objects map to a GUI screen, some of the steps depicted in FIG. 3 (e.g., 312, 314, and 316) may be repeated for each mapped data object. Further, the same data object may be mapped to multiple GUI screens for the application.

At 302, a GUI screen for the application is determined based upon the requirements information for the application. Both the image and text portions of the requirements information may be processed to determine the GUI screen.

At 304, functionality for the GUI screen (determined in 302) is determined based upon the requirements information. In some embodiments, as part of the processing in 304, a functionality category may be determined for the GUI screen from a list of pre-configured functionality categories. For example, in one embodiment, the pre-configured categories include a "LIST" category, a "DETAIL" category, and an "EDIT" category.

Various different techniques may be used to determine the functionality category for the screen. The functionality category determined for a GUI screen is such that it represents the primary or dominant functionality of the GUI screen. For example, in some embodiments, the LIST functionality category can be identified for a screen that comprises a list that occupies a majority of screen. Various features extracted from the requirements information such as list GUI components present on the screen, surrounding GUI components present on the screen, the design of the screen, etc. can be used to determine whether the screen is to be categorized as a LIST. For example, features such as, the presence of "+" or "Add" functions above the list component on a screen, presence of a "Search" function on the screen in close proximity to the list component, presence of a navigator or hamburger icon, etc. may indicate the screen as a LIST functionality screen.

As another example, a screen may be categorized as belonging to the "EDIT" functionality category based upon the presence of a high number of editable components (e.g., text edit boxes) on the screen. The requirements information may be analyzed to determine the presence of these components on the screen. Additionally, the presence of other features on the screen, as determined from the requirements information, such as GUI components such as a "Save" button, a "Cancel" button, an icon for clearing entered text, and the like, that are typically associated with edit functionality, may also be determined from the requirements information and may signal the screen as an EDIT functionality screen. These features are examples and are not intended to be limiting.

For a screen that may be categorized as belonging to the "EDIT" functionality category, the screen may comprise GUI components that are used for displaying information. This may also be determined from the requirements information for the application.

In general, as part of the processing in 304, features extracted from the requirements information for the screen may be used to identify components of the screen such as GUI components, text labels (e.g. title in the header section of the screen, attribute titles in the body section of the screen), placement of the components, and the like. This may then be used to determine a functionality category for the screen. Various analyses such as part of speech tagging, named entity recognition, etc. may also be applied to the screen and its components and the output of the processing may be used to determine the functionality category for the screen.

In some embodiments, machine-learning techniques may be used to determine a functionality category for a screen. For example, the various screen-related features determined from the requirements information may be input to a machine learning classifier that is configured to make a decision on the category of the screen functionality.

At 306, components of the GUI screen are determined based upon the requirements information. These components may include one or more sections of the GUI screen (e.g., a header, body, section), GUI components (e.g., lists, text boxes, buttons, text labels or tokens, icons, containers, etc.), and the like. A component of a screen may refer to any content associated with a screen.

As part of 306, processing may be performed to determine whether a GUI component is a static component, whose displayed value remains the same for different instances of a data object or is a dynamic component, whose displayed value can change from one instance of a type of data object to another instance. For example, an image in the requirements information may display a GUI screen comprise an edit box component displaying a name "John Doe". The edit box component may be proximally placed to a title component labelled "Name". As part of the processing in 306, the edit box component may be determined to be a dynamic component (also referred to as attribute value in this disclosure) and the title component may be determined to be a static component (also referred to as attribute title in this disclosure). This information may then be used for the processing performed in 310, 312, and 314 described below.

In FIG. 3, even though step 306 is shown after 304, this is not intended to be limiting. In some embodiments, information about components extracted from a GUI screen may be used to determine a functionality category for the GUI screen. Accordingly the processing depicted in 306 may be intertwined with the processing depicted in 304.

At 308, information related to available data objects is accessed. The available data objects may include standard data objects provided by one or more applications (e.g., as default data object types) or may include customized data objects. For example, for an application, a customer may modify a default data object type to create a customized data object type. For example, the Application Composer tool provided by Oracle Corporation® provides several standard data objects (sometimes referred to as "business objects" since the objects may be used for business applications) such an "Opportunity," "Asset," "Partner," "Activity," etc. A standard data object may be customized by a customer to create a customized document by changing one or more fields of the standard data object, changing the relationships of the standard data object, and the like.

For purposes of this disclosure, the term "data object" is used synonymously with "data object type". For example, the "Opportunity" object provided by Oracle's Application Composer represents a particular data object type and is also referred to as a data object. "Activity" represents another type of data object and may also be referred to as a second data object that is different from the "Opportunity" data object. There can be multiple instances of a data object, i.e., multiple instances of the same type of data object. For example, an opportunity for Client A may be stored in one instance of data object "Opportunity", an opportunity for Client B may be stored in a second instance of data object "Opportunity", and so on. A standard data object is generally a data object that is provided default out-of-the-box by an application (e.g., Oracle's Application Composer). A user may modify a standard data object to create a customized data object type or data object. For example, a user may add or delete one or more fields to a standard "Opportunity" data object to create a customized "New Opportunity" data object.

As part of 308, information related to the available data objects, including standard and customized data objects, is accessed. This information may be stored in various different forms. For example, the information may be stored as a table that can be accessed by model generation system 102. For example, Table A, shown below, includes information identifying multiple data objects provided by an Oracle Sales Cloud product offering. The list shown in Table A is only an example and is not intended to be exhaustive or limiting.

TABLE A

Information about available data objects

| TITLE | NAME |
|---|---|
| Account | accounts |
| Activity | activities |
| Competitors | competitors |
| Contacts | contacts |
| Deal Registrations | deal registrations |
| Households | households |
| Leads | lead |
| Opportunities | opportunities |
| Orders | orders |
| Partners | partners |
| Products | products |
| Resource | resources |

In some embodiments, information regarding available data objects can be accessed by model generation system 102 using one or more REST service calls.

At 310, from the available data objects identified in 308, a particular data object is identified to be mapped to the GUI screen determined in 302. Various different processing techniques may be used to identify the data object to be mapped to the GUI screen. In some embodiments, a matching technique is used to match features determined for the GUI screen from the requirements information to information accessed in 308 for the available data objects and to find the best fitting data object based upon the matching. The "best fit" data object is then mapped to the GUI screen.

In a simple example, as part of 306, a header section of the GUI screen may be determined. Further, as part of 306, a text token may be extracted from the header section and identified to be the header title. In 310, this header title may then be matched against the names of the available data objects obtained from the data objects-related information accessed in 308. An available data object whose name best matches (e.g., is the "best" match) the header title may be identified as the data object to be mapped to the GUI screen. For example, if the header text title is "Leads" and the available data objects identified in Table A are searched, the header title may be determined to best match the data object named "Leads". The "Leads" object may then be identified in 310 to be mapped to the GUI screen identified in 302.

It should be understood that the match does not have to be a literal match; a "best" match may be determined. For example, let's assume that the header title label is "My Open Leads". Upon matching this title to the available data objects in Table A, the data object named "Leads" may again be determined to be the best match and may then be mapped to the GUI screen in 310.

In some embodiments, vector matching may be used to determine the best match. The GUI screen may be represented by a multidimensional vector ("screen vector") representing different aspects of the GUI screen. These aspects may include, for example, the functionality category determined for the screen in 304, the various components determined for the screen in 306, the positions of the components on the screen, information differentiating static components from dynamic components, and the like. Each available data object may also be represented by a multidimensional vector ("data object vector"), where the vector for a data object represents different aspects of the data object. The aspects of a data object represented by its corresponding vector may include, for example, the name of the data object, the components or fields of the data object, one or more relationships associated with the data object, the application providing the data object, information indicative of whether the data object is a standard data object or a customized data object, and the like. The screen vector may then be compared to available data object vectors to find a data object vector that is the closest match to the screen vector. In some embodiments, this may be done by, for each data object vector, finding a similarity score for that vector to the GUI screen vector. The data object vector with the highest similarity score may then be identified as the matching data object vector, and the data object associated with the matching data object vector is then identified to be mapped to the GUI screen in 310. Various other techniques may also be used in 310 to determine a particular data object that is to be mapped to the GUI screen.

In some embodiments, a threshold similarity score may be preconfigured. A data object vector has to have at least the threshold similarity score in order to be considered a match to the screen vector. In such an embodiment, it may be possible that none of the available data object vectors are considered to match the screen vector, i.e., no available data object matches the GUI screen. In such a scenario, a new data object may need to be created for the GUI screen. This is further described below with respect to 314.

At 312, for the particular data object determined in 310, one or more mappings from one or more components (also referred to as fields, elements, or attributes) of the particular data object to one or more components of the GUI screen are identified based upon the requirements information and the information for available data objects accessed in 308.

Various different processing techniques may be used to determine mappings between GUI screen components and data object components, such as various matching techniques. For example, it may be determined in 310 that the "Leads" available data object is to be mapped to the GUI screen identified in 302. Further, it may be determined in 306 that the GUI screen comprises a body section comprising a text token "12-Oct-2017" representing a first component. The first component may be determined to be a dynamic value component. It may further be determined in 306 that the first component is proximally located on the GUI screen to and associated with a second token text component "start-date", which is determined to be a static component. The "start-date" token text may then be used to search the components (e.g., fields/attributes) of the "Leads" to find a best matching component of the data object. For example, from among the various fields of the "Leads" data object, a field "Start Date" may be determined to be the best match to the "start-date" token. The "Start Date" field of the Leads data object may then be mapped to the first component (and also possibly the second component) in the GUI screen. As part of the processing performed in 312, one or more fields of the particular data object determined in 310 may be mapped to one or more components of the GUI screen.

As shown by the above example, in a simple implementation, a string search may be performed between the names of fields of the particular data object and the components of the GUI screen. In some embodiments, a vector matching technique may be used. Each dynamic component of the GUI screen may be represented by a vector. Each field of the data object identified in 310 may also be represented by a vector. Vector matching may then be performed to determine a field of the particular data object that best matches the particular dynamic component of the GUI screen. That particular field may then be mapped to that particular component as part of the processing performed in 312.

The "12-Oct-2017" dynamic component example described above assumed that a static "start-date" component was associated with the dynamic component. This may however not always be available. In such situations, a static title for the dynamic component may be inferred from the value of the dynamic component itself. For example, processing such as Named Entity Recognition (NER) analysis may be performed on the dynamic value text token to determine an entity (e.g., a person, an organization, time, etc.,), if any, represented by the text token. The entity information may then be used to find the best match. In some embodiments, the token text may also be subjected to part of speech tagging processing and the output of this processing (and potentially along with the NER output) may be used to determine a term to be used in the matching process.

In some embodiments, a threshold similarity score may be preconfigured for the processing in 312. A data object field vector has to have at least the threshold similarity score to be considered a match to the component vector. In such an embodiment, it may be possible that none of the field vectors of a mapped data object are considered to match the dynamic component vector, i.e., no field of the matches the GUI screen component. In such a scenario, a new data object may need to be created for the GUI screen for that GUI component. This is further described below with respect to 314.

At 314, it is determined if a new data object is needed. For example, it is possible in some situations that no available data object was deemed to map to the GUI screen in 310. In such a situation, it may be determined in 314 that a new data object needs to be created for the GUI screen. As another example, even though a particular data object is mapped to the GUI screen, it may be determined after performing the processing in 312 that there exists a particular dynamic component on the GUI screen that could not be mapped to any field of the particular data object. Again, in such a scenario, it may be determined in 314, that a new data object needs to be created for the GUI screen, where the new data object includes at least one field that can be mapped to that previously unmapped particular dynamic component of the GUI screen. As part of the processing in 314, a new data object may be created with the requisite fields. The data object may be mapped to the GUI screen and the fields mapped to appropriate components of the GUI screen.

In certain embodiments, the processing performed in 314 may also include determining how to fetch the data to be displayed by the GUI screen from the data object. This may include, for example, identifying a source of the data, any filters or parameters to be used as part of the data fetch operation, and the like. For example, in certain embodiments, the requirements information may be analyzed to identify conditions to be associated with a component of the GUI screen. These conditions may include, for example, conditions to be imposed on data that is fetched for a component. For example, if the GUI component is a list component that displays a list, the conditions may specify the number of items displayed in the list, sort order for the displayed items, and the like. In the implementation version of the application, these conditions may be implemented using filters placed on the data objects which are mapped to functions which take arguments. Information identifying these conditions or filters may be mapped to certain components of the GUI and also to a data object mapped to the GUI, and the information may be included in the application model generated in 316.

At 316, an application model is generated. In certain embodiments, the model stores information related to the processing performed in 302, 304, 306, 308, 310, 312, and 314. For example, the model stores indicative of: the GUI screen identified in 302, the functionality category determined for the GUI screen in 304, the various components of the screen determined in 306, information about data objects, the particular data object that is mapped to the GUI screen as determined in 310, the mappings between fields of the particular data object and components of the GUI screen as determined in 312, information about any new data objects as determined in 314 and information indicative of mappings between the one or more fields of the new data object and the components of the GUI screen, and the like. The model stores information that can be used by a downstream consumer to generate an implementation version of the application, including an executable version of the application GUI that already encompasses mappings between the GUI screen and its components to one or more data objects and the fields within the data objects.

As depicted in FIG. 3 and described above, the requirements information may be subjected to various analyses in order for the model generation system 102 to determine the functionality category for the screen, the components of the screen, mapping of a data object to the screen, mappings of fields of the data object to components of the screen, and the like. Examples of these analyses are described are described below.

As previously indicated, the input requirements information for an application may include one or more mockup images of GUI screens for the application and a text portion describing the requirements for the application.

As described above, the requirements information for an application may comprise screen images, for example, mockups of GUI screens for the application, and a text portion that provides a description of the functions and behavior of the application, including a description of how the screens and the user interface components on the screens behave.

The text portion of the requirements information may be authored by one or more authors and may thus contain different writing styles. The text portion may comprise a description of the one or more GUI screens of the application, the flow and transitions between the multiple screens, and the like. For each screen, the text portion of the requirements information may include information: describing the various screen items or components (e.g., user interface components) on the screen; how the screen is used by the end user; description of the overall screen; identifying constraints, if any, applicable to the screen elements or components (e.g., default number of elements in a list component, filter criteria, sort order); description of the screen components; behavior of each screen component; details of related data objects (e.g., drill down like details of contacts in an Activity business data object); actions to be taken on input including the functions to be performed (e.g., delete, add, close); flow from one screen to another; and the like.

As described above for FIG. 3, the requirements information for an application forms the basis of processing for determining a GUI screen for the application, determining the functionality for a GUI screen, determining components of the GUI screen, for determining what data object to map to the screen, for determining mappings between components of the mapped data object and components of the GUI screen, for determining if a new data object is to be created, and for various other processing performed for generating a model for the application.

In some embodiments, to facilitate the processing, the requirements information may be segregated into a text portion and a set of one or more mockup images. The images may then be subjected to various processing techniques to extract various features of the GUI screens represented by the images. For example, processing may be performed on an image to determine the overall structure and design of the GUI screen represented by the image. Processing may be performed on each GUI screen to extract text information (e.g., text tokens) from the image.

In some embodiments, processing may be performed to determine components of the GUI screen. This may include determining one or more base user interface components and one or more compound user interface components, where a compound component may include multiple base or other compound components.

As part of determining the structure of a GUI screen, processing may be performed to determine containment relationships between the different components. For example, in a particular screen image, a first element or component may be placed within the boundaries of a second component, which in turn may be placed within the boundaries of a third component. Processing may be performed to determine this containment relationship. In the above example, the second component may be considered to contain the first component, and the third component may be considered to contain the second component. A hierarchy of components may thus be determined for a screen image, where the hierarchy contains parent-child relationships between the components on the screen. In such a hierarchy, in certain implementations, a particular component is a parent of another component if the particular component contains the other component within the boundaries of the particular component. Likewise, the other component is considered a child of the particular component if it is positioned within the boundaries of the particular component. For instance, for the example described above, in the corresponding container or component hierarchy, the third component is the parent of the second component, which in turn is the parent of the first component.

In certain embodiments, determining the components hierarchy may include segmenting a GUI screen into individual segments and then obtaining a component hierarchy. Containers, especially for mobile applications, are typically rectangular in shape. These containers can also be identified using various approaches which include shape based or location based approaches or a combination of them. A shaped-based approach may include evaluating outermost closed contours or by identifying rectangular regions (or segments) in an image and then, based upon the positioning of the regions or segments in the image, identifying hierarchical containment relationships between the components. A location based approach may include dilating the images, which merges nearby components into a container and then grouping close by components. Usually a combination of shape based and location based approaches are used to identify containers. Outermost rectangle containers may be identified first followed by identifying rectangles contained within the outermost rectangle containers, and the process may be repeated to identify yet smaller rectangle containers or sub-segments. The use of rectangular shapes or regions is not intended to be limiting. In alternative embodiments, analysis using other shaped regions may be performed to determine the container or elements hierarchy for a screen image.

In certain embodiments, a screen image may be partitioned into a header, body, and a footer partition. Segmentation may then be applied to each partition to identify segments and subsystem-segments and a hierarchy. A screen image may also be processed to extract text portions, icons, user interface components, etc., from the image. A segment may in turn include user interface components or smaller segments. In certain embodiments, the segments or elements hierarchy, along with the placement of the elements or components on a screen, including their proximity to other components, etc., is used later to identify data objects and the data mappings for the screen.

In certain embodiments, the components or elements hierarchy thus obtained may be used to identify constant and dynamic components. Processing may also be performed to replace list elements with a single list item. The dynamic or value components may then be replaced by the static components (e.g., attribute titles such as "Start date", "Title", etc.) where the value is obtained for display. This represents the information hierarchy. The processing performed may use both the text and the image portions of the requirements information.

The text requirements information may be analyzed and processed to extract functionality (or behavior) for the application. This may include determining the functionality for one or more of the screens for the application, and the user interface components on the screens. For each screen, the text requirements information may be analyzed to extract information which is used along with information hierarchy extracted from the GUI screen (e.g., this can help identify attribute details of GUI components which do not have an associated attribute title (e.g., status of appointment "Accept", "Decline", "Reject", which are self-explanatory and do not require title in the GUI in detail view). Other examples are profile picture, name, phone number, etc. This can also help evaluate and auto-correct GUI components for which there was an error in OCR for recognized attribute title text in the image. This can also be used to find the attributes whose values are shown in lists, as attribute header is usually absent in lists.

In certain embodiments, processing techniques such as lemmatization and stemming may be used on the text tokens extracted from the requirements information to find the best matching data object. Sentence segmentation may be performed.

In certain embodiments, the processing depicted in FIG. 3 and described above may be performed by model generation system 102 depicted in FIG. 1. In some embodiments, model generation system 102 may perform the processing based upon rules that may be stored as part of reference information 121 depicted in FIG. 1. These rules may be configured by a user of model generation system 102. For example, rules may be specified that control how to determine a functionality category for a GUI screen. Rules may also be configured to control how the requirements information is to be processed for purposes of generating a model for an application, as depicted in FIG. 3. In certain embodiments, the processing depicted in FIG. 3 or portions thereof may be performed using machine learning techniques. In certain embodiments, a combination of rules-based and machine learning techniques may be used.

Determining a Functionality Category for a GUI Screen

As described above with respect to 304 in FIG. 3, various different ways may be used to determine a functionality category for a GUI screen. Examples of categories include EDIT, LIST, DETAIL, etc.

For example, a list on the screen may be identified by common repeated child GUI components (e.g., as described in "Reverse engineering mobile application user interfaces with REMAUI," by Tuan A. Nguyen et al.) or by identifying separators that are spaced same distance apart. However, in some GUI screens both of these conditions may be satisfied but the GUI screen may not display a list but instead display a detail view of a business object. In some embodiments, the difference between a LIST and a DETAIL functionality category may be determined by using part of speech analysis and performing Named Entity Recognition (NER) on text segments extracted from the GUI screen image.

There are other instances where existing approaches mentioned above fail to properly identify an embedded list from a detail view. For example, consider a GUI screen comprising a mix of embedded lists, such as, a list of Objectives, Invitees, Attachments, etc. and other components. A REMAUI or Separators based approach cannot identify these three embedded lists and that other repeated elements are not lists. In some embodiments, a subtitle identified from the image may be identified as a Noun Plural form. It is also possible to identify the list from the text requirements information by the existence of a list along with its details. The list may be broken on the GUI screen when there is a design change. Additionally the presence of + could be used as a feature to identify embedded lists.

In certain embodiments, the GUI screen may be analyzed to determine whether it is to be categorized as a LIST, DETAIL, or EDIT. For example, if in the body section of a screen, there is only a data selection widget and other standard list-associated filters followed by large list, then it can correspond to list of data objects or children. The Named Entity Recognition (NER) analysis can be done and the list checked for similar types of data. This processing may then be used to distinguish a DETAIL page that appears as list from an actual LIST page. For DETAIL pages that are created using set of custom components or set patterns, they might appear similar to a list. The objects of the list can be extracted from title in header portion if present. If the header exists, then Named Entity Recognition is done on the text. If the text is not data and matches one of the data objects then it is identified as the object shown in list. If the title is not present or the title is data, it is extracted from the requirement text. Additional checks may be performed such as checking for the absence of nouns that are similar to the data object attributes to distinguish LIST from DETAIL page.

In certain embodiments, if it is determined that the GUI screen comprises multiple components (e.g., edit boxes) used for entering values or for editing the entered values, then the GUI screen may be categorized as EDIT functionality.

Identification of Components of a GUI Screen

As described above with respect to 306 in FIG. 3, processing may be performed to determine the components on a GUI screen. These components may include sections of a GUI screen (e.g., a header section, a body section, and a footer section), text tokens (e.g., may be header titles, attribute titles, attribute values), icons, and the like.

Various different techniques may be used to identify the components. For example, in certain embodiments, different techniques described in U.S. Non-Provisional application Ser. No. 15/613,122 may be used. In some embodiments, the requirement information containing text and images may be in a single document with DOM structure. For example, this may be an HTML document, WORD document, and the like, from which text, images and their structure can be extracted. There may be many images corresponding to screen mockups. The structure of header body footer and the top indicator bar can be used to identify the mockup images.

Figure 4:
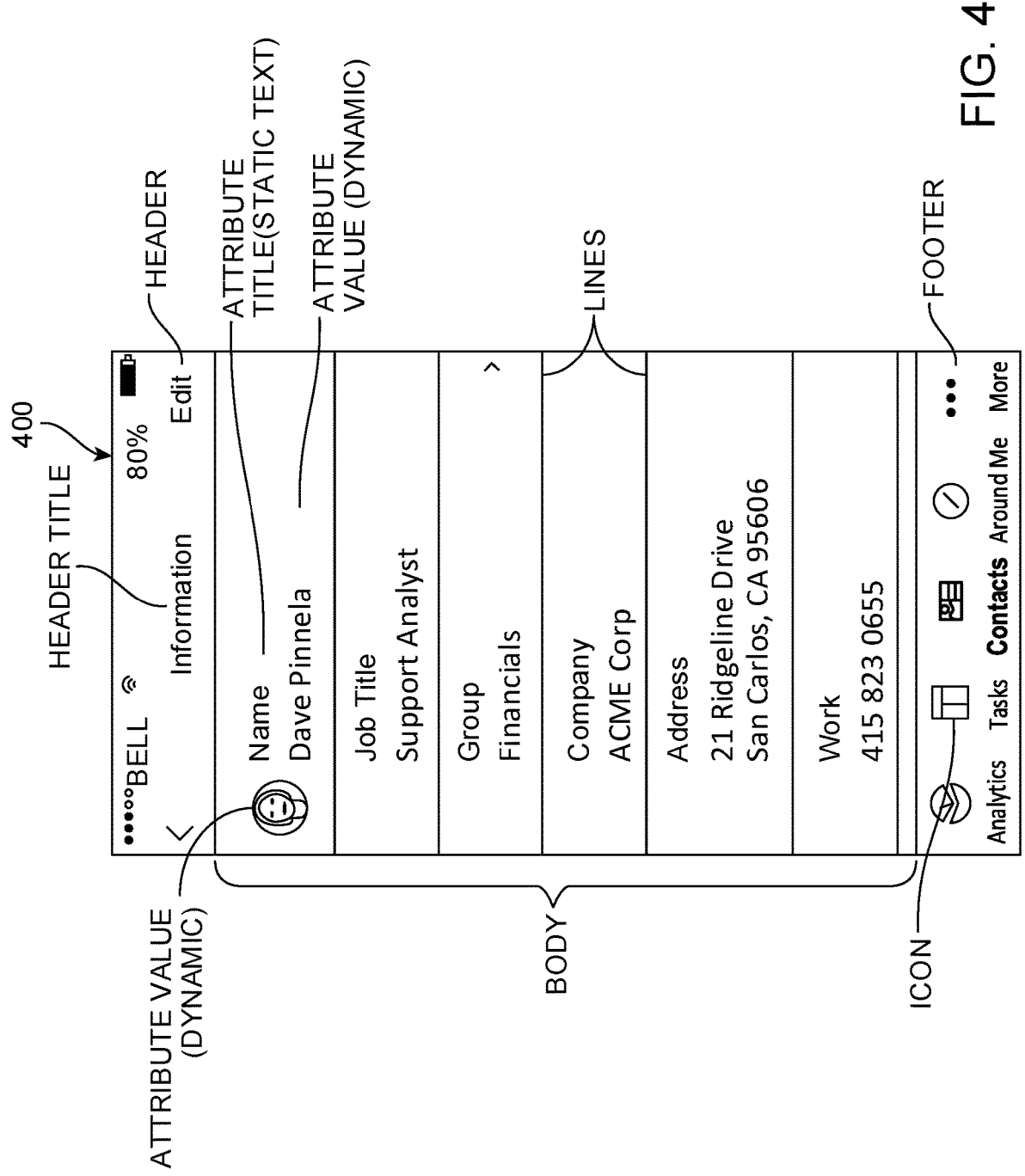
FIG. 4 depicts an example of a mockup image of a GUI screen that may be included in requirements information according to certain embodiments.

FIG. 4 depicts an example of a mockup image 400 of a GUI screen that may be included in requirements information for an application according to certain embodiments. GUI screen 400 comprises multiple components. The components include, for example, a header section, a body section, and a footer section. The components also include a header title text token in the header section, one or more icons in the footer sections, line dividers, text token titles in the body section, text token values in the body section, containers, and the like. The components of GUI screen 400 may be classified as static components or dynamic components. As previously indicated, a static component (also sometimes referred to as a title) is one whose displayed value on the GUI screen does not change for different instances of the data object. A dynamic component (also referred to as a value) is one whose displayed value on the GUI screen may change for different instances of the same data object. Examples of static components in FIG. 4 include: in the header section: header title "Information"; in the body section: attribute titles "Name", "Job Title", "Group", "Company", and the like. Examples of dynamic components in FIG. 4 include: in the body section: attribute values "Dave Pinella" (name of person), the photo of a person, and the like, whose value can changes from one instance of a data object storing information for a first person to another instance of the same data object storing information for a second person. Various different techniques may be used to determine whether a GUI component is a static component or a dynamic component.

Various pieces of information extracted from the requirements information may be used to identify the components for a screen. In some embodiments, related components may be grouped and shown together. There may be zero or more groups of components on a screen and they could appear in different ways on the screen. Similar types of components (e.g., exhibiting some commonality) may also identified._In some embodiments, a hierarchy of components (e.g., container hierarchy) may be determined for components on a screen. This hierarchy may be used to find related components within the screen.

Various different techniques may be used for identifying the components of a GUI screen from requirements information. For example, segments or sub-segments of a screen may be identified based upon the color of the text or icons that appear within the segment, or some other distinguishable design attribute or features (e.g., command links, phone numbers are underlined or highlighted to indicate that action can be done on these elements, etc.). The outermost segments may be, for example, a header segment, a body segment, and a footer segment. Components may be determined within each segment, such as a header title component within a header segment, as shown in FIG. 4. In some instances, segments and sub-segments can be identified based upon lines (e.g., as shown in FIG. 4) under the certain components.

In certain embodiments, certain common patterns (e.g., a map, a form, a table) may be identified and used to identify GUI components within a screen. For example, if the screen image contains a list view which occupies a major part of the image, then the title associated with the list view is identified. This title component may then be used to identify a data object to be mapped to the GUI screen. In some embodiments, a header title determined from the header section of a screen may be used later to identify a data object to be mapped to the screen.

A screen may comprise one or more buttons as components of the screen. Due to the size and shape of buttons and the limited screen real estate available for displaying buttons, especially for a mobile application, buttons typically are associated with single words. The words may identify the action to be performed when that button is selected. As a result, these words are typically verbs that identify the action to perform. The words used for buttons, especially for commonly performed tasks, may be specific to a platform. For example, Apple's Human Interface Guidelines web page shows commonly used verbs associated with buttons for the iOS® platform. Accordingly, text associated with a button is typically in the form of a verb, generally the base form of a verb (e.g., delete, open, find). This characteristic may be used to identify one or more buttons from a screen image. It should be understood that not all verbs displayed on a screen correspond to buttons.

Verbs appearing on a screen image in the form of the present (e.g., deleting, opening, finding) or the past participle (e.g., deleted, opened, found) are normally used to show the status. This characteristic may be used to find components of a screen that show status information. Accordingly, as part of the processing in the GUI components identification phase, text portions may be extracted from a mockup screen image in the requirements information and the text portions may be tagged with a part of speech tag identifying the part of speech for the text portion. Table B below shows examples of parts of speech and, for each part of speech, examples of text (e.g., words) corresponding to that part of speech. Table B is only an example and is not intended to be limiting. In certain embodiments, a parts of speech classifier may be used to identify the part of speech for a text portion and tag the text portion with the identified part of speech.

TABLE B

Examples of parts of speech and text examples

| Part of Speech | Words |
| --- | --- |
| VB (Verb, base form) | Delete, Submit, Add, Start, Apply, Approve, Agree, Refresh, Reset, Edit, Search, Continue, Proceed, Dismiss, Withdraw, Remove, Qualify, Cancel, Retire, Accept, Create, Reject, Retry, Convert, Disagree |
| VBN (Verb, past participle) | E-mailed, Mismatched, Reported, Expected, Selected, Updated, Created, Done |
| IN (Preposition) | About, From, for |
| VBZ (Verb, 3rd person singular present) | Occurs |
| RB (Adverb) | Maybe, Back, Now, Never, Close |
| VBG (Verb, gerund or present participle) | Warning, Ascending, Descending, Upcoming |
| UH (Interjection) | OK, Yes, No |
| JJ (Adjective) | Previous, Unclosed, Sorry, Critical, Private, OVERDUE, Complete, Next |
| NN (Noun, singular or mass) | Appointment, Mile, Status, Analysis, Author, Prefix, Relationship, State, End, Opportunity, Home, Return, Profile, Amount, Default, Task, Sort, Radius, Function, Phone, Tue, Host, Currency, Demo, Dashboard, Tentative, Password, Work, Country, Help, Lead, Type, Day, None, Share, Order, Yesterday, Priority, Catalog, Message, TODAY, Date, Today, Summary, Customer, Product, Note, PAST, Week, Set, Kilometer, Version, List, Springboard, Sandbox, Number, Post, Address, Membership, Tomorrow, Map, Interval, Upload, Folder, City, Detail, Error, Decline, Owner, E-Mail, Configuration, Activity, Month, character, Logout, Team, Call, Progress, Navigator, Calendar, Frequency, Name, Industry, Household, Subject, Location, Account, Description, Partner, Recurrence, Category, Source, Quantity, Contact |
| NNS (Noun, plural) | Leads, characters, Forecasts, Organizations, Attendees, Activities, Invitees, Settings, INVITEES, Households, RESOURCES, Opportunities, Analytics, appointments, Details, Partners, Deals, Competitors, Relationships, Notes, Ellipses, Customers, Objectives, Commissions, Days, Accounts, CONTACTS, Attachments, Messages, Documents, Quotes, Products, Contacts, OBJECTIVES, Ends, Resources, Favorites, Tasks |
| NNP (Proper noun, singular) | Social, Rank, Organization, Select, Port, Mobile, Save, Voice, |
| NNPS (Proper noun, plural) | Infolets, Industries |

In Table B shown above, the underlined words refer to verbs or other parts of speech that are typically associated with buttons. Accordingly, as part of the processing, model generation system 102 may be configured to identify words associated with these parts of speech and identify a bounding region of the screen image containing such words as buttons. The text that occurs in the header and at the bottom of text is more likely to be a button. In some embodiments, for text segments extracted features like the number of words, the part of speech tags, design information, location information, matching of prior button design etc. can be used as input for a machine learning classifier to make a decision whether it is a button.

On different platforms (e.g., iOS®, Android®) there could be different combinations of basic GUI components that are combined together to form a single GUI compound component. These compound components may be present as basic components as they are commonly found in GUIs of applications made using that platform (e.g., Title and Text component, popup, map, data selector widget in Oracle Mobile Application Framework (MAF) and occur mainly in Enterprise applications). In the components identification phase, independent components and/or groups of components may be identified. A group may include, for example, a popup, a map, a set of tabs, etc. Various other groups may be identified. Typically, a group includes components that are related to each other. Commonality between groups may be identified.

In some embodiments, commonality between the components may be identified. For example, for text and message components, the title and value design and alignment are decided by the Cascading Style Sheets (CSS) styling and they may be identified by the aspects of the components. Accordingly, in some embodiments, different types of compound components may be identified using the features that are extracted from these components. Examples of the compound components identified in such a manner may include popup, maps, selector widgets, and the like. Features may also be extracted from the contents of the GUI components such as speech tags and named entity recognition and these may be used to identify components which may not be present directly as a visually repeatable component.

A GUI screen for an application may include zero or more data selector widgets or elements that are used to select multiple sets of data on the screen. Examples of data selector widgets include tabs, function drop down lists in a header, etc. The type of data selector widgets for an application may depend upon the platform (e.g., iOS®, Android®) for which the application is to be developed. These data selectors are usually grouped together and only one of which is active at a time. In order to achieve the look-and-feel that they are grouped, they either touch each other or have a common container horizontally. This can be identified by the color of the text or icons that appear within the segments, with one of them different, indicative of the active data selector. In few other designs, the data selectors may be identified by lines under the selected components. Identification of data selector GUI components or elements may be used to load required data that is to be displayed in different tabs.

In certain embodiments, compound components may exist that are formed by general pattern of increment/decrement operations (+ and − OR up and down arrows and may sandwich another GUI element or component between it). These can also be identified by looking for these icons on the sides of the GUI component. These are sometimes referred to as pickers. The type of data present may be extracted and understood using named entity recognizer or other means. In some platforms, the + and − signs may be present as the previous and next values to indicate increment and decrement function. Depending on platforms additional check can be made for wheel type UI.

Figure 5:
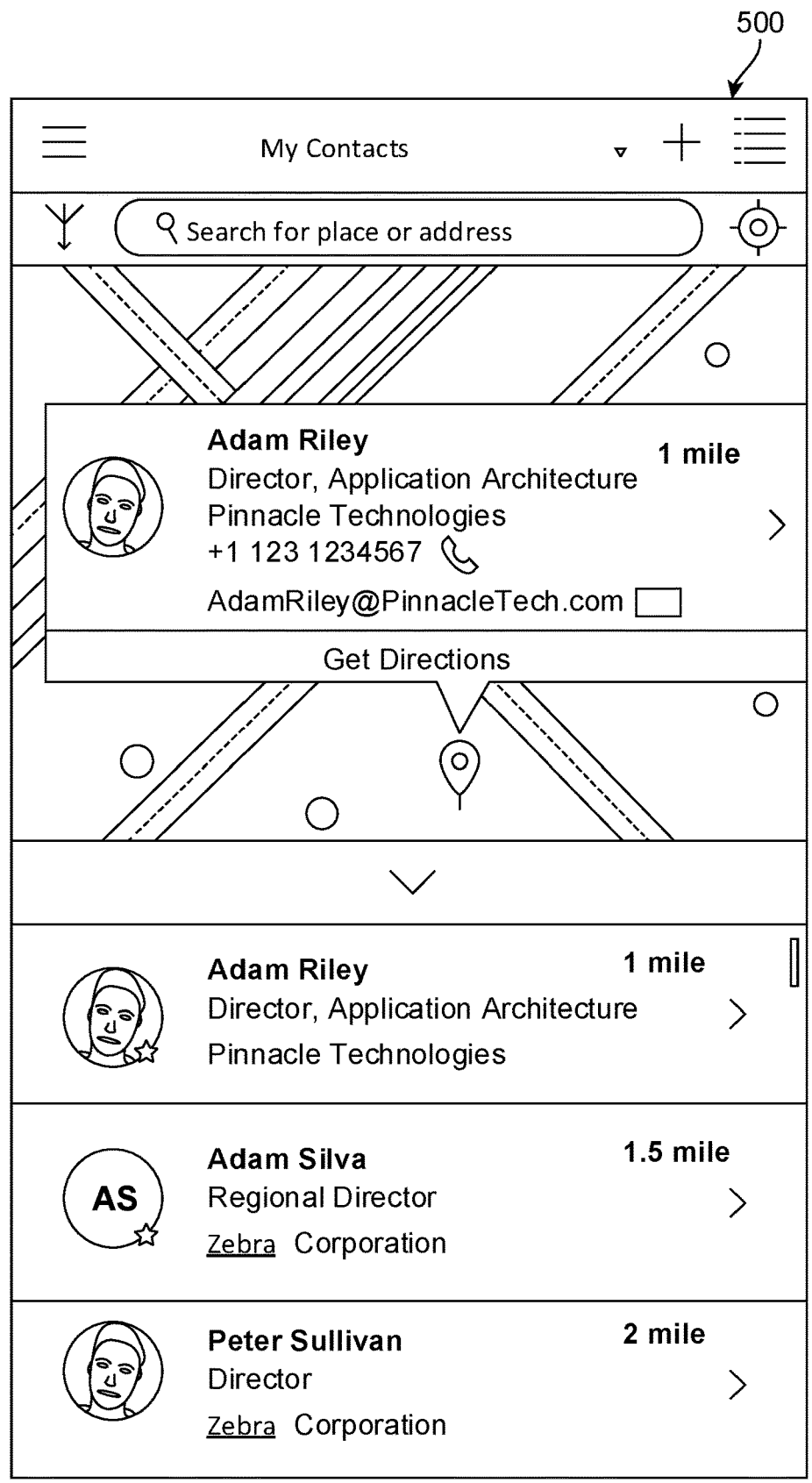
FIG. 5 depicts a mockup image of a GUI screen comprising a map that may be included in requirements information for an application.

As indicated above, in certain embodiments, common patterns (e.g., a map, a form, a table) may be identified and used to identify user interface components within a screen image. For example, a screen image may be identified as containing a map. FIG. 5 shows a mockup image of a GUI screen 500 comprising a map. A map usually is displayed in a specific color (e.g., a lighter color and often in few shades of yellow). A map may thus be identified based upon the background color. In some embodiment, a screen mockup in the requirements information is search for regions with these color ranges. There may be small region patches of the background color that is used to detect the map region in profile picture or icons. The maps are comparatively large in size. By filtering based on size of these patches, these falsely detected regions can be filtered out.

Further, a map typically includes icons to show location on the map. The details of information at a location on the map is shown either on invoking the marker or icon or by default when the map is shown. The marker icon can be identified and the details that are shown at the location on the map. Since the markers are distinctly brighter than the background map, thresholding may be performed on a map region in the screen image to identify one or more location icons displayed on the map. In certain embodiments, thresholding can also be done using Otsu's algorithm (e.g., Nobuyuki Otsu (1979). "A threshold selection method from gray-level histograms," IEEE Trans. Sys., Man., Cyber.). There are typically lines and small text on the map region. In certain embodiments, the map region between these lines and texts are processed by blurring using dilation or by using morphological operation using rectangular component so that patches in the map regions are merged. In some embodiments, on selecting the marker, the detail of content is shown at the location where the marker is located (e.g., in case of appointment, the marker indicates the appointment location on the map. On selecting the marker, the details of appointment like subject of appointment, time, location name, accept status may be shown over the map region as popup or overlay on map region). Thresholding is done on map region. It is identified from the container hierarchy in the region identified after thresholding using the rectangular boundaries or closed contours followed by the identification of GUI elements described in the early part of the document. The text regions may be replaced with the background color before identifying the containers. The exact information and attributes used to display in this container are then identified.

The data that is shown on the map could be a list (e.g., a list of customers near my location) or may be single data typically details on a particular data (e.g., location of an appointment). For example, a single marker icon and detail shown for the location, or, in other instances, a list of markers may be shown. By identifying the marker icon correctly, a decision can be made regarding whether the data that is required for value is a single element or a list. In some embodiments like enterprise applications, maps are used to show the list of a particular type of business object or details of one particular business object. Examples of list of business objects are the list of accounts or opportunities near me or the location of my list of appointments. The detail at the marker may show detail of the account, opportunity or appointment at the location. The input image in the requirements information may have been generated using some imaging or editing software such as Adobe Photoshop, GIMP, etc., where the images may be built using layers. In this case the marker icon may be a layer.

In some embodiments, the disconnected regions and the small text on the map region may then be merged using a morphological operation. Container identification may then be performed. The processing may identify multiple segments: a first on the top and another on the bottom. The first one can be extracted as the map segment based on the amount of pixels with color that is within the map background color region. The container hierarchy can be extracted and the innermost container that has the identified colors present can also be used to identify the exact map region.

As part of analyzing the images in the requirements information, one type of pattern or image that may be recognized is a pop-up, which is typically used to show a message or information to a user. In certain embodiments, a pop-up may be identified by removing the blurred background on an image and checking for common patterns or the position it is shown within a body segment of the GUI screen. The background for the image may be removed by thresholding using Otsu's algorithm. In alternative embodiments, thresholding may be done by calculating the moments. A canny edge detector technique may also be used to find the edges and outermost contours or rectangles may be drawn to identify the outer most container. The patterns or locations of these rectangular containers may then be used to evaluate if the popup is present. The popup for options are shown at different location. Moments may be used for thresholding. Additionally, the histogram of the image can be obtained and the range of percentage of values in the darker range can also be used as a feature to confirm the existence of a popup.

Figure 6:
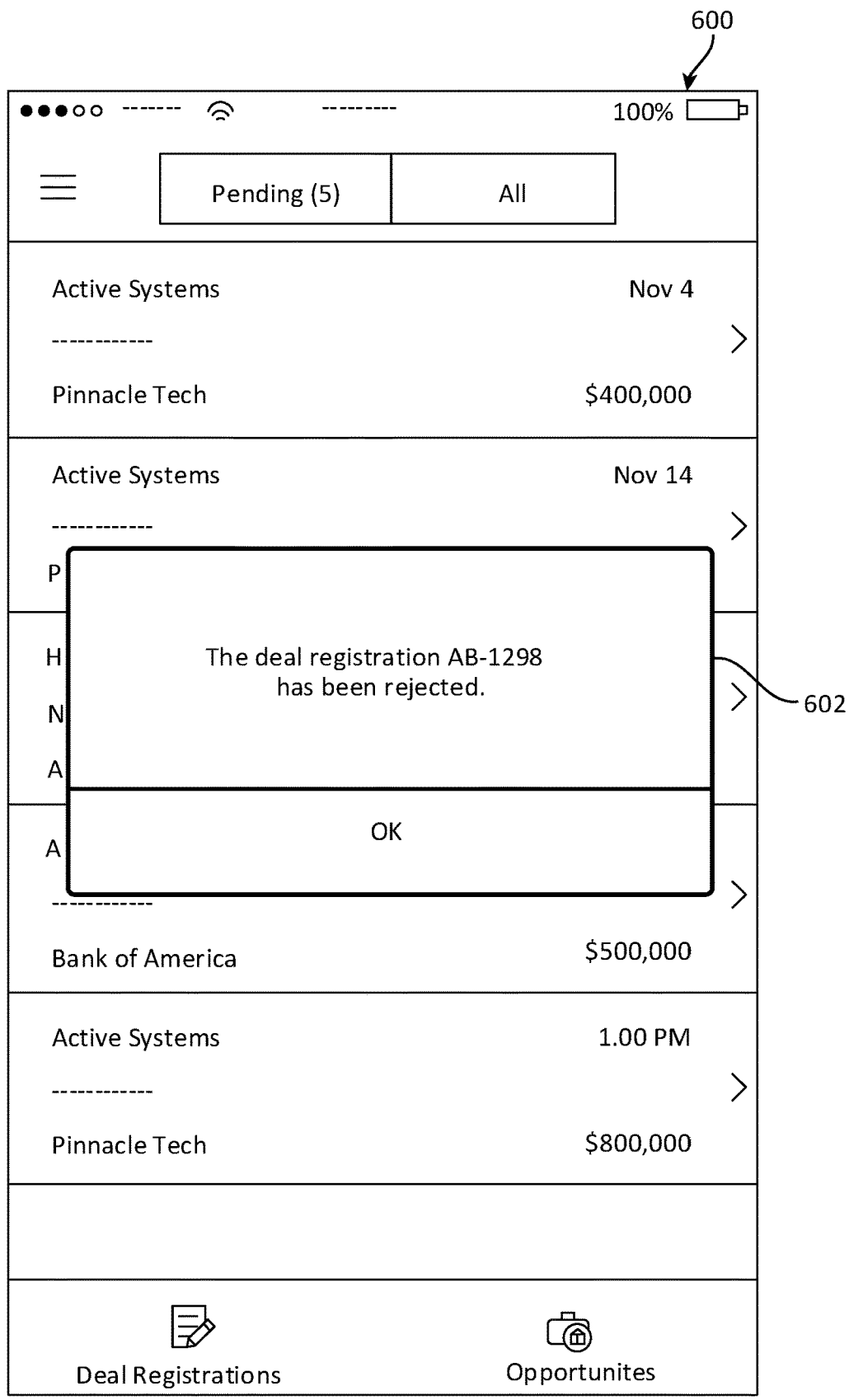
FIG. 6 depicts a mockup image of a GUI screen comprising a pop-up that may be included in requirements information for an application.

For example, as depicted in FIG. 6, the requirements information may include a mockup image of a GUI screen 600 comprising a pop-up 602. The pop-up window may be displayed over a dimmed background to put the focus on the popup or the message. The background can be removed by thresholding, using for example, Otsu's algorithm. In certain embodiments, the predefined location at which the pop-up or message appears can be used to identify the pop-up and the background. The moment is then calculated for thresholding and a rectangle may be drawn designating the pop-up area. If the rectangle is in the center of the image or at the bottom center region with a Cancel button, the rectangle can be assumed to be a popup. In certain instances, a custom popup may be identified based on a shape that is shown in multiple screen images. For example, a dialog box may appear at different locations in the images in requirements information based on the platform for the application. Thresholding may be used to identify such pop-ups.

Existing approaches identify list by common repeated child GUI elements ("Reverse engineering mobile application user interfaces with REMAUI," by Tuan A. Nguyen et al.) or by identifying separators that are spaced same distance apart (previous patent application). Both these conditions are satisfied in the image below, but a human looking at the image below can identify that it is in fact a detail view of business object. This is because we take into consideration the content of the text present. We segregate the LIST and DETAIL functionality by using part of speech and Named Entity Recognition of text segments as features.

In some embodiments, a screen categorized as DETAIL functionality may be handled differently from a screen categorized as EDIT functionality. In DETAIL and LIST functionality, some of the attribute headers may be present. From the text tokens identified from a mockup GUI, first the buttons may be identified, as described above. The remaining text components extracted from the screen image may then be categorized into static or dynamic components. The static text components are usually the attribute titles. Where possible, the attribute titles are extracted. By considering these text tokens independently, three features which can identify the attribute titles include using Named Entity Recognition, Part of Speech tagging and the number of words in the text token.

Named Entity Recognition (NER): Usually the attribute values or dynamic text tokens contain Names of Person, Dates, Company names, etc. Named Entity Recognizer can be used to identify the various entities. If NER analysis identifies an entity in a text token, then that text token is most likely to be an attribute value, i.e., a dynamic component. Such text tokens can be removed from the candidates for attribute titles. The named entity tagger may identify location, organization, date, time, money, person, percent, product and time associated with the text tokens. This can be extended to other standard patterns of values like email address, phone number, etc. If a token has a Name or Entity recognized in it, the complete token is considered as a value, (e.g., if the token was "Sales Meeting with JK Steel" and the NER output was "Sales Meeting with <ORGANIZATION>JK Steel</ORGANIZATION>", then this token is not considered an attribute title but rather an attribute value).

Number of words: An attribute title is typically a short text label positioned on a screen near an attribute value so that a user of the screen understands what the attribute value indicates. For example, in FIG. 4, the "Name" text label represents an attribute title that is placed proximal to an attribute value "Dave Pinnela". Especially for mobile applications, where the space available to display the content on a mobile device is limited, a very short text is typically used to represent an attribute value, typically comprising two words or less.

Part of Speech tagging: Attribute titles are usually nouns with an adjective. For lists, the titles are usually in Noun Plural form. Usually the text where the status is involved, VBG (verb, gerund or present participle) form occurs. Part of speech tags of few short texts are shown below in Table C.

TABLE C

Part of speech tagging

| Input Text Token | Part of speech tagging | Part of speech tagging |
|---|---|---|
| Subject | Subject_NN | Noun, singular |
| Due date | Due_JJ Date_NN | Adjective, Proper noun |
| Type | Type_NN | Noun, singular |
| Meeting | Meeting_VBG | Verb, gerund or present participle |
| Owner | Owner_NNP | Proper noun |
| Priority | Priority_NN | Noun, singular |
| Medium | Medium_NN | Noun, singular |
| Status | Status_NN | Noun, singular |
| Not Started | Not_RB Started_VBN | Adverb, Verb, past participle |
| Account | Account_NNP | Proper noun |
| Opportunity | Opportunity_NNP | Proper noun |
| Lead | Lead_JJ | Adjective |
| Primary Contact | Primary_JJ Contact_NN | Adjective, Proper noun |
| Description | Description_NN | Noun, singular |
| Objectives | Objectives_NNS | Noun plural |
| No Objectives | No_DT objectives_NNS | Determiner, Noun plural |
| Resources | Resources_NNPS | Noun plural |
| No Resources | No_DT Resources_NNPS | Determiner, Noun plural |
| Contacts | Contacts_NNS | Noun plural |
| Attachments | Attachments_NNS | Noun plural |
| No Attachments | No_DT Attachments_NNS | Determiner, Noun plural |

Apart from the above features extracted from text tokens considering them independently, features can also be extracted from the context in which the text tokens occur. For example, some contexts are described below.

Neighboring GUI Element: A text token might be close to some types of GUI elements or components. For example, an "On-Off" switch is a GUI element that does not appear without an attribute title. For example, the turning on or off has to be in the context of some property (that is being turned on or off) and this property needs to be explicitly mentioned as an attribute title. A drop down is another GUI element that is accompanied by an attribute title. So a text token located near a drop down can be extracted as an attribute title (a static component).

Container elements: For a screen categorized as an EDIT screen or a DETAIL screen, if there is a container with one text token with any of the features above of the attribute title and all others being attribute values, then the text token can be taken as attribute title. In case of EDIT functionality, it would just be an attribute title and an edit text GUI element.

Further, typically, texts with similar functionality are typically of the same design. For example, an attribute value may take many forms representing an on-off switch, a profile picture, normal text, a web link, etc. A text token which is an attribute value can indicate an operation on it, like a web link which might be different in design from other attribute values which cannot be clicked. However, attribute titles usually have a common design. The same can also be attribute values if we can identify all the Named Entity Tokens correctly.

Title Design: If the attribute titles can be identified with a high probability of them being attribute titles, the design of any of these titles can be extracted. The other attribute titles can then be inferred by identifying the text tokens which have the same design. Since an application, in general, has the same design for its different screens, the design from one screen may be used for other screens. Another possible variant of this approach is to cluster all the text tokens in the mockup GUI screen by design parameters (e.g., font color, font size, alignment in container, horizontal and vertical ordering of the text token in container, background color, etc.). The attribute titles typically form a single cluster. All elements of a particular type can be identified by identifying one element of the type and then filtering the elements containing the same design.

Similarity Match: This is another feature that can be used for identifying attribute titles (static text components). In some embodiments, a text token extracted from a GUI screen image may also be added with an additional entity identified by a Named Entity Recognizer for a comparison operation (e.g., the attribute or field in the data object would be "Start Date", but in the text token mockup screen it may just be labeled (i.e., the attribute title may be) "Start"). A user of the screen may see the attribute value as "12-Oct-2017" and infer it as a start date though only "Start" is shown on the GUI screen. The same can also be taken in to consideration if the type of data is also present in the DESCRIBE call for the data object. Some of the attribute titles might be exactly repeated. It is possible to form a set of all attribute titles of existing data objects and make a comparison to see if any already exist.

Figure 8:
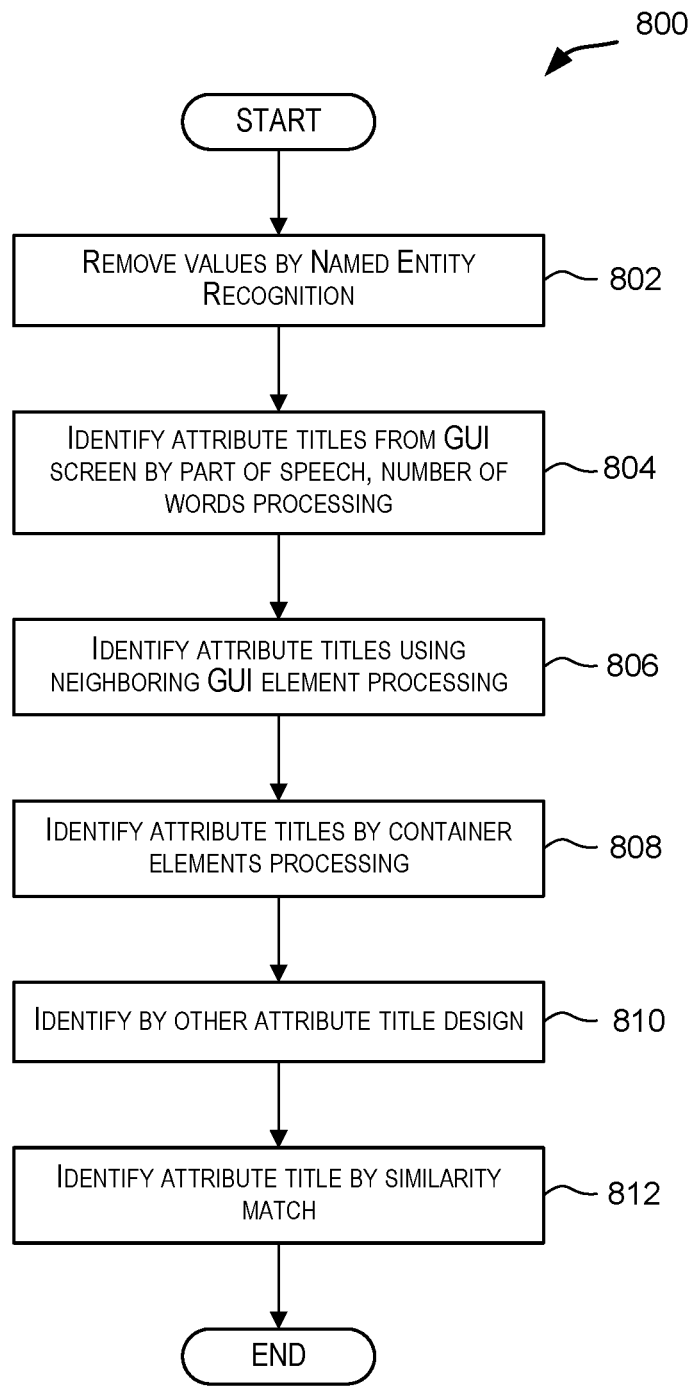
FIG. 8 depicts a simplified flowchart depicting high-level processing performed for extracting attribute titles from requirements information according to certain embodiments.

FIG. 8 depicts a simplified flowchart 800 depicting high-level processing performed for extracting attribute titles from requirements information according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 8 may be performed by model generation system 102.

At 802, from the text tokens extracted from a GUI screen image, those text tokens that are considered attribute values are removed by performing NER processing on the extracted text tokens. At 804, the leftover text tokens are processed using part of speech processing, number of words processing, and the like. At 806, attribute titles may be identified using neighboring GUI element processing. At 808, attribute titles may be identified using container elements processing. At 810, attribute title design styles may be determined and used to find other attribute titles. At 812, similarity match may be used to find attribute titles.

Figure 9:
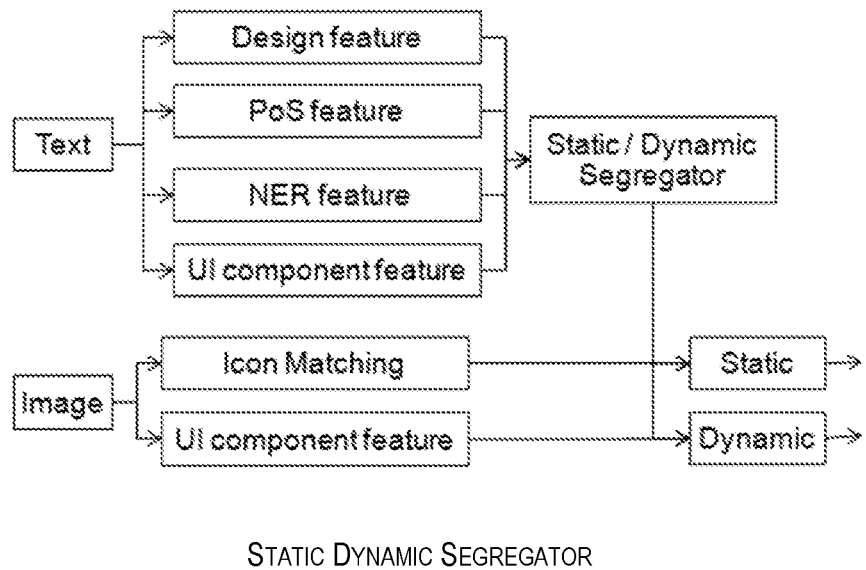
FIG. 9 depicts a high level approach for segregating static components and dynamic components according to certain embodiments.

Attribute titles are generally static and do not change. Accordingly, for the text tokens extracted from a GUI screen, features determined for the text tokens may be used to segregate the text tokens into static components and dynamic components. FIG. 9 depicts a high level approach for segregating static components and dynamic components according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 9 may be performed by a static/dynamic segregator subsystem that may be part of model generation system 102.

As shown in FIG. 9, various features may be extracted from the text portion of the requirements information such as design features, part of speech (PoS) features, NER features, component analysis features. Likewise, the image included in the requirements information may be subjected to various types of processing, such as icon matching, GUI components extractions, etc. The results of the text portion processing and the image portion processing may be provided to a static/dynamic segregator module that is configured to classify a component as a static component (e.g., attribute title) or a dynamic component (e.g., attribute value).

In some embodiments, the static/dynamic segregator may be a machine learning classifier that uses machine learning techniques to do the classification. In some instances, the image icons can also be replaced by their tags. For example a phone icon can be both an attribute value (only the icon is shown and user clicks it to make the call), attribute title (phone icon is not clickable but the phone number next to it is clickable to make the call) or both (only the phone icon is present and the user can click on it to make the call).

In certain embodiments, a screen categorized as an EDIT or DETAIL functionality screen could have an embedded list in it. Such a list typically occurs with a title. The title is usually in a noun plural form, for example, Objectives, Resources, Contacts, Attachments, etc. The types of icons that appear along with header title for LIST functionality are also applicable for embedded lists. Once the embedded list titles are identified, the containers below can be considered as list items, and a design break can be used to find the end of the list items/list.

Figure 11:
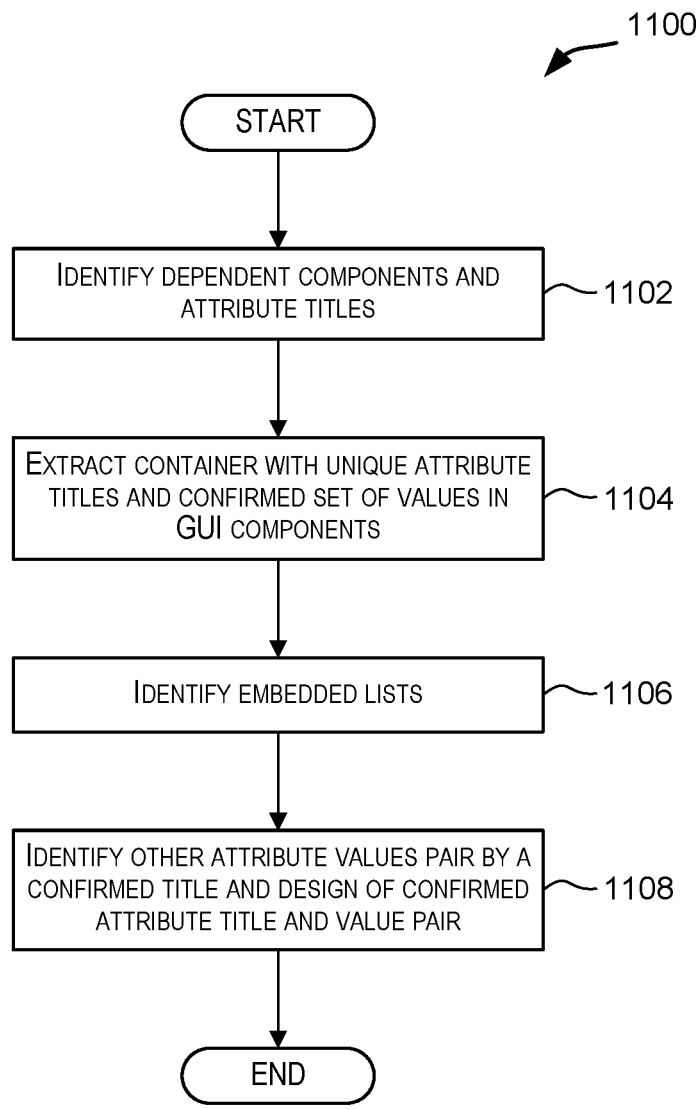
FIG. 11 depicts a simplified flowchart depicting high-level processing performed for determining the UI structure of a GUI screen according to certain embodiments.

In certain embodiments, as part of determining the components of a GUI screen, the overall user interface structure of the GUI screen is determined. This then enables grouping of components extracted from the GUI screen. FIG. 11 depicts a simplified flowchart 1100 depicting high-level processing performed for determining the UI structure of a GUI screen according to certain embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 11 may be performed by model generation system 102.

Figures 12A, 12B:
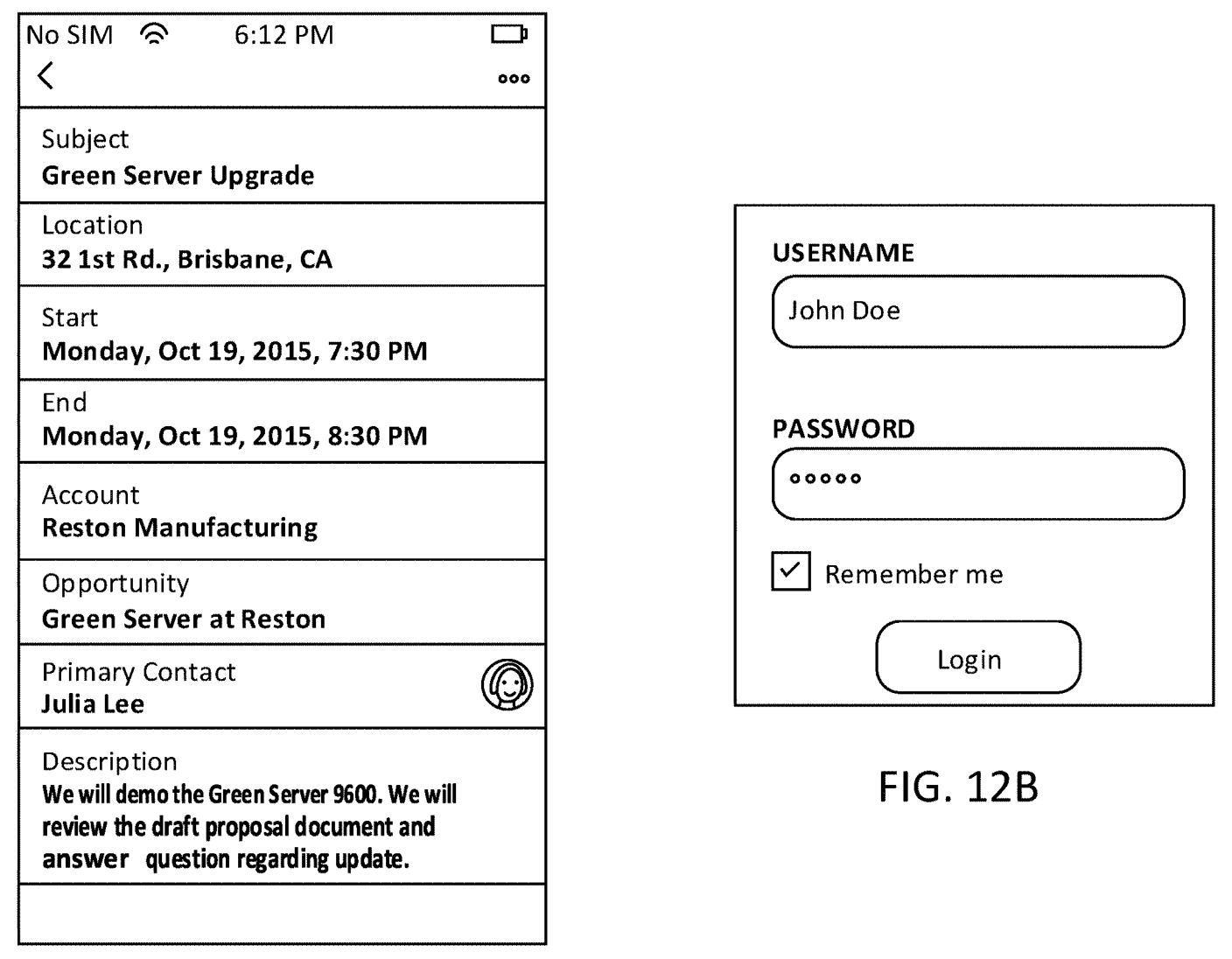
Figure 12D:
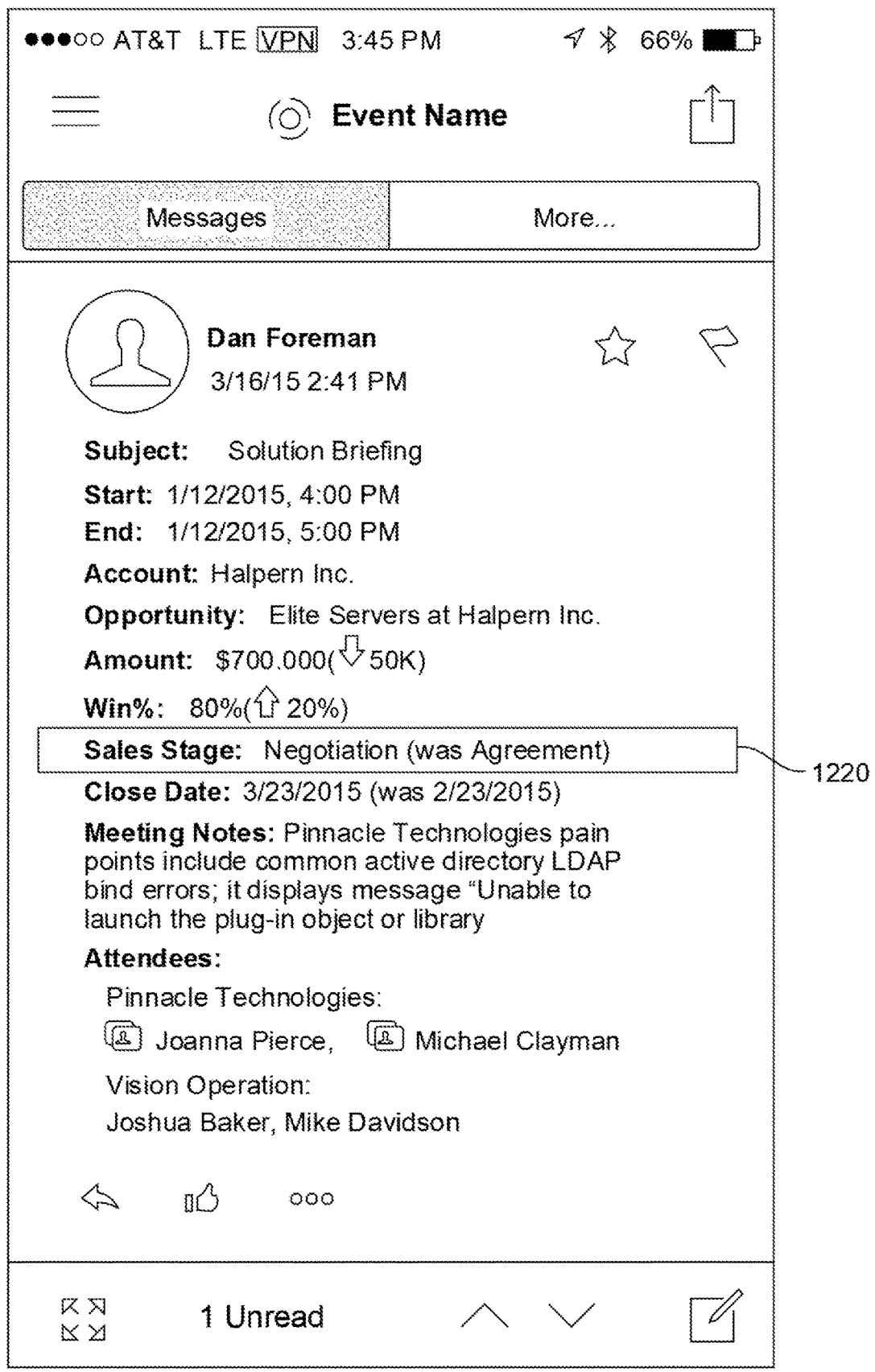

As shown in FIG. 11, at 1102, dependent components (e.g., a switch button) and the nearest attribute titles within the same container are identified. At 1104, the method identifies containers with confirmed one attribute title and a set of attribute values are identified. This may take several forms including an attribute title and value in a DETAIL page. For example, for the example GUI screen shown in FIG. 12A, "Subject", "Location", "Start" etc. have an attribute title and attribute value in the containers. In case of "Primary Contact" there are two attribute values which are "Julia Lee" and the profile picture. For the example shown in FIG. 12B, for a GUI screen categorized as EDIT functionality, an attribute title could be associated with an edit text GUI component for entering text, and provide a hint of the text (Username/Password) entered in the edit box GUI component. In some embodiments, the details about the attribute title text token and attribute value text token and their relative arrangement with the container they occur can be used to filter out any false positives.

In the case of EDIT and DETAIL functionality screens, the containers are identified that contain text token which is an attribute title in plural form. There could be other icons within this container like "+". In some embodiments, this then may be checked along with design of the titles of embedded lists in other identified screens to confirm as a title (e.g., "Objectives", "Invitees", "Attachments" have Noun plural form in the "Appointment Detail" screen shown in FIG. 12C). In some embodiments, the response of the DESCRIBE of the business object, the attribute value will contain details to indicate that the value is a list of contents.

For the example GUI screen shown in FIG. 12C, the image notification bar may be stripped out and the image segmented to identify containers. For example, Hough transform may be used to identify separators for identifying segments. The first segment may be identified and extracted as the header section. Identification of standard icons, profile picture and predefined user interface components like switch button is done next. The attribute titles are identified. The switch button can be identified and "Private" forms first confirmed header.

In certain embodiments, the text tokens extracted from the screen may be subjected to NER processing. An example of the NER output for the example GUI screen shown in FIG. 12C is shown in Table D below.

TABLE D

NER Output for FIG. 12C Screen
Mobile Sales Cloud Application

| Input Text Token | Named Entity Recognition Output | Identified as data |
| --- | --- | --- |
| 8:00AM | 8:00AM | No |
| Sales Meeting with JK Steel | Sales Meeting with <ORGANIZATION>JK Steel</ORGANIZATION> | Yes |
| To | To | No |
| 9:00 AM | 9:00 AM | No |
| 1415 17th Ave, Denver, CO | 1415 17th Ave, <LOCATION>Denver</LOCATION>, CO | Yes |
| Type | Type | No |
| Meeting | Meeting | No |
| Start | Start | No |
| Thursday, 1/19/2015, 8:00 AM | <DATE>Thursday</DATE>, 1/19/2015, 8:00 AM | Yes |
| End | End | No |
| Thursday, 1/19/2015, 9:00 AM | <DATE>Thursday</DATE>, 1/19/2015, 9:00 AM | Yes |
| Account | Account | No |
| Halpern, Inc. | <ORGANIZATION>Halpern, Inc</ORGANIZATION> | Yes |
| Opportunity | Opportunity | No |
| Elite Sewers at Halpern, Inc. | Elite Sewers at <ORGANIZATION>Halpern, Inc</ORGANIZATION>. | Yes |
| Lead | Lead | No |
| Elite Sewers at Halpern, Inc. | Elite Servers at <ORGANIZATION>Halpern, Inc</ORGANIZATION>. | Yes |
| Primary Contact | Primary Contact | No |
| Joshua Baker | <PERSON>Joshua Baker</PERSON> | Yes |
| Owner | Owner | No |
| Lisa Jones | <PERSON>Lisa Jones</PERSON> | Yes |
| Description | Description | No |
| We will demo the Green Server 9600 and review the draft proposal document and presentation. | We will demo the <ORGANIZATION>Green Server</ORGANIZATION> 9600 and review the draft proposal document and presentation | Yes |
| Private | Private | No |
| Objectives | Objectives | No |
| Check contact's digital activity | Check contact's digital activity | No |
| Check server requests | Check server requests | No |
| Create quote | Create quote | No |
| Invitees | Invitees | No |
| Joshua Baker | <PERSON>Joshua Baker</PERSON> | Yes |
| Senior Project Manager | Senior Project Manager | No |
| Michael Clayman | <PERSON>Michael Clayman</PERSON> | Yes |
| Project Manager | Project Manager | No |
| Mike Davidson | <PERSON>Mike Davidson</PERSON> | Yes |
| Senior Project Manager | Senior Project Manager | No |
| Attachments | Attachments | No |
| Example Document | Example Document | No |
| Joshua Goldman | <PERSON>Joshua Goldman</PERSON> | Yes |
| 5:12 PM | 5:12 PM | No |

If the segments that contain "Start", "End", "Account", "Opportunity", "Lead", "Description", etc. are considered, they contain only one data and another text with default icons. These together form the confirmed headers. The design information is extracted from these confirmed headers. This is then used to identify the segments which have only text pairs and one of them of being the same design as header which identifies "Type", "Description". The "Primary Contact", "Owner" can be identified from design that contain three user interface components of which one is confirmed header design and remaining are values. The profile picture, maps are considered value user interface components.

The segments that contain only one text may be considered next (e.g. "Objectives", "Invitees", "Attachments", "Check contact's digital activity", "Check server requests", "Create quote". The output of part of speech tagger for this example is shown below in TABLE E. The output of part of speech tagger for other text components in the example in FIG. 12C is shown below in TABLE F.

TABLE E

Part of Speech Tagging for FIG. 12C Screen (single row elements)

| Input Text Token | Part of speech tagging | Identified as data |
|---|---|---|
| Objectives | Objectives_NNS | Noun plural |
| Invitees | Invitees_NNS | Noun plural |
| Attachments | Attachments_NNS | Noun plural |
| Check contact's digital activity | Check_VB contact_NN 's_POS digital_JJ activity_NN | Verb base form, Noun singular, Adjective, Noun singular |
| Check server requests | Check_VB server_NN requests_NNS | Verb base form, Noun singular, Noun plural |
| Create quote | Create_VB quote_NN | Yes |

TABLE F

Part of Speech Tagging for text components in FIG. 12C Screen

| Input Text Token | Part of speech tagging | Identified type |
|---|---|---|
| Joshua Baker | <PERSON>Joshua Baker</PERSON> | Person |
| Senior Project Manager | Senior Project Manager | |
| Michael Clayman | <PERSON>Michael Clayman</PERSON> | Person |
| Project Manager | Project Manager | |
| Mike Davidson | <PERSON>Mike Davidson</PERSON> | Person |
| Senior Project Manager | Senior Project Manager | |

Referring back to FIG. 11, at 1106, any embedded lists are identified. For example, using the feature that the titles usually have lesser number of words and are in noun format, it can be inferred that the "Objectives", Invitees", Attachments" are attribute titles. Since these are in plural form, the below items are an embedded list. The segments below these sub-titles are analyzed for lists. The lists can be identified by common patterns in segments below. The "Attachments" is a list, but in UX spec there is only one element shown. We identify the embedded lists for DETAIL and EDIT functionality.

With the above described approach, an embedded list can be identified with high accuracy. In certain embodiments, different naming conventions may be used, such as those shown in E. Enslen, E. Hill, L. Pollock, and K. Vijay-Shanker, "Mining Source Code to Automatically Split Identifiers for Software Analysis," Intl Working Conf. on Mining Software Repositories (MSR), 2009. The max-match segmentation algorithm can also be used. The max-match could also be used if camel case is not followed.

At 1108, other attribute value pairs may be identified by a confirmed title and design of confirmed attribute title and value pair.

In certain embodiments, processing performed for determining the components of a GUI screen may include the following phases:
A. Tokenization
B. Hierarchy Identification
C. Design and Named Entity Recognition Feature
D. Part Of Speech and Named Entity Recognition Feature
   A. Tokenization Tokenization is used to extract text token components from a GUI screen image. Tokenization refers to the grouping of text to form meaningful chunks. For example, for the GUI screen image depicted in FIG. 12D, line 1220 "Sales Stage: Negotiation (was Agreement)" may be extracted from processing the image as a line text token. However, it is more meaningful if the line is instead extracted as two separate tokens: "Sales Stage", which is an attribute title, and "Negotiation (was Agreement)", which is an attribute value. A similar situation exists for other text lines within the image depicted in FIG. 12D (e.g., "Account" and "Halpern Inc." and others).

Different designs are possible for a screen in different applications. Within a particular application however, typically the same design is used for screens of the application displaying similar set of text. Examples of types of text is attribute title text and attributes value text. Usually the design of screens may have different styling guidelines. In application development the styling is set in separate file (CSS file for hybrid applications, Style file for Android®). This design information may be used to extract components from the screen image.

Different types of data or values may be shown by the application GUI for different designs. For example, the header titles of screens for an application may have similar design. The attribute titles on the screens may have a similar or common design (e.g., the same attribute title may be used on different screens where the content being displayed is the same or has the same context). For text spanning multiple lines, a common design may be used to display such lines on multiple screens of the application. This design information (e.g., design of the text) is used in tokenizing texts and in the process of splitting or merging of words to find meaningful text chunks from the GUI screen image.

B. Hierarchy Identification

Different kinds of hierarchies may exist in a GUI screen. These hierarchies may be identified based upon background color, alignment of GUI screen components, proximity of the components, spacing information, texture, etc. In order to determine the GUI screen structure, related components are typically grouped together in the hierarchy. Different data components within a GUI screen can be identified by identifying the different patterns of hierarchy used in design of the GUI. For example, a GUI screen commonly comprises a pattern comprising a header, a footer, and a body. Segmenting of the GUI screen can be done using shapes (e.g., rectangles), by using horizontal separator lines, and the like. Boundary or background color may be used to determine hierarchies within the GUI components. In certain embodiments, proximity and spacing of the components in a screen may be used to group components and determine hierarchies. For example, a clustering algorithm may be used to identify related components to group them. In certain embodiments, a K-Means technique may be used with varying K with threshold as the text size. The distance measure could be Euclidean distance or other custom distance measure like minimum of the separation in the coordinates.

C. Design and Named Entity Recognition Feature

As indicated above, in addition to images and text information, the requirements information for an application may also include other information such as information specifying the design parameters for the application, such as the font to be used, the size of the font, foreground/background colors, etc. In some examples, this information may be stored in a separate document, for example, in a CSS file.

The segments extracted from a screen image may have an optional associated title to denote the data contained in the segment with one or more associated values. For example in FIG. 4, "Name" is an attribute title associated with "David Pinnela" (name) and the profile picture, which are related attribute values. The name and profile picture are thus values that are paired with attribute title "Name". Such pairs of components may be extracted from the GUI screen image.

In some scenarios, the attribute value itself is enough to understand or infer the attribute title. This may be inferred from the context in which the value occurs by being unique entity type of the attribute value. For example, in the previous example for FIG. 4, the attribute title may be inferred directly from the name and profile picture. This may be directly understood from the values themselves. Another example is when a value occurs at the top of a DETAIL functionality GUI screen. The attribute title for these values can be inferred in order to understand the attribute value to be displayed at the location.

In some embodiments, the following processing flow may be performed: (1) Identify text regions of the GUI screen from design information; (2) Perform NER processing on the text region; (3) Identify confirmed header pairs; (4) Identify headers using design; (5) Identify headers from text portion of requirements information; (6) Identify subtitles; (7) Perform a similarity match.

Figure 14A:
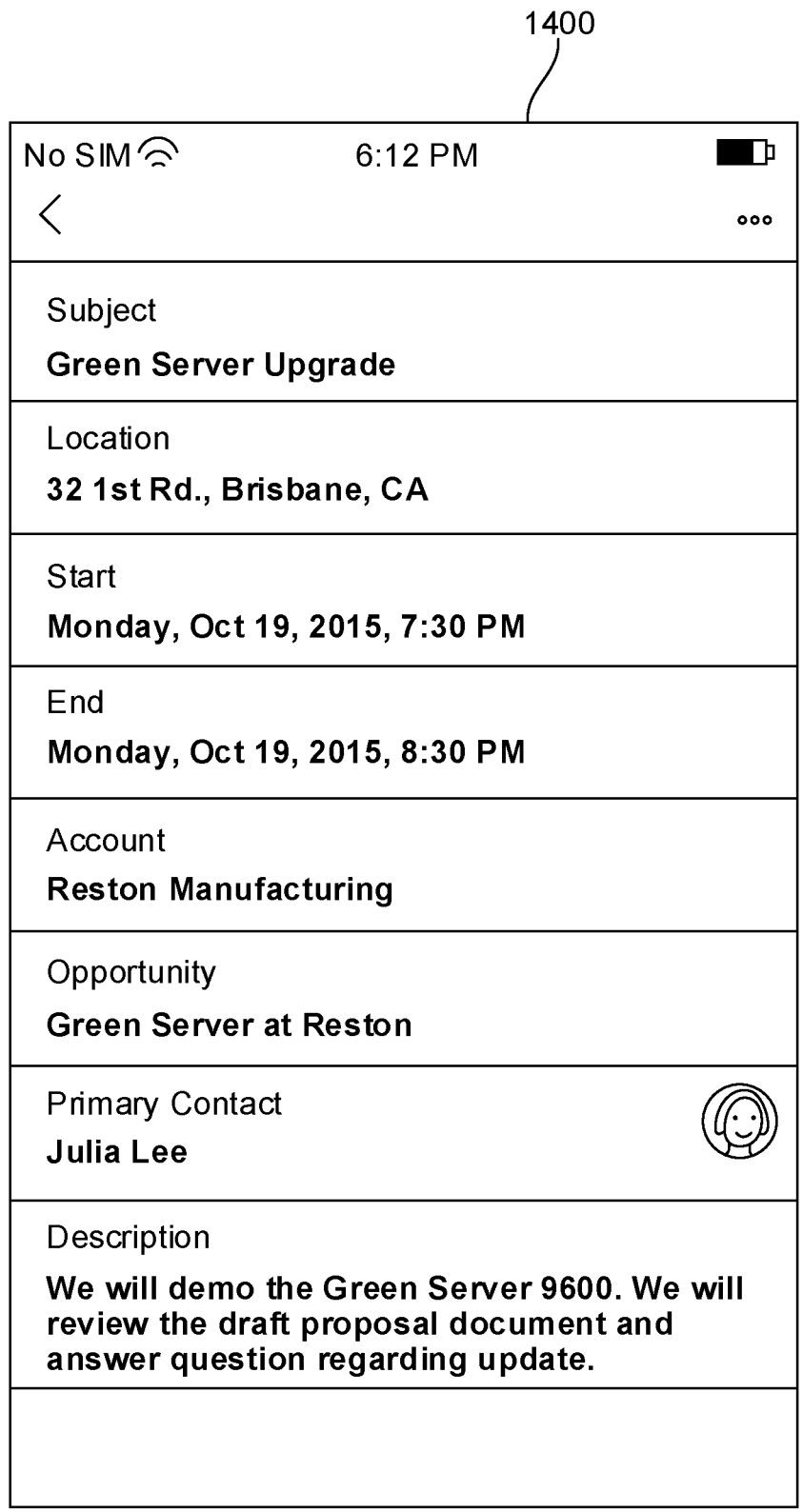
Figure 14B:
Figure 14D:

In some embodiments, an approach as depicted by the examples depicted in FIGS. 14A-14E may be performed. Image 1400 depicted in FIG. 14A may be provided as input as part of requirements information for an application. A design property, such as text font size and color, may be used to extract and group text portions from the image. Tokenization may then be performed to identify texts within the images. The identified text tokens are depicted in FIG. 14B using surrounded bounded boxes. The tokens in portion 1402 can be concatenated as single token as they are of the same design. The extracted texts may then be parsed and fed through a Named Entity Recognizer to identify values and non-values. In this manner, NER can be used to reduce the set of text portions that can potentially be titles. An example output of the NER processing is depicted in FIG. 14C. FIG. 14D shows text portions (surrounded by a box) that are identified as data or attribute values based upon NER output. FIG. 14E depicts an image showing text portions, with same font color, that have been identified as potential attribute title candidates.

D. Part Of Speech and Named Entity Recognition Feature

The attribute titles normally appear as Noun Phrases. A part of speech tagging can be done on the texts and used as a feature to identify titles since titles have higher probability to appear as noun forms. Named Entity Recognizer is used to identify tokens that are attribute values and these tokens are removed from the list of tokens that are potential title candidates. Table C shows the results of the parts of speech tagging for text tokens extracted from the example GUI screen depicted in FIG. 14A. As seen in Table C, most of the titles are nouns or adjectives and nouns. This can be used to increase the accuracy of finding attribute titles especially when the edit page only contains one set of elements in each segment.

Identifying a Data Object to be Mapped to a GUI Screen

As described above with respect to 310 in FIG. 3, various different ways may be used to determine a data object to be mapped to a GUI screen. Based upon the requirements information for an application, one or more data objects may be mapped to a GUI screen for the application. A particular data object may be mapped to one or more GUI screens for an application. The particular data object may be selected from multiple available data objects. The available data objects may include one or more standard data objects and/or one or more customized data objects.

The available data objects may be made available by various software packages, databases, and the like. For example, a database vendor (e.g., Oracle Corporation®) may, along with the underlying database, provide a set of preconfigured data objects along with software functionality that can be used by applications. These preconfigured data objects and software are customizable by application developers. An example of this is an enterprise application from Oracle Corporation®. The presence of database is not limiting and it may be software alone which may use any database. For example, in the sales domain, an enterprise application provider may provide data or business objects representing common entities to manage a sales department such as an account object, an activity object, a deal object, an opportunity object, and the like. In a similar manner, other data objects may be provided by other applications, databases, and the like. The data objects (sometimes also referred to as business objects) may then be customized for use in different segments or verticals like consumer good applications, logistic company applications etc. The details of these business/data objects and their attributes are usually documented by the application provider or may be available through web service calls. In some embodiments, details about the different business objects and their fields or attributes may be available through REST service calls.

In certain embodiments, a GUI screen may be processed based upon the functionality category determined for that screen. For example, a DETAIL or an EDIT functionality GUI screen may be partitioned into sections such as the header, body, footer, etc. The sections may then be processed to extract one or more titles or static components. For example, a title may be extracted from a header portion of the image referred to as header title and an attribute title extracted from the body section. The attribute titles may, in some instances, take the form of icons (e.g., phone number, email can have icons present as title).

A data object relevant to the GUI screen and to be mapped to the GUI screen application may then be identified based upon the extracted components in the case of a GUI screen determined to be assigned to a LIST functionality category. In certain embodiments, the component may be checked if it corresponds to a value (e.g., an attribute vale as shown in FIG. 4). This can be done, in certain embodiments, by using Named Entity Recognition (NER) processing. Upon determining, based upon NER processing, that the title text is not data, it may then be compared to the existing available data objects to identify one or more matching data objects that are to be mapped to the GUI screen. The comparison may be in terms of existence of data object name in the same form. A part of speech tagging of these text labels with multiple words can give the patterns in which they occur. This additional check can be used. If they do not exist in the same form, they are checked for similar meaning within a threshold value. If they are not present within the threshold value, a more complex approach may be used.

Figure 10:
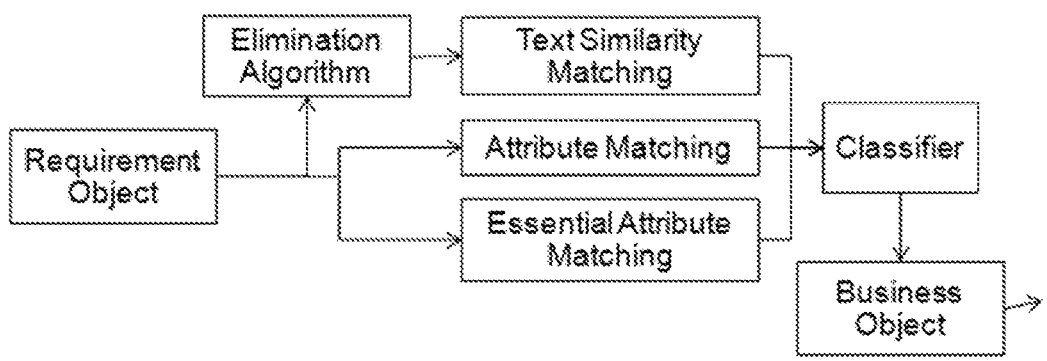
FIG. 10 depicts a high level approach for identifying a data object to be mapped to a GUI screen for an application according to certain embodiments.

As previously described, the requirements information may comprise one or more images and text information. In certain embodiments, the data objects for an application may be determined from the one or more images included in the requirements information for the application. For example, an image of a GUI screen that is categorized as DETAIL or LIST functionality may be partitioned into sections such as the header, body, footer, etc. The sections may then be processed to extract one or more static components such as static titles. For example, a title (referred to as a header title) may be extracted from a header portion of the image. Likewise, a title (referred to as attribute title) may be extracted from a body section of the GUI screen. An attribute title may take may take the form of icons (e.g., phone number, email can have icons present as title). A data object relevant to the application may then be identified based upon the extracted title component, such as for a GUI screen categorized as LIST functionality. In certain embodiments, the title may first be checked whether it is a value using, for example, a Named Entity Recognition processing. Upon determining that the title is not a value, it may then be compared to the names of existing available data objects to identify one or more data objects relevant to and to be mapped to that GUI screen image. The comparison may be in terms of existence of data object name in the same form. A part of speech tagging of these titles with multiple words can give the patterns in which they occur. This additional check can be used. If they do not exist in the same form, they are checked for similar meaning within a threshold value. If they are not present within the threshold value, a more complex approach may be used, such as one using attribute matching, text similarity matching, elimination algorithm, and the like. Once such approach is depicted in FIG. 10.

Data objects that are to be mapped to a GUI screen may also be identified from the text information in the requirements information for the application. Various techniques such as stemming may be used to extract information that is then used to identify the data objects that are to be mapped to a GUI screen for the application.

Figure 7A:
FIG. 7A depicts examples of mockup images of GUI screens that may be included in requirements information for an application.
Figure 7B:
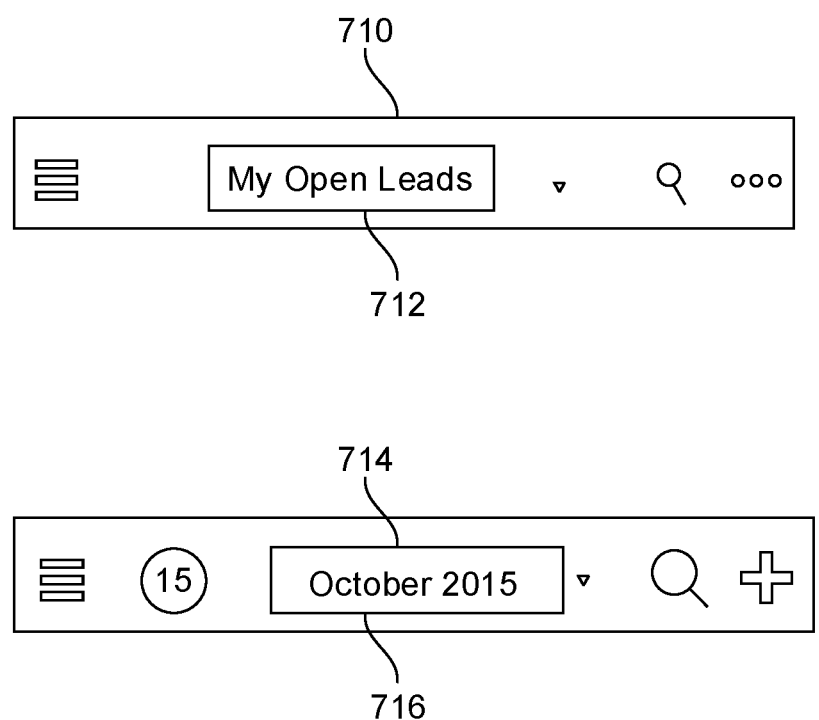
FIG. 7B depicts headers sections extracted from the mockup images depicted in FIG. 7A.

For example, the requirements information for an application may include two images 700 and 702 as depicted in FIG. 7A. The header sections of the images may be first identified and extracted. Next, for each header, a text title component is extracted from the header. For example, as shown in FIG. 7B, header 710 is extracted from image 700 and title 712 "My Open Leads" is extracted from header 710. Likewise, header section 714 is extracted from image 702 and title 716 "October 2015" is extracted from header 712.

Next, each extracted title component may be checked to determine whether it is a data value. In certain embodiments, the extracted title is subjected to Named Entity Recognition (NER) processing. NER is a subtask of information extraction that seeks to locate and classify named entities in text into pre-defined categories such as the names of persons, organizations, locations, expressions of times, quantities, monetary values, percentages, etc. For example, a block of unannotated text may be provided to a NER system and the output of the system is an annotated block of text, annotated with tags and highlights identifying the names of entities found within the text. NER systems are typically configured and set up for specific domains. If the output of the NER analysis performed on the title text indicates that the text is not a value, then that extracted title can be used to search for and identify a related data object for the GUI screen.

Accordingly, upon determining that the title is not a value, it is compared to the existing names of data objects to identify a data object that is relevant to the image and is to be mapped to the GUI screen in that image. A partial match may also be considered. The comparison may be in terms of existence of data object name in same form. A part of speech tagging of these titles with multiple words can give the patterns in which they occur. This additional check can be used. If they do not exist in the same form, they are checked for similar meaning within a threshold value. If they are not present within the threshold value, a further matching approach may be used (e.g., as shown in FIG. 10).

For example, title "October 2015" 716 extracted from header 714 of image 702 may be subjected to NER processing, which may identify the title component as a date entity. The list of available data objects may then be searched to find an object representing a date. Likewise, title "My Open Leads" 712 may be tagged by NER processing as a business object entity and the available data objects may be searched to find a matching object representing a business entity (e.g., a Lead data object).

Business objects for an application may also be identified from the text requirements information. For example, stemming may be performed on text in the text requirements to identify a set of entities from the text information, and the entities may then be used to determine matching data objects.

As described above, a title or other text information identifying an entity extracted from the requirements information for an application may be used by model generation system 102 to identify matching data objects. In certain embodiments, model generation system 102 may access information identifying available data objects. This info may be available to model generation system 102 in various forms, including, for example, a table, such as Table A described above. In the example depicted in FIGS. 7A and 7B, upon determining that title "My Open Leads" extracted from the header 710 of screen 700 is not a value, Table A may be searched by model generation system 102 to identify any data objects that match the title text. A word similarity match may be used to identify matches. This search may yield a partial match to data object titled "Leads" included in Table A. The "Leads" data object may then be identified as being relevant for screen 700 and to be mapped to screen 700.

If an EDIT or DETAIL functionality is detected for a screen, then information in the requirements information may be used to determine a business object to be associated with the screen. The requirements information may itself identify some data objects for the application. To differentiate them from an available data object, a data object described and extracted from the requirements information will be referred to as a "requirement data object" or "requirement object."

In certain embodiments, it is possible to cluster the LIST, DETAIL and EDIT functionality of a requirement object and evaluate the features from them together to find a data object to be mapped to the screen. This requirement object may map to an existing available data object or a new custom object may need to be created (as per the processing depicted in 314 in FIG. 3).

In certain embodiments, machine learning techniques may be used to determine an available data object for a requirement data object, for example, as depicted in FIG. 10. For example, according to one technique, the best fit between a requirement object and an existing data object may be found. If the error is within a certain threshold, then that existing data object may be mapped to the requirement data object. If the fit is not within a certain threshold, then a custom object may be created instead. In certain embodiments, the requirement object attributes can be extracted from the LIST, EDIT and DETAIL functionalities. These can be part of features that are extracted from the requirement object.

There is a lower probability for the same data object to be a child of itself. One input feature for a classifier would be to specify, if a specific data object exists as attribute, and the location at which it occurs (this is to consider the first attribute in some cases is the title of the same data object and the attribute name is shown explicitly). The attributes of the existing business object and those obtained by the requirement object is obtained. They are then compared for similarity metric based on matching of attribute values (similarity in meaning and not only string matching), matching by entity type (e.g., date, person name, and location) and the presence of essential attributes of an existing business object. These features can be fed to a classifier, which chooses one among the different business object. If the confidence value of the classified output is low, then a new custom object may be created. An example of various types of business objects are for Oracle Sales Cloud Application listed in Table A.

In some embodiments, the method depicted in FIG. 10 may be simplified by forming a candidate list of all available data objects. Then the data objects that are already present as attributes are removed from the candidate list to reduce the number of candidates. For example, for a GUI screen with a header title "Appointment" and categorized as a DETAIL functionality, the candidate list may at the start include all the business objects listed in Table A. The Opportunity, Lead and Account objects may then be removed as candidates for the business object as they are present as attributes. Then the attributes of a requirement object are matched with the different data objects in the candidate list. A decision is made using the metric obtained by this step and the similarity score between the requirement object and the various data objects. In the previous example, a simple word similarity match can be used to match the requirement object Appointments with business object Activity.

In some embodiments, the data object to be mapped to a particular screen can be more accurately identified if the attribute titles extracted from that screen are considered. As previously described, various techniques may be used to extract attribute titles (e.g., static text components) associated with a GUI screen.

In certain embodiments, the data sources or requirement objects extracted from the requirements information for the one or more screens of an application may be represented as a set R.

$$R=\{R_1,R_2,R_3,R_4,\ldots,R_N\}$$

An example of such a set of requirement objects R may be {"Appointments", "Tasks", "Contacts", "Call Reports", "Deals", "Leads", . . . }. The existing types of data objects that are available may be represented by set B and the additional custom components that are required to present the system may be given by the set C.

$$B=\{B_1,B_2,B_3,B_4,\ldots,B_M\}$$

$$C=\{C_1,C_2,C_3,C_4,\ldots,C_K\}$$

An example of a set of business objects B is {"Activities", "Contacts", "Leads", "Deals", "Opportunities", . . . }.

Figure 22:
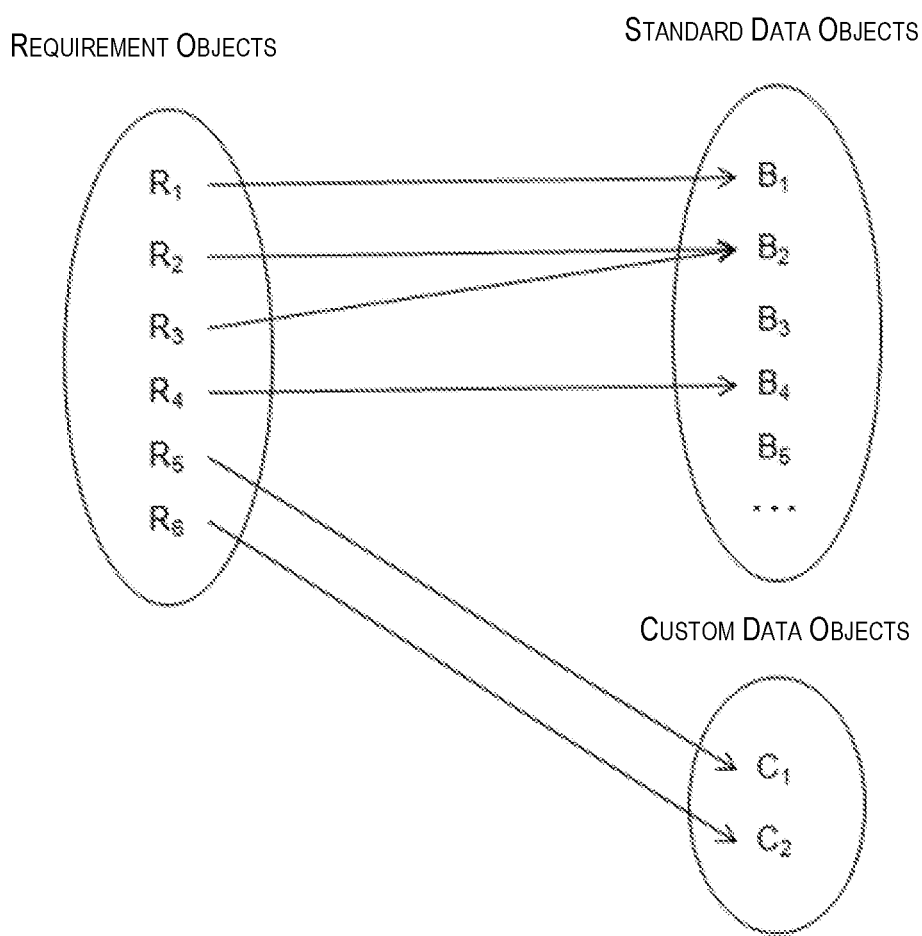
FIG. 22 depicts an example of how requirements objects extracted from requirements information for an application may be mapped to available data objects, where the available data objects may include standard data objects and custom data objects according to certain embodiments.
Figure 23:
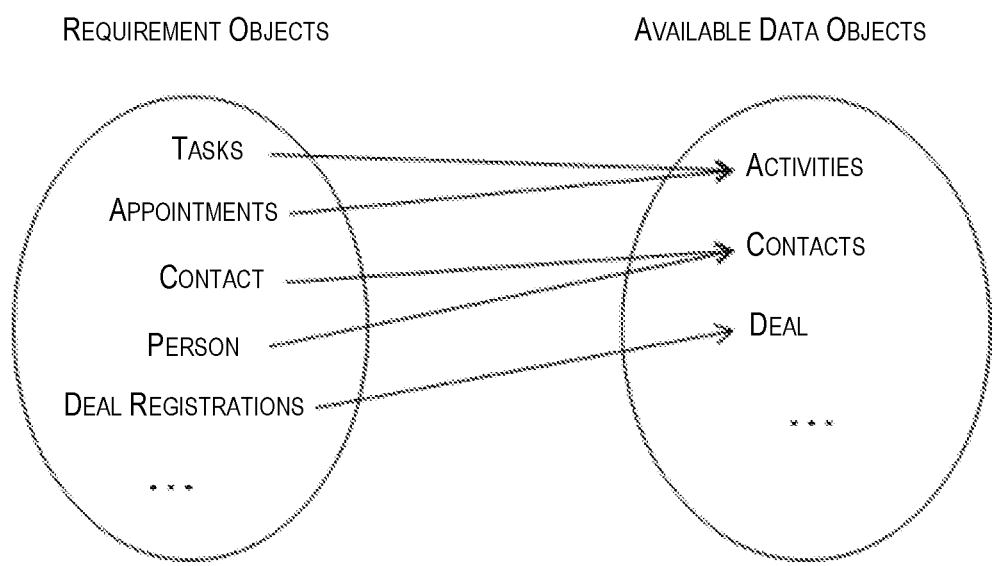
FIG. 23 depicts a more specific example of how requirements objects may be mapped to available data objects according to certain embodiments.

FIG. 22 depicts an example of how requirements objects extracted from requirements information for an application may be mapped to available data objects, where the available data objects may include standard data objects and custom data objects according to certain embodiments. FIG. 23 depicts a more specific example of how requirements objects may be mapped to available data objects according to certain embodiments.

The problem statement is to define a mapping from R to an element on B or C or equivalently to B union C or set {B U C}. A machine learning classifier M may generate mappings from "Appointments", "Tasks", and "Call Reports" to "Activities". "Contacts", "Leads", "Deals" etc. have direct mappings.

In certain embodiments, features are extracted from the requirement objects. These may then be input to a machine learning classifier which trains the model to output the business object onto which the requirement object should be mapped. An example of the overall approach is depicted in FIG. 10. The various features used in identification may include, without limitation, text similarity matching, elimination, attribute matching, and essential attribute matching. In the elimination phase, as described earlier, data objects which appear in the attribute title are removed. The text similarity matching may use the similarity between two words in meaning. Attribute matching is the overlap of attributes between the requirement object and the business objects. Essential attributes are the attributes that are mandatory for existing data object (e.g., "Deal Value" for "Deal" business object, "Name" for "Contact" business object).

Accordingly, in some embodiments, if a header cannot be found in a GUI screen, an extracted value may be extracted from the requirements information and used to determine the header. The general pattern that is followed is that tile, name or subject appears at the top. A search is done using synonyms for {synonym of title/name/subject} or combination of {data object}+{synonym of title/name/subject}. This can be confirmed with the identified headers in the requirement text. It can occur with the data object name on top or without it.

Mapping Data Object Components to Components of the GUI Screen

As described above with respect to 312 in FIG. 3, for a particular data object that is mapped to a GUI screen, processing is further performed to determine mappings between components (also referred to as attributes, fields, elements) of the mapped data object to components of the GUI screen.

Various different ways may be used to determine a data object to be mapped to a GUI screen. A data object may have various components (also sometimes referred to as fields, elements, or attributes of the data object). For example, an "Opportunity" data object may have elements such as start date, end date, location, etc. As described above, components such as attribute titles and attribute values are extracted from the requirements information. In this phase, an extracted GUI element or component on the screen, which is not a button or icon that does not have a standard functionality (e.g., delete) defined with their meanings in the GUI, is mapped to a field or attribute of a data object mapped to that screen. This includes determining data object fields to attribute titles mapping, determining whether there are any embedded lists and which data component (field) in the data object to which it is mapped, whether the text tokens form part of an embedded list item, etc. The information extracted from image requirements and text requirements and general information in the requirements information are used for this purpose. The overview of the approach for extracting information from image is given below.

In certain embodiments, when an attribute values appear directly and is unique the mapping can be established directly as below.

a. If data is within the main container, they are usually attributes. The values like location; Email, Phone number etc. are extracted from Named Entity. If they are unique they can be directly related by establishing "is a" relationship, the mapping can be directly achieved.

b. The semantic meaning of the icon can be extended to identify the data associated with the icon, like phone number for call icon.

c. If they occur within a segment, the sub-title of the segment, usually correspond to children. The mapping can then be established similar to previous step within the children attributes.

If there is a value without the header, which is not unique within the data object or the segment in which it occurs, the text part of requirements information can be used to identify the title for the object. The requirements information may comprise UX specifications and text detail. The text detail maybe specified in a requirements document. Most of the proprietary document formats support conversion to HTML, which is a commonly used standard.

d. The titles can be extracted from the requirements for data or values. The elements of the requirements document can be parsed in hierarchical order. If any child exactly matches with the titles already identified in almost the same order in which they occur in user interface image, then the siblings are extracted. Any title value for data that cannot be inferred from image can be extracted by matching the hierarchy in user interface image and sibling elements extracted from requirement document.

e. If a hierarchy cannot be generated then the information can be extracted from the requirement text, by using method such as clause-based open information extraction (e.g., see Luciano Del Corro, Rainer Gemulla, "ClausIE: clause-based open information extraction," WWW '13 Proceedings of the 22nd international conference on World Wide Web.)

f. If there exists a relation related to {view, see, identify or synonyms} in the requirement information, this can be used to construct a hierarchy. Once lists of titles are established, the previous step can be used to infer the title for the data.

Once the headers are extracted, these may then be mapped to different attributes and children of the data object. The different methods for mapping between data to title can be done independently and combined to get the best result.

In some embodiments, DETAIL GUI screen can be implemented as a list, but the DETAIL page needs to be differentiated from a LIST specifically for identifying the data mappings correctly. According to one technique, Named Entity Extraction processing is used to identify the type of value to separate these two types.

After the overall structure of the GUI screen has been determined and static (e.g., attribute titles) and dynamic (e.g., attribute values) components identified from a GUI screen, relations are determined between the extracted components and the various fields or elements of the data object that has been mapped to that GUI screen. If the attribute values have an associated attribute title in GUI screen that attribute value is extracted and associated with the extracted value(s). These are then mapped onto the corresponding elements of the data object.

For example, consider a requirement object $R_1$ element of requirement set R. This requirement object can be considered to be a vector of the different attributes from the different components. Similarly for an available object $B_1$ element of set of available objects B. This available object can be considered to be a vector of the different attributes from the different components of the object. The aim is to provide a mapping from the attributes of a requirement object to the corresponding ones of an available data object. For example, for the requirement object Appointment a logical grouping can be "Begin", "29 Aug. 2017". The attribute title extracted from the GUI screen image is "Begin". The available data object "Activity" may have a field or element labeled "ActivityStartDate". Based upon vector matching, the attribute title "Begin" in the GUI screen is mapped to element "ActivityStartDate" of available data object Activity.

For an attribute value for which a corresponding attribute title is not present in the GUI screen, the text part of the requirements information and the general information that is available may be used to determine the mapping of that attribute value to a component of a data object mapped to that GUI screen. As example of this is described below.

General Information:

As an example, the first element of a list item in LIST functionality GUI screen and in DETAIL or EDIT screens is usually the title of the requirement object or any sub attribute/children. The requirement object is mapped to an existing data object. The attribute titles extracted from the screen may be stored as a requirement business object as "title", "subject", "name" (e.g., "Opportunity", "Lead", "Quote" business object has title stored as "Name", "Service Request" has title stored as "Title", "Activity" as "Subject"). Considering requirements object directly "Call Reports", "Appointments", "Task" the first element maps to the "Subject" and for "Lead", "Opportunity" and "Quote" the first element maps to the "Name" attribute on the data object. This is usually the first information displayed and the user assumes it is the title and often the attribute title is omitted in the GUI screen. This is also applicable for children of the main attribute value. For example in case of "Attachments" or "Notes", the first item shown in the list belongs to the set of {"title", "subject", "name"}. In some embodiments, a generalization may be done by taking synonyms of these terms. In case there exist more than one of these in the attributes, based on the entity type (Person, Place, Organization, etc.) of the text token the appropriate attribute is chosen (e.g., if the text token is "Joshua Baker" which is identified as belonging to the entity "Person", the attribute "Name" is given priority over "Title" which is a salutation).

In the elements of an available data object or its children, the name may be used along with the attribute title. An example is the primary key of a data object. It is the usually the data object name appended with "Id" (e.g., "DealId", "ActivityId", "OpportunityId"). This can be automatically determined from any enterprise solution by checking the patterns in the specific system. In some embodiments, this may come as part of the DESCRIBE call. This behavior also exists for the children of the data object. This is common when there are child elements which have the same attribute.

The names given to attributes or elements of a data object usually follow some coding standards. In some embodiments, this may be camel case (in Java) or split by underscore "_" (in Python). This can be used for filters or functions as well as for splitting attribute values. In case no specific pattern is used, general algorithms for extracting words from concatenated words can be used. An example is max-match segmentation algorithm.

Text Requirement:

As described above, the requirements information for an application may include a text portion. Document Object Model (DOM) analysis may be performed on the text requirement to extract an information hierarchy. This can then be used to match any missing elements. This also gives details of the attributes that are shown in the GUI screen. This is mapped to the different elements in the data object.

For example, an example text portion of requirements information for an Appointment Detail screen (e.g., mockup image shown in FIG. 12C) may comprise a text portion as shown below.

Text Portion Start:
1. Fields. On Appointment Details screen, I can see the following fields. If values are defined I should not see the field or field group, if there is no value.
   a. Subject
   b. Location
      i. The location value should include active hyperlinks if
         1. Telephone number. If there is a telephone number (with at least seven digits and no more than 15) in the location value, then the number should be shown as an active hyperlink. Tapping on this number should bring up a call dialog with the telephone number and the following two actions.
            a. Call
            b. Cancel
            c. After making a call via the Location field, I should see the Log Call dialog prompting me to log the outbound interaction. Specifically, I should see the following dialog message, "Would you like to log your call attempt?" See Common. Log an Outbound Interaction.
         2. URL. If there is a url (containing valid top-level domains) in the location value then the url should be shown as an active hyperlink. Tapping on this url link should open the URL in the native browser with the URL address pre-filled and the corresponding website loaded.
         3. Street address. If there is an address (with any of these street suffixes, for example) in the location value, then the address should be shown as an active hyperlink. Tapping on this address link should open the native app with the address pre-populated and located.
   c. Repeats (for recurring appointments)
      i. The Detail page always shows a single instance so the date/time will be for a specific instance in the series.
      ii. The Repeats value shows the repeat frequency and series end date. (e.g., "Occurs every 2 weeks on Wednesday until 5/25/2016")
         1. Occurs annually on the (RECUR_PATTERN) (RECUR_DAY_OF_WEEK_IN_MONTH) of (RECUR_MONTH) until (RECUR_END_DATE)
         2. Occurs the (RECUR_PATTERN) (RECUR_DAY_ OF_WEEK_IN_MONTH) of every (RECUR_FREQ_NUM) months until (RECUR_END_DATE)
         3. Occurs annually every (RECUR_MONTH_DAY) until (RECUR_END_DATE)
         4. Occurs every (NUM_WEEKS) weeks on (RECUR_DAYS_OF_WEEK) until (RECUR_END_DATE)
         5. Occurs every NUMBER_OF_DAYS) days until (RECUR_END_DATE)
         6. Occurs every weekday until (RECUR_END_DATE)
         7. Occurs day (RECUR_DAY) of every (RECUR_FREQ_NUM) months until (RECUR_END_DATE)
   d. Response Status
      i. I can easily identify my response status—whether I've accepted, declined, tentatively accepted or didn't respond
      ii. If I am an invited resource, I can accept, decline, or tentatively accept an appointment
         1. For a recurring appointment I can make a change, to the single instance or to the entire series
      iii. If I am an invited contact, I can only view my response status.
   e. Type
   f. All Day (only shown for all day appointment)
   g. Start Date & Time
      i. I can view an appointment start time in my local time zone and in my preferred date format.
   h. End Date & Time
      i. I can see view an appointment's end time in my local time zone and in my preferred date format.
   i. Account
      i. By tapping on the Account value, I can drill down to view the associated Accounts details. See View Account Details.
      ii. Partners
         1. If the logged-in user is a partner sales rep or a partner sales manager, then show the Partner field instead of the Account field for appointments that were created in the context of Partners. By tapping on the Partner Name value, the partner can drill down to view the associated Partner's details. See Partners Details View.
         2. If the logged-in user is a partner sales rep or a partner sales manager, and if the appointment was created directly from the Appointments list, then show the Account field. The partner can drill down to view the associated Accounts details. See View Account Details.
   j. Opportunity
      i. By tapping the on the Opportunity, I can drill down to the view the associated Opportunity's details. See View Opportunity Details.
   k. Lead
      i. By tapping the on the Lead, I can drill down to view the associated Lead's details. See View Lead Details.
   l. Primary Contact and Avatar
      i. I can see the Primary Contacts avatar. I can tap on the avatar to launch the Person Action Wheel. See Common Contact Wheel.
      ii. If it takes longer to load avatars than other values, then the app should load images in the background. While an avatar is loading in the background, I can see the contact's initials until the image has loaded.
      iii. By tapping on the Primary Contacts value, I can drill down to view the associated contacts details. See View Contact Details.
   m. Owner
      i. I can drill down to view the resource's details. See View Resource Details.
      ii. I can see the Owner's avatar, I can tap on the Owner's avatar to launch the Person Action Wheel. See Common—Contact Wheel n. Description
  i. The height of the description text area should grow with the length of the description value up to five lines, the maximum height is five lines of text
  ii. If the value is longer than five lines, then I will see a resize control in the bottom right of the text area.
o. Private (only shown for a private appointment)
p. Show Time As (for an invitee)
  i. I can set the Show Time As value directly. Once I select a value and tap the Done button on the selection screen, the value will be saved with the appointment.
    1. If the appointment is a recurring one, I can make a change to the single instance or to the entire series.
q. Set Reminder (for an invitee)
  i. I can Set Reminder value directly. Once I select a value and hit Done on the selections screen, the value will be saved on the appointment
    1. For a recurring appointment, I can make a change to the single instance or to the entire series.
r. Embedded Lists.
  i. Objectives. See Objectives on Detail Page
  ii. Invitee List. See Invitees/Attendees on View Page
  iii. Attachments.
    1. I can view task attachments as an embedded list. See Common—Attachments (Set)
    2. If there are no attachments, then I should not see the Attachments embedded list in the Detail page, empty lists are hidden.
s. Subtabs
  i. Notes
    1. On the Notes subtab of a task, I can view a list of notes associated with that task. See common—Notes (Set2)
  ii. Call Reports
    1. On the Call Reports subtab of a task, I can view all the call reports created for that task. See Call Reports Subtab on Appointment and Task.
  iii. Social
    1. If my admin has 1) enabled Oracle Social Network (OSN) in my environment and 2) enabled Task objects for OSN, then I will see the Social subtab and I can share tasks to the OSN as Social Objects. When I share a task to OSN, I will punch out to the OSN app. See Common—Details View Social Subtab.

Text Portion End

The text requirements has a DOM structure that can be determined by performing DOM analysis on the text portion. The DOM structure yielded by the DOM analysis performed on the example text portion shown above may be as follows:

```
▼<li>
  ►<span class="bki-span">...</span>
  ▼<ol>
    ►<li class="bki-li">...</li>
    ►<li class="bki-li">...</li>
    ►<li class="bki-li">...</li>
    ►<li class="bki-li">...</li>
    ►<li class="bki-li">...</li>
    ►<li class="bki-li">...</li>
    ►<li class="bki-li">...</li>
    ►<li class="bki-li">...</li>
    ►<li class="bki-li">...</li>
```

```
    ►<li class="bki-li">...</li>
    ►<li class="bki-li">...</li>
    ▼<li class="bki-li">
      ▼<span class="bki-span">
        ▼<span class="bki-span">
          ▼<span class="bki-span">
            ▼<span class="bki-span">
              <span class="inline -comment-marker"
                data-ref="eb4873ea-0e82-40b2-a938-75ffe57ba046">
                Owner
              </span> = =$0
            </span>
          </span>
        </span>
      </span>
      ►<ol>...</ol>
    </li>
    ▼<li class=" bki-li">
      ▼<span class="bki-span">
        <span class="inline - comment-marker"
          data- ref="c86ff9d9 -2de5-4cb0-b815-
          efldee71ae62">Description</span>
      </span>
      ►<ol>...</ol>
    </li>
    ►<li class="bki-li">...</li>
    ►<li class="bki-li">...</li>
    ►<li class="bki-li">...</li>
    ►<li class="bki-li">...</li>
    ►<li class="bki-li">...</li>
  </ol>
</li>
```

If there is any attribute value present in GUI screen without an associated attribute title, the attribute title may be inferred by comparing the UI structure of the GUI screen (described above) with the attribute titles identified in the DOM structure output. This can be implemented in several ways. According to one approach, the DOM structure may be searched for an identified attribute title. The attribute titles can be extracted to find a common parent till an adjacent identified attribute title is found. There could be different layers between the different list items. Accordingly, processing is performed to reach the common parent or a layer below before processing. The children of the parent can then correspond to the different elements within the GUI screen. It can also be evaluated by finding the sibling of the child of the common parent. The same can be repeated for finding elements inside embedded lists.

For example, in the text requirement above, start with "Owner" and parse up the parent till the next sibling contains "Description". This extracted hierarchy would then be "Subject", "Location", "Repeats", "Response Status", "Type", "All day", "Start date and time", etc.

In certain embodiments, if an attribute value is present without an associated title (e.g., in the image about Appointment detail screen depicted in FIG. 12C), the text tokens "Sales Meeting with JK Steel", "8:00 AM to 9:00 AM", "1415 17th Ave, Denver, Colo." are values that do not have an attribute title. For these, the name or label of the corresponding element in the data object mapped to the GUI screen to which the values are to be mapped is determined. There are few scenarios, where this happens. In the case of a person name/city name/phone number/currency and other cases where a user can identify the element from the type of data shown in GUI screen, then the attribute title is omitted (e.g., from the string "1415 17$^{th}$ Ave, Denver, Colo.", the user can directly identify this as a location of the appointment). This also happens when the particular type of data is unique for the data object or it is the most prominent for the particular mapped data object (e.g., Deal Value for the "Deal" data object). This is very useful to find details of the text tokens that are not accompanied by an attribute title. It also makes the system robust for cases where the text is extracted from requirement image using OCR, as this can help correct any errors that occur in this process.

Text Properties and Similarity Matching:

The Named Entity Recognition processing can be done and the output checked for similar type of elements in the data object. For example, if the address text information in a GUI screen does not have an attribute title, NER processing may identify it as entity type Location for the type of data and then this information can be used to map this attribute value to a similar element or field in the Activity data object that has been mapped to the GUI screen.

In general, by performing text similarity matching along with adding the data object and entity type the mappings between elements in the data object and the attribute titles in the GUI screen can be determined.

Mapping of Icons and Buttons:

The general icons are used which take functionality based on the context in which they appear on the GUI screen (e.g., in the Appointment detail screen depicted in FIG. 12C, there are icons such as check marks 1210, a cross icon 1210, other icons). These icons may stand for "Accept", "Reject", and "Ignore" statuses. In some embodiments, they may appear as buttons close together. These could be mapped to different states that may be stored in the mapped data object as a list of values. Another example is "Approve", "Reject", "Return" icons for an available "Deal" business object. These can be mapped to the respective icons by taking the sentiment analysis on the different values they take like "Approve", "Reject", "Return" and the tags associated with the icons. These features are examples only and are not intended to be limiting.

Other features that may be used to perform mappings are part of speech tags, NER output on the elements in each segment, as discussed previously. In general, for a mockup GUI screen, the GUI components of the GUI screen and their content can be extracted from the GUI screen and features determined for the components. In certain embodiments, these features can then be used as inputs to a machine learning classifier that has been trained to make a decision as to the classification of the screen functionality. This is shown in FIG. 13.

Figure 13:
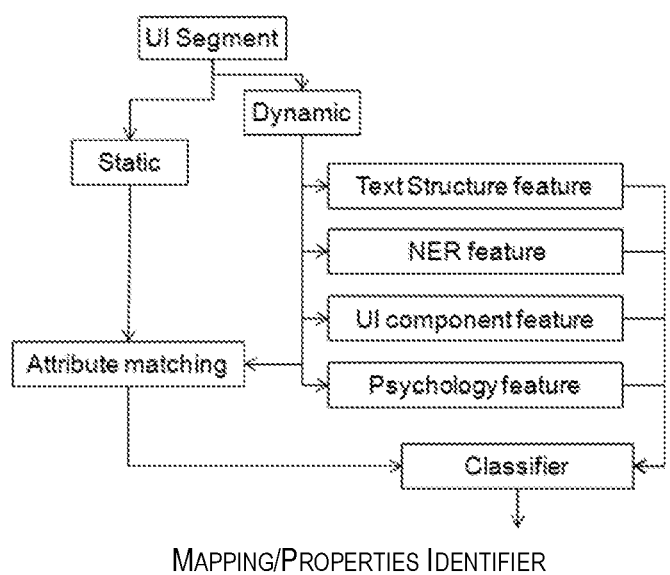
FIG. 13 depicts a high level approach for mapping components extracted from a GUI screen image to elements or attributes of a data object that has been mapped to that GUI screen according to certain embodiments.

FIG. 13 depicts a high level approach for mapping components extracted from a GUI screen image to elements or attributes of a data object that has been mapped to that GUI screen according to certain embodiments. The processing depicted in FIG. 13 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 13 and described below is intended to be illustrative and non-limiting. Although FIG. 13 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 13 may be performed by a static/dynamic segregator subsystem that may be part of model generation system 102.

As shown in FIG. 13, segments may be determined for the GUI screen image in the requirements information and dynamic and static components extracted from the GUI screen. Various types of processing (including but not limited to text structure feature extraction, NER feature extraction, UI components feature extraction, psychology feature extraction) may be performed on the extracted components and the output of the processing fed to a classifier that may be configured to determine the mappings.

In certain embodiment, the text structure block in FIG. 13 may include performing analysis of DOM structure of the requirements information. The psychology features processing shown in FIG. 13 may include general properties-based processing described above. UI component features processing shown in FIG. 13 may include identifying image related API for profile picture and other GUI element specific processing. The attribute titles extracted may also be used in this processing.

As described above, the mapping of GUI screen components to elements or components of a data object may be based upon information extracted from the text and image part of the requirements information. The approaches described herein can work across different GUI designs, and also facilitate changes to the design over time. For example, applications are generally developed using well accepted principles of design. An example of such principles of design is shown in Visually's "The 6 Principles of Design" web page. These principles are generally followed across various styles and platforms. Different applications may follow different styles but within an application design as well as during development, common design styles are used across multiple screens of the application, especially if the screens show similar type of content.

The design information for an application may be stored in various forms. For example, in hybrid applications, the design information may be stored in a CSS file for the application. For Android® applications the design information may be stored in a styling file and used across all screens of the application. Additionally, typically, GUI components showing related data are grouped together within a container on a screen with or without a single attribute title. For such a container, the title/relation can be present within the container or outside the container.

In one example, a mockup screen may include a drop down GUI component that shows only one value in the screen mockup. For this component, a complete set of values, from which the user can select an option, is to be identified. The drop down GUI component may occur with or without an attribute title. If an available data object has an element or attribute with a similar title it can be considered to be mapped to that component. From the drop down GUI component, one of the values displayed by the mockup GUI screen can be identified if we know one of the values in the set (e.g., in FIG. 15, attribute "Type" 1502 has a value "Meeting", which is one of the values that can be associated with "Type".). An additional check can be done whether the list of values contains the value shown in the GUI drop down in the screen mockup.

If the business object that is mapped to the GUI screen has no element or field with an attribute title that matches a particular attribute title extracted from the GUI screen, then there may be a need for a new data object with a field or element that matches the particular attribute title extracted from the GUI screen image. For a drop-down GUI component, information is needed about the list of values it can take. To identify the list of values in a drop down, any one of the following techniques may be used. These can also be used to update any set of values with identified values where an attribute title is present.

(Technique #1) As previously described, the requirements information for an application may include one or more mockup images of GUI screens for the application and also text information. The requirements information may be provided in a requirements document (e.g., a requirements specification). A DOM structure can be inferred from the document format. Commonly used text editors like Microsoft Word also support saving as HTML document. If the DOM structure can be extracted, the below approach can be used. The region in the requirement document containing the title is extracted. The children of the element are then parsed in hierarchical order. If any of the children exactly matches with the value in the user interface, then the siblings can be extracted as the list of values. In the example below, the screen mock up depicted in FIG. 15 contains a "Repeat" attribute 1504 for which the set of values need to be identified. The snapshot of the text requirements is shown below. The test portion is searched for the term "repeat". The occurrences of the word "repeat" in the text portion are emphasized by bolding and underlining.

Text Requirements Portion START g. Repeat
  i. I can select one of the following frequencies from the Repeat Picker:
    1. Never
    2. Daily
    3. Weekly
    4. Monthly
    5. Yearly
  ii. By default, the option "Never" is selected
  iii. End Repeat. Once I select a frequency from the Repeat Picker, I can specify the End Repeat value.
    1. The End Repeat field is only visible I select a frequency greater than never or zero from the Repeat Picker
    2. The default number of recurrences in a series is 10. For example, if I select the "Weekly" option, and the Start value is Jun. 9, 2015, then the End Repeat is Aug. 11, 2015.
      a. I can specify either the number of recurrences or the end date.
      b. By default, the number of recurrences is used.
      c. The End value may be any day after the start date of the appointment.
        i. MAF DEPENDENCY MAF dependency for limiting datepicker values. Until MAF supports this feature, the app will show an inline error message if the user selects an end date that occurs before the start date.
          1. The error message should say, "Select a date on or after <the appointment start date>."
    3. If the option "Never" is selected, the End Repeat field should not be visible.
  iv. Once I select a frequency from the Repeat Picker, I can specify the number of recurrences between instances
    1. If the option "Daily" is selected
      a. I can either specify the number of days between instances or choose every day.
        i. By default, the appointment will repeat every day (or 1 day between instances)
    2. If the option "Weekly" is selected
      a. I can either specify the number of weeks between instances
        i. By default, the appointment will repeat every week (or 1 week between instances)
      b. I can select the day of the week for the reoccurrence
        i. By default, the appointment will repeat on the same day of the week as the start date.
        ii. I can select multiple days of a week.
    3. If the option "Monthly" is selected.
      a. I can specify the number of months between instances
        i. By default, the appointment will repeat every month (or 1 month between instances)
      b. I can specify either a date or day of the month for the appointment recurrence
        i. By default, the appointment will repeat on the same date of the month as the start date
        ii. By default, the appointment will repeat on the same day of the month as the start day
        iii. For example, if the start date is Jan. 20, 2016, then the appointment will reoccur on the 20th of each month, and the default value for the day of month is every fourth Wednesday
    4. If the option "Yearly" is selected
      a. I can specify the number of years between instances
        i. By default, the appointment will repeat every year (or 1 year between instances)
      b. I can specify either a date or day of the year for the appointment recurrence
        i. By default, the appointment will repeat on the same date of the year as start date
        ii. By default, the appointment will repeat on the same day of the year as the start day
        iii. For example, if the start date is Jan. 20, 2016 then the appointment will reoccur on January 20th of each year, and the default value for the day of the year is every forth Wednesday in January Text Requirements Portion END The DOM or source code structure for the text portion above is shown below.

```
▼<li class="bki-li">
    <span class="bki-span">I can select one of the following
    frequencies from the Repeat Picker:</span>
    ▼<ol>
        ▼<li class="bki-li">
            "Never"
            < span class="bki-span"> </span>
        </li>
        ▼< li class="bki-li">
            < span class="bki-span">Daily</span> = $Ø
        </li>
        ▼< li class="bki-li">
            < span class="bki-span">Weekly</span>
        </li>
        ▼< li class="bki-li">
            < span class="bki-span">Monthly</span>
        </li>
        ▼< li class="bki-li">
            < span class="bki-span">Yearly</span>
        </li>
    </ol>
</li>
<li class="bki-li">By default, the option "Never" is selected.</li>
```

In the DOM structure shown above, the set of values in the ordered list (<ol>) which are the siblings of "Never" can be recognized as the set of values for the attribute "Repeat".

Figure 16:
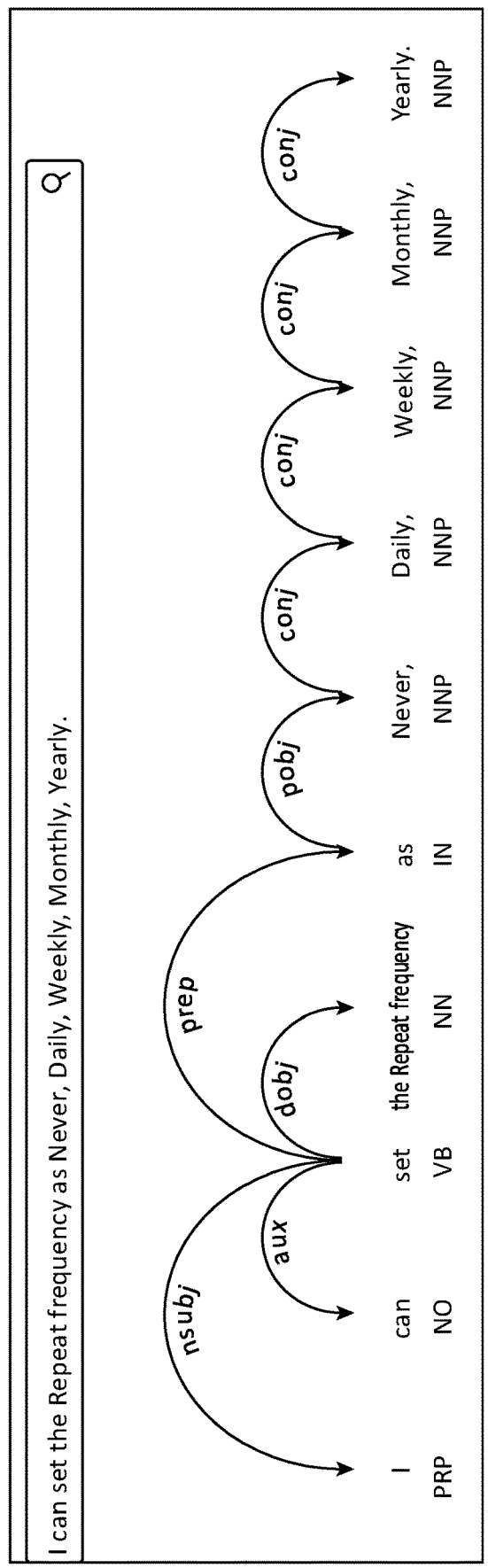
FIG. 16 depicts a dependency diagram generated based upon requirements information for an application according to certain embodiments.

(Technique #2) If a title extracted from an image can be associated with a drop down component, then the dependency diagram of the sentences containing the attribute title may be generated. The dependency diagram shows how different words are related to each other in the sentence. The set of values for the drop down can then be extracted from this dependency diagram. This can be extended to identify the any list of comma separated words with one of them being the value in the user interface mockup (e.g., "Never"

for drop-down "Repeat" in FIG. 15. For example, a dependency diagram for a sentence from the text requirements information such as "I can set the Repeat frequency as Never, Daily, Weekly, Monthly, Yearly" may be as shown in FIG. 16.

(Technique #3) If the header title cannot be associated with a drop down GUI component, then the segment containing the value in the drop down list is extracted and component hierarchy or dependency diagram can be used to find data object attributes associated with it as described above for techniques #1 and #2.

In some embodiments, other text processing techniques can be used to establish the relationship and the set of values. Examples are to identify the presence of term—"following or groups" can be used to segregate them from their definitions. For generic pre-defined types, a standard data set can be used. The examples are currency, states {low/high/medium}, etc.

Loading of Data

As described above with respect to 314 in FIG. 3, processing may be performed to determine how to fetch the data to be displayed by a GUI screen. This may include identifying a source of the data, and any filters or parameters to be used as part of the data fetch operation.

In this section, techniques are described for identifying web service calls to be invoked to load the data with the required properties, for example, in a LIST functionality GUI screen. For example, the requirements information may state that data for a particular number of components is to be loaded by default. For example, data may be loaded for a list component on a GUI screen. The data loaded in a list might also depend on the selected element in a data selector GUI component. In case of a DETAIL functionality screen, data that needs to be fetched can be obtained by the list of headers or attributes in the screen.

Various different techniques may be used to fetch the data to be displayed by the application GUI screens. For example, different types of REST service calls such as Create, Read, Update, Delete, and others may be used. In certain embodiments, the type of REST call to use can be identified from the images (e.g., from the buttons and associated actions identified from processing the images such as edit button, save button, etc.), and also from the text part of the requirements information. The same can also be extracted from the text part of requirements.

A REST call or request generally identifies an endpoint for the call. One or more parameters may also be passed to the REST. These parameters influence the properties of the fetched data or the type of data that is fetched. In certain embodiments, the endpoints and the parameters for a rest call can be determined from the requirements information for the application.

In certain embodiments, the information about an available data object may be available as a web service or a REST service. This may also include information about various filters that can be applied to the data while fetching the list from that data object. The filters may also be referred to as finders. The web service call to fetch this information is referred to as DESCRIBE and the filters available are referred to as the finders. The finders for a data object can be obtained using a DESCRIBE web service call. For example, finders for a "Deal" data object that may be obtained using DESCRIBE web service call are AllDealsSearchRF, AllDealRegistrationRF, DealsPendingMyApprovalRF, DealStatusCodeRF, PrimaryKey, DealVOPrimaryKey, DealNumberAltKey.

Often the finders take a request parameter that is used for the executing the data fetch operation. An example of this would be the sort operation for an "Opportunity" data object. The additional request parameter may be a sort order (ascending or descending) and the attribute on which it is sorted. Information about this sort order and the sort criterion may be provided in the requirements information, for example, in the text portion of the requirements information. For example, in the text requirements information for a LIST functionality GUI screen, the information may be extracted and can be used to identify the filters or finders to be used while fetching the data for the GUI screen. The requirements information may also identify the parameters to be passed to the finders when fetching the data. The requirements information for an application may be analyzed to identify, for example, items that need to be shown in a list on a GUI screen, a sort parameter to be used, a sort order to be used, and other such commonly used filtering properties. In general, information can be extracted from the requirements information regarding such data properties or filters. These properties mentioned in the text requirement are then realized by selecting the filter in the web service call and passing appropriate parameters while fetching data.

As another example, a GUI screen for an application may include a control or tab widget for selecting different sets of data. The filter or the finder for such a list can be found by matching the data selector widget or selecting one button with the list of finders available. This information may also be extracted from the text part of the requirements information by matching the description of its behavior with the finder's description present in the DESCRIBE web service call.

For example, the requirements information may include a mockup image of a GUI screen as depicted in FIG. 17. The GUI screen may be mapped to a "Deal" data object. As shown in FIG. 17, the screen includes a search bar 1702. Components or data selector widgets above the search bar usually identify the filter or selection of the type of data. In the example in FIG. 17, these components are tab "All" 1706, which selects all the deals for the user, and tab "Pending" 1704, which selects only those deals that are pending for the user. A filter to be used for fetching the data for these tabs can be found by matching "All" and "Pending" with the finders below.

In one embodiment, finders available from the Deals DESCRIBE query are: AllDealsSearchRF, AllDealRegistrationRF, DealsPendingMyApprovalRF, DealStatusCodeRF, PrimaryKey, DealVOPrimaryKey, DealNumberAltKey. In some embodiments, additional processing may be needed to extract the exact words from these finders. This depends on the coding guidelines followed. In Java it is usually camel case and in Python the words are separated by "_" (underscore). Texts obtained by splitting the filters using the naming conventions are: All Deals Search RF, All Deal Registration RF, Deals Pending My Approval RF, Deal Status Code RF, Primary Key, Deal VO Primary Key, Deal Number Alt Key. It is easy to identify the end point or finder for the "Pending" deal tab as DealsPendingMyApprovalRF and for "All" deals tab as All Deal Registration RF by simple text matching. There are three different endpoints for [Search +{All/Pending}]. It is easy to identify the end point directly for each of these cases. Other word similarity matching can also be used.

In certain embodiments, in the DETAIL functionality, the select one can also be used to show related information in different tabs. The fetched detail may then be split to show them in different tabs. The different attributes of the data object may also be shown in different tabs. The text in these tabs can be used to identify these.

In certain embodiments, the properties to be used as parameters for data-related calls, such as REST calls, can be extracted from the requirements information. The requirements information may be processed to identify sentences related to a list view (or synonyms) of items. For example, in a simplified embodiment, statements in the text requirements information that contain the term deals may be extracted.

For example, the text portion of requirements information related to account information to be displayed by an application screen may specify a sort order as follows:

"Default list view sorted alphabetically on account name."

Two relationships may be identified from the above statement in the requirements information:
(1) "Default list view" "sorted" "alphabetically on account name"
(2) "Default list view" "sorted" "alphabetically"

Figure 18:
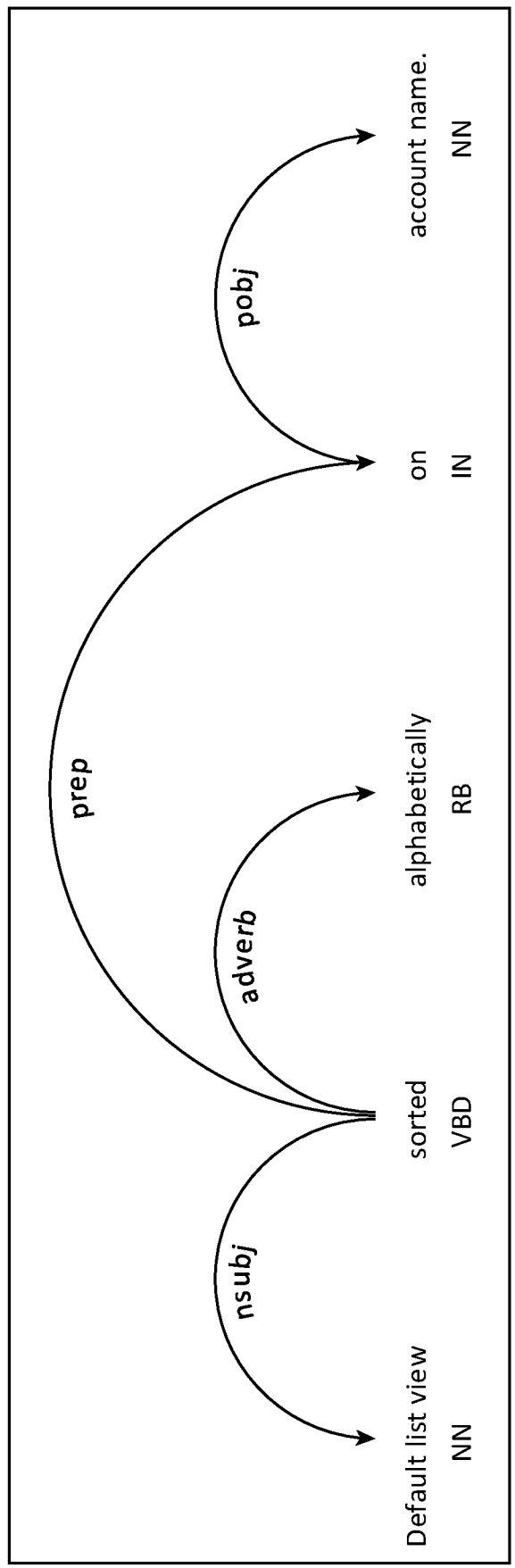
FIG. 18 depicts a dependency diagram generated based upon requirements information for an application according to certain embodiments.

The above relations can be matched with the existing filters or endpoints to find a matching endpoint or filter. In certain embodiments, the parameters to be passed to a REST call can be extracted using a dependency diagram as shown in FIG. 18. Dependency diagrams show the relation between words or phrases in a sentence. The dependency diagram may be built based upon the relationships determined from parsing the requirements text information. Using the dependency tree, words to be associated with the filter can be determined. This can be used to find the parameters that need to be passed to the filter. For example, if the list is sorted, it may need parameters related to sort order and the attribute on it is sorted. FIG. 18 shows the dependency tree for the text requirement. The sort order can be found by word similarity alphabetically and can be done with the parameters ascending and descending. The similarity score of ascending and alphabetical (11) is more than that of descending and alphabetical (9). The parameter on which it is sorted can be obtained by matching attributes/titles of the business object which in FIG. 18 is "account name".

For a REST call mapping, things that may be identified include: endpoint, parameters, type of operation. The endpoint can be identified from the relationship that the list is sorted. Using the relation of the list information, it is known that some property of the list is set in the sentence. The property is then extracted and filters are matched to identify the correct filter. Based on similarity matching with the attributes of the business object, the parameters on which it is sorted (Due date) can be identified. The type of operation can be inferred from the dependencies as explained previously. Dependency diagrams can be generated using different tools (e.g., Spacy.io).

Application Model Generation

In this phase (e.g., 316 in FIG. 3), an application model is generated that can subsequently be used by a downstream consumer, for example, to generate one or more implementations of the application. In certain embodiments, an implementation may be an executable implementation that can be executed by one or more processors. In other embodiments, the implementation may include code and logic that implements the application. The implementation can be executed, or may be compiled or interpreted to generate an executable version of the application. The model stores information about the look and feel and functionality of the application as specified in the requirements information for the application. The model also stores mappings between data objects and GUI screens and between data object components and GUI screen components. The model may be Example Implementation The model generation system 102 described herein can be implemented in various different environments including a cloud environment (could be various types of clouds including private, public, and hybrid cloud environments), on-premises environment, a hybrid environment, and the like.

Figure 19:
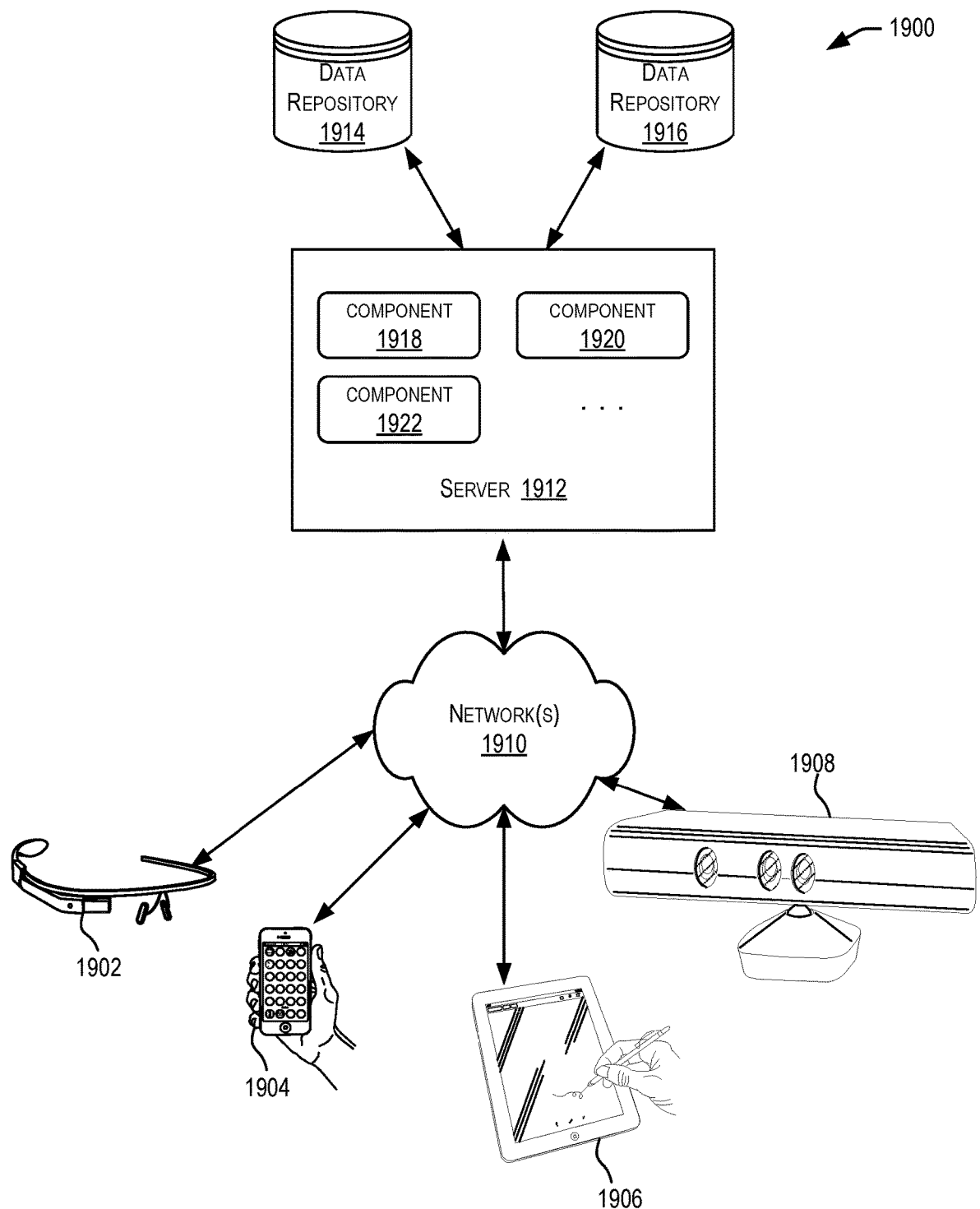
FIG. 19 depicts a simplified diagram of a distributed system for implementing an embodiment.

FIG. 19 depicts a simplified diagram of a distributed system 1900 for implementing an embodiment. In the illustrated embodiment, distributed system 1900 includes one or more client computing devices 1902, 1904, 1906, and 1908, coupled to a server 1912 via one or more communication networks 1910. Clients computing devices 1902, 1904, 1906, and 1908 may be configured to execute one or more applications.

In various embodiments, server 1912 may be adapted to run or provide one or more services or software applications that enable relations or mappings to be automatically generated between user interface components in an application and data objects using requirements information for the application. For example, in certain embodiments, server 1912 may receive requirements information for an application, where the requirements information may include a description of the desired functionalities for the application and may also include images of desired GUI for the application. Server 1912 may then use the requirements information to generate mappings between the user interface components of the application and one or more data objects.

In certain embodiments, server 1912 may also provide other services or software applications that may be provided in non-virtual and virtual environments. In some embodiments, these services may be offered as web-based or cloud services, such as under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in FIG. 19, server 1912 may include one or more components 1918, 1920 and 1922 that implement the functions performed by server 1912. These components may include software components that may be executed by one or more processors, hardware components, or combinations thereof. It should be appreciated that various different system configurations are possible, which may be different from distributed system 1900. The embodiment shown in FIG. 19 is thus one example of a distributed system for implementing an embodiment system and is not intended to be limiting.

Users may use client computing devices 1902, 1904, 1906, and/or 1908 to provide requirements information to server 1912 and to receive information (e.g., mappings information) from server 1912 in accordance with the teachings of this disclosure. A client device may provide an interface that enables a user of the client device to interact with the client device. The client device may also output information to the user via this interface. Although FIG. 19 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®) personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1910 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization such as one or more flexible pools of logical storage devices that can be virtualized to maintain virtual storage devices for the server. In various embodiments, server 1912 may be adapted to run one or more services or software applications that provide the functionality described in the foregoing disclosure.

The computing systems in server 1912 may run one or more operating systems including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more data repositories 1914, 1916. These data repositories may be used to store data and other information in certain embodiments. For example, one or more of the data repositories 1914, 1916 may be used to store information such as requirements information for one or more applications, mappings information, and other information used by or generated by server 1912. Data repositories 1914, 1916 may reside in a variety of locations. For example, a data repository used by server 1912 may be local to server 1912 or may be remote from server 1912 and in communication with server 1912 via a network-based or dedicated connection. Data repositories 1914, 1916 may be of different types. In certain embodiments, a data repository used by server 1912 may be a database, for example, a relational database, such as databases provided by Oracle Corporation® and other vendors. One or more of these databases may be adapted to enable storage, update, and retrieval of data to and from the database in response to SQL-formatted commands. The data repositories used by applications may be of different types such as, for example, a key-value store repository, an object store repository, or a general storage repository supported by a file system.

Figure 20:
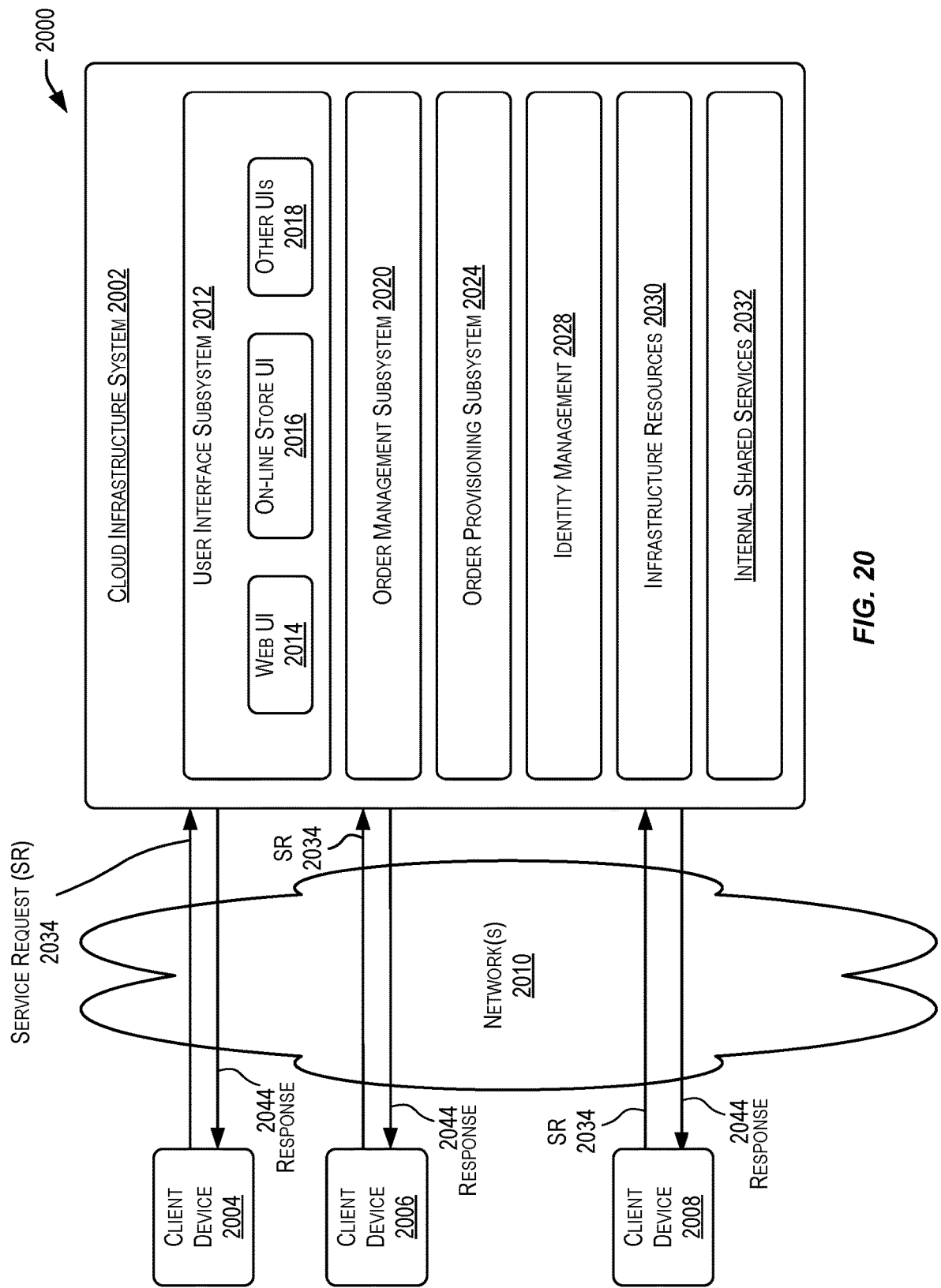
FIG. 20 is a simplified block diagram of a cloud-based system environment in which various services may be offered as cloud services, in accordance with certain embodiments.

In certain embodiments, the features described in this disclosure may be offered as services via a cloud environment. FIG. 20 is a simplified block diagram of a cloud-based system environment in which various services may be offered as cloud services, in accordance with certain embodiments. In the embodiment depicted in FIG. 20, cloud infrastructure system 2002 may provide one or more cloud services that may be requested by users using one or more client computing devices 2004, 2006, and 2008. Cloud infrastructure system 2002 may comprise one or more computers and/or servers that may include those described above for server 1912. The computers in cloud infrastructure system 2002 may be organized as general purpose computers, specialized server computers, server farms, server clusters, or any other appropriate arrangement and/or combination.

Network(s) 2010 may facilitate communication and exchange of data between clients 2004, 2006, and 2008 and cloud infrastructure system 2002. Networks(s) 2010 may include one or more networks. The networks may be of the same or different types. Networks(s) 2010 may support one or more communication protocols, including wired and/or wireless protocols, for facilitating the communications.

The embodiment depicted in FIG. 20 is only one example of a cloud infrastructure system and is not intended to be limiting. It should be appreciated that, in some other embodiments, cloud infrastructure system 2002 may have more or fewer components than those depicted in FIG. 20, may combine two or more components, or may have a different configuration or arrangement of components. For example, although FIG. 20 depicts three client computing devices, any number of client computing devices may be supported in alternative embodiments.

The term cloud service is generally used to refer to a service that is made available to users on demand and via a communication network such as the Internet by systems (e.g., cloud infrastructure system 2002) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 2002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others. In certain embodiments, the ability to automatically generate a functioning application from requirements information for the application may be provided as a service under the SaaS model.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2002. Cloud infrastructure system 2002 then performs processing to provide the services requested in the customer's subscription order. For example, a user may provide requirements information for an application to the cloud infrastructure system and request the cloud infrastructure system to automatically generate a functioning application from the requirements information, including automatically generating mappings between user interface components of the application and data objects, as described above. Cloud infrastructure system 2002 may be configured to provide one or even multiple cloud services.

Cloud infrastructure system 2002 may provide the cloud services via different deployment models. In a public cloud model, cloud infrastructure system 2002 may be owned by a third party cloud services provider and the cloud services are offered to any general public customer, where the customer can be an individual or an enterprise. In certain other embodiments, under a private cloud model, cloud infrastructure system 2002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 2002 and the services provided may be shared by several organizations in a related community. Various other models such as hybrids of the above mentioned models may also be used.

Client computing devices 2004, 2006, and 2008 may be of different types (such as devices 1902, 1904, 1906, and 1908 depicted in FIG. 19) and may be capable of operating one or more client applications. A user may use a client device to interact with cloud infrastructure system 2002, such as to request a service provided by cloud infrastructure system 2002. For example, a user may use a client device to provide requirements information for an application to cloud infrastructure system 2002 and request the cloud infrastructure system to automatically generate a functioning application from the requirements information, including automatically generating mappings between user interface components of the application and data objects, as described in this disclosure.

In some embodiments, the processing performed by cloud infrastructure system 2002 for providing the requested services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 20, cloud infrastructure system 2002 may include infrastructure resources 2030 that are utilized for facilitating the provision of various cloud services offered by cloud infrastructure system 2002. Infrastructure resources 2030 may include, for example, processing resources, storage or memory resources, networking resources, and the like.

In certain embodiments, to facilitate efficient provisioning of these resources for supporting the various cloud services provided by cloud infrastructure system 2002 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2002 may itself internally use services 2032 that are shared by different components of cloud infrastructure system 2002 and which facilitate the provisioning of services by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2002 may comprise multiple subsystems. These subsystems may be implemented in software, or hardware, or combinations thereof. As depicted in FIG. 20, the subsystems may include a user interface subsystem 2012 that enables users or customers of cloud infrastructure system 2002 to interact with cloud infrastructure system 2002. User interface subsystem 2012 may include various different interfaces such as a web interface 2014, an online store interface 2016 where cloud services provided by cloud infrastructure system 2002 are advertised and are purchasable by a consumer, and other interfaces 2018. For example, a customer may, using a client device, request (service request 2034) one or more services provided by cloud infrastructure system 2002 by placing subscription orders using one or more of interfaces 2014, 2016, and 2018. These interfaces may include, for example, an on-line store user interface 2016 that a customer to access and browse an online store identifying cloud services offered by cloud infrastructure system 2002 and place subscription orders for one or more of the offered services that the customer wishes to subscribe to. Other interfaces may include a web interface 2014, and other interfaces 2018.

In certain embodiments, a service request or a subscription request may include information identifying the requesting user or customer and one or more services that the customer desires to subscribe to. For example, a customer may place a subscription order for an automated application generation service offered by cloud infrastructure system 2002.

In certain embodiments, such as the embodiment depicted in FIG. 20, cloud infrastructure system 2002 may comprise an order management subsystem (OMS) 2020 that is configured to process new subscription orders. As part of this processing, OMS 2020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2020 may then invoke the order provisioning subsystem (OPS) 2024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 2002 may send a response or notification 2044 to the requesting customer to indicate when the requested service is now ready for use. In some instances, information (e.g., a link) may be sent to the customer that enables the customer to start using and availing the benefits of the requested services.

Cloud infrastructure system 2002 may provide services to multiple customers. For each customer, cloud infrastructure system 2002 is responsible for managing information related to one or more subscription orders received from the customer, maintaining customer data related to the orders, and providing the requested services to the customer. Cloud infrastructure system 2002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2002 may provide services to multiple customers in parallel. Cloud infrastructure system 2002 may store information for these customers, including possibly proprietary information. In certain embodiments, cloud infrastructure system 2002 comprises an identity management subsystem (IMS) 2028 that is configured to manage customers' information and provide the separation of the managed information such that information related to one customer is not accessible to or intermixed with information for another customer. IMS 2028 may be configured to provide various security-related services such as identity services, such as information access management, authentication and authorization services, services for managing customer identities and roles and related capabilities, and the like.

Figure 21:
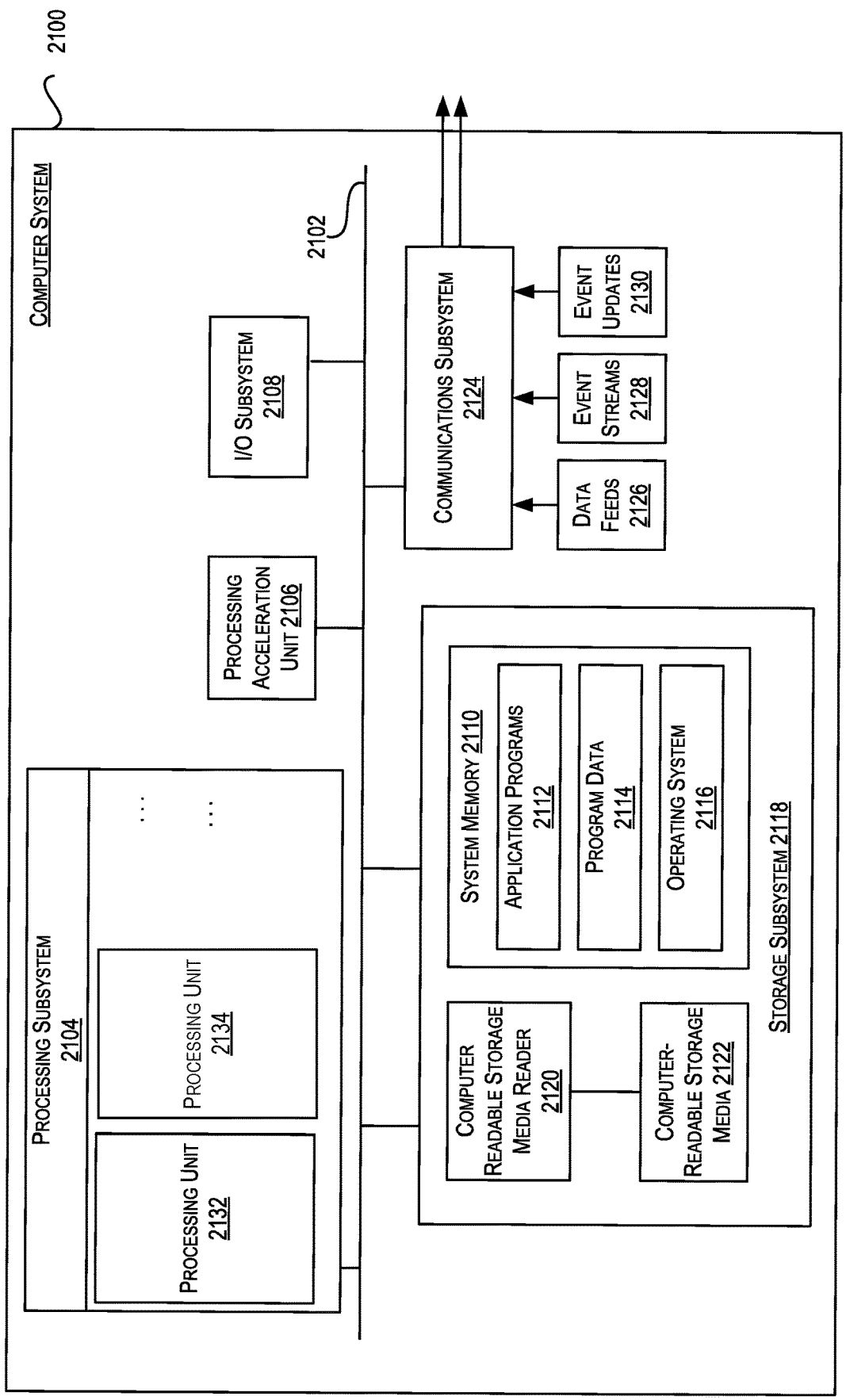
FIG. 21 illustrates an exemplary computer system 2100 that may be used to implement certain embodiments.

FIG. 21 illustrates an exemplary computer system 2100 that may be used to implement certain embodiments. For example, in some embodiments, computer system 2100 may be used to implement any of the various servers and computer systems described above, such as model generation system 102 depicted in FIG. 1. As shown in FIG. 21, computer system 2100 includes various subsystems including a processing subsystem 2104 that communicates with a number of other subsystems via a bus subsystem 2102. These other subsystems may include a processing acceleration unit 2106, an I/O subsystem 2108, a storage subsystem 2118, and a communications subsystem 2124. Storage subsystem 2118 may include non-transitory computer-readable storage media including storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2104 controls the operation of computer system 2100 and may comprise one or more processors, application specific integrated circuits (ASICs), or field programmable gate arrays (FPGAs). The processors may include be single core or multicore processors. The processing resources of computer system 2100 can be organized into one or more processing units 2132, 2134, etc. A processing unit may include one or more processors, one or more cores from the same or different processors, a combination of cores and processors, or other combinations of cores and processors. In some embodiments, processing subsystem 2104 can include one or more special purpose co-processors such as graphics processors, digital signal processors (DSPs), or the like. In some embodiments, some or all of the processing units of processing subsystem 2104 can be implemented using customized circuits, such as application specific integrated circuits (ASICs), or field programmable gate arrays (FPGAs).

In some embodiments, the processing units in processing subsystem 2104 can execute instructions stored in system memory 2110 or on computer readable storage media 2122. In various embodiments, the processing units can execute a variety of programs or code instructions and can maintain multiple concurrently executing programs or processes. At any given time, some or all of the program code to be executed can be resident in system memory 2110 and/or on computer-readable storage media 2122 including potentially on one or more storage devices. Through suitable programming, processing subsystem 2104 can provide various functionalities described above. In instances where computer system 2100 is executing one or more virtual machines, one or more processing units may be allocated to each virtual machine.

In certain embodiments, a processing acceleration unit 2106 may optionally be provided for performing customized processing or for off-loading some of the processing performed by processing subsystem 2104 so as to accelerate the overall processing performed by computer system 2100.

I/O subsystem 2108 may include devices and mechanisms for inputting information to computer system 2100 and/or for outputting information from or via computer system 2100. In general, use of the term input device is intended to include all possible types of devices and mechanisms for inputting information to computer system 2100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2118 provides a repository or data store for storing information and data that is used by computer system 2100. Storage subsystem 2118 provides an example of a tangible non-transitory computer-readable storage medium for storing the basic programming and data constructs that provide the functionality of some embodiments. Storage subsystem 2118 may store software (e.g., programs, code modules, instructions) that when executed by processing subsystem 2104 provides the functionality described above. The software may be executed by one or more processing units of processing subsystem 2104. Storage subsystem 2118 may also provide a repository for storing data used in accordance with the teachings of this disclosure.

Storage subsystem 2118 may include one or more non-transitory memory devices, including volatile and non-volatile memory devices. As shown in FIG. 21, storage subsystem 2118 includes a system memory 2110 and a computer-readable storage media 2122. System memory 2110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2100, such as during start-up, may typically be stored in the ROM. The RAM typically contains data and/or program modules that are presently being operated and executed by processing subsystem 2104. In some implementations, system memory 2110 may include multiple different types of memory, such as static random access memory (SRAM), dynamic random access memory (DRAM), and the like.

By way of example, and not limitation, as depicted in FIG. 21, system memory 2110 may load application programs 2112 that are being executed, which may include various applications such as Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS®, Windows® Phone, Android® OS, BlackBerry® OS, Palm® OS operating systems, and others.

Computer-readable storage media 2122 may store programming and data constructs that provide the functionality of some embodiments. Computer-readable media 2122 may provide storage of computer-readable instructions, data structures, program modules, and other data for computer system 2100. Software (programs, code modules, instructions) that, when executed by processing subsystem 2104 provides the functionality described above, may be stored in storage subsystem 2118. By way of example, computer-readable storage media 2122 may include non-volatile memory such as a hard disk drive, a magnetic disk drive, an optical disk drive such as a CD ROM, DVD, a Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 2118 may also include a computer-readable storage media reader 2120 that can further be connected to computer-readable storage media 2122. Reader 2120 may receive and be configured to read data from a memory device such as a disk, a flash drive, etc.

In certain embodiments, computer system 2100 may support virtualization technologies, including but not limited to virtualization of processing and memory resources. For example, computer system 2100 may provide support for executing one or more virtual machines. In certain embodiments, computer system 2100 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2100. Accordingly, multiple operating systems may potentially be run concurrently by computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to establish a communication channel to one or more client devices via the Internet for receiving and sending information from and to the client devices.

Communication subsystem 2124 may support both wired and/or wireless communication protocols. For example, in certain embodiments, communications subsystem 2124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

Communication subsystem 2124 can receive and transmit data in various forms. For example, in some embodiments, in addition to other forms, communications subsystem 2124 may receive input communications in the form of structured and/or unstructured data feeds 2126, event streams 2128, event updates 2130, and the like. For example, communications subsystem 2124 may be configured to receive (or send) data feeds 2126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2124 may be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 2124 may also be configured to communicate data from computer system 2100 to other computer systems or networks. The data may be communicated in various different forms such as structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2100 depicted in FIG. 21 is intended only as a specific example. Many other configurations having more or fewer components than the system depicted in FIG. 3 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   accessing, by a computer system, a plurality of data objects each including a set of data object components, the sets of data object components each including a set of data fields containing object data or values to be displayed;
   accessing, by the computer system, requirements information for an application, the requirements information comprising an image of a GUI screen for the application, the requirements information further comprising text information;
   determining, by the computer system based upon the requirements information, a set of components included in the GUI screen, the set of components included in the GUI screen including a first component;
   identifying, by the computer system based upon the requirements information and from the plurality of data objects, a first data object to be mapped to the GUI screen, the identifying including:
      extracting a first text token from the image of the GUI screen; and
      identifying the first data object by searching, using the first text token, the sets of data object components of the plurality of data objects;
   wherein the first component includes a second text token extracted from the image of the GUI screen;
   determining, by the computer system based upon the requirements information, a mapping between the first component from the set of components and a first data object component in the set of data object components of the first data object comprising:
      determining that the second text token is a static component;
      searching the set of data object components of the first data object using the second text token; and
      identifying the first data object component based upon the searching the set of data object components of the first data object using the second text token; and
   generating, by the computer system, an application model comprising information indicative of the GUI screen, the set of components, information identifying a mapping between the first data object and the GUI screen, and information identifying the mapping between the first data object component and the first component, wherein the application model enables one or more implementations of the application to be generated wherein the one or more implementations includes displaying the object data or values of the first data object.

2. The method of claim 1 further comprising generating a set of the one or more implementations of the application using the application model.

3. The method of claim 2 wherein generating the set of the one or more implementations of the application using the application model comprises: using the application model to generate a first implementation of the application for a first platform; and using the application model to generate a second implementation of the application for a second platform, wherein the second platform is different from the first platform.

4. The method of claim 1 further comprising, based upon the requirements information, determining a functionality category for the GUI screen.

5. The method of claim 4 wherein determining the functionality category comprises determining, based upon requirements information, whether the GUI screen comprises a GUI component used for displaying a list of values.

6. The method of claim 4 wherein determining the functionality category comprises determining, based upon the requirements information, whether the GUI screen comprises a plurality of GUI components used for entering or editing values.

7. The method of claim 1 wherein identifying the first data object further comprises: determining that the first text token is a static component.

8. The method of claim 7 wherein determining that the first text token is a static component comprises performing at least one of named entity recognition processing or part of speech tagging on the first text token.

9. The method of claim 1 wherein the searching comprises: for each data object in the plurality of data objects, determining whether identification information for the data object fully or partially matches the first text token.

10. The method of claim 1 wherein: determining the set of components included in the GUI screen comprises segmenting the image into a plurality of segments, the plurality of segments including a header segment of the GUI screen; and the first text token is a title extracted from the header segment.

11. The method of claim 1 wherein:
the set of components comprises a third text token;
the first component includes a fourth text token extracted from the image; and
determining the mapping between the first component and the first data object component comprises:
determining that the fourth text token is a dynamic component;
determining that the fourth text token is associated with the third text token;
determining that the third text token is a static component;
searching the set of data object components of the first data object using the third text token; and
identifying the first data object component based upon the searching of the set of data object components of the first data object using the third text token.

12. The method of claim 1 wherein:
the first component from the set of components includes a third text token;
determining the set of components in the GUI screen comprises:
segmenting the image into a plurality of segments, the plurality of segments including a header segment of the GUI screen and a body segment of the GUI screen;
extracting the first text token from the header segment; and extracting the third text token from the body segment; and
determining the mapping between the first component from the set of components and the first data object component comprises:
searching the set of data object components of the first data object using the third text token; and
identifying the first data object component based upon the searching of the set of data object components of the first data object using the third text token.

13. The method of claim 1 further comprising: determining, by the computer system based upon the requirements information, that a new data object is to be created for the GUI screen.

14. The method of claim 1 further comprising: determining, by the computer system based upon the requirements information, that a second data object from the plurality of data objects is to be mapped to the GUI screen.

15. The method of claim 1, wherein the plurality of data objects each includes an account, activity, asset competitor, contact, deal registration, opportunity, order, partner, product, or resource object that includes the set of data fields containing object data.

16. A non-transitory computer readable medium storing a plurality of instructions executable by one or more processors, wherein the plurality of instructions when executed by the one or more processors cause the one or more processors to perform processing comprising:
accessing a plurality of data objects each including a set of data object components, the sets of data object components each including a set of data fields containing object data or values to be displayed on a GUI screen;
accessing requirements information for an application, the requirements information comprising an image of a GUI screen for the application, the requirements information further comprising text information;
determining, based upon the requirements information, a set of components included in the GUI screen, the set of components included in the GUI screen including a first component;
identifying, based upon the requirements information and from the plurality of data objects, a first data object to be mapped to the GUI screen, the identifying including:
extracting a first text token from the image of the GUI screen; and
identifying the first data object by searching, using the first text token, the sets of data object components of the plurality of data objects;
wherein the first component includes a second text token extracted from the image of the GUI screen;
determining, based upon the requirements information, a mapping between the first component from the set of components and a first data object component in the set of data object components of the first data object comprising:
determining that the second text token is a static component;
searching the set of data object components of the first data object using the second text token; and
identifying the first data object component based upon the searching the set of data object components of the first data object using the second text token; and
generating an application model comprising information indicative of the GUI screen, the set of components, information identifying a mapping between the first data object and the GUI screen, and information identifying the mapping between the first data object component and the first component, wherein the application model enables an implementation of the application to be generated wherein the implementation includes displaying the object data or values of the first data object.

17. The non-transitory computer readable medium of claim 16 wherein: the first component from the set of components includes a third text token;
determining the set of components in the GUI screen comprises:
segmenting the image into a plurality of segments, the plurality of segments including a header segment of the GUI screen and a body segment of the GUI screen; and
extracting the first text token from the header segment; and
extracting the third text token from the body segment; and determining the mapping between the first component from the set of components and the first data object component comprises:
  searching the set of data object components of the first data object using the third text token; and
  identifying the first data object component based upon the searching of the set of data object components of the first data object using the third text token.

18. The non-transitory computer readable medium of claim 16 wherein the processing further comprises generating the implementation of the application using the application model.

19. A system comprising:
  one or more processors; and
  a memory coupled to the one or more processors, the memory storing requirements information for an application, the requirements information comprising an image of a GUI screen for the application;
  wherein the memory further stores a plurality of instructions, which when executed by the one or more processors, cause the system to:
    access a plurality of data objects each including a set of data object components, the sets of data object components each including a set of data fields containing object data or values to be displayed;
    determine, based upon the requirements information, a set of components included in the GUI screen, the set of components included in the GUI screen including a first component;
    identify, based upon the requirements information and from the plurality of data objects, a first data object to be mapped to the GUI screen by:
      extracting a first text token from the image of the GUI screen; and
      identifying the first data object by searching, using the first text token, the sets of data object components of the plurality of data objects;
    wherein the first component includes a second text token extracted from the image of the GUI screen;
    determine, based upon the requirements information, a mapping between the first component from the set of components and a first data object component in the set of data object components of the first data object comprising:
      determining that the second text token is a static component;
      searching the set of data object components of the first data object using the second text token; and
      identifying the first data object component based upon the searching the set of data object components of the first data object using the second text token; and
    generate an application model comprising information indicative of the GUI screen, the set of components, information identifying a mapping between the first data object and the GUI screen, and information identifying the mapping between the first data object component and the first component, wherein the application model enables an implementation of the application to be generated wherein the implementation includes displaying the object data or values of the first data object.

* * * * *

UNITED STATES PATENT AND TRADEMARK OFFICE
CERTIFICATE OF CORRECTION

| | | |
|---|---|---|
| PATENT NO. | : 10,838,699 B2 | Page 1 of 1 |
| APPLICATION NO. | : 15/801890 | |
| DATED | : November 17, 2020 | |
| INVENTOR(S) | : Dayanandan | |

It is certified that error appears in the above-identified patent and that said Letters Patent is hereby corrected as shown below:

In the Specification

In Column 13, Line 51, after "implementation.", delete "The implementation".

In Column 28, Line 63, delete "identified._In" and insert -- identified. In --, therefor.

In Column 50, Line 1, delete "NUMBER_OF_DAYS)" and insert -- (NUMBER_OF_DAYS) --, therefor.

In Column 52, Line 56, delete "17th" and insert -- $17^{th}$ --, therefor.

In Column 56, Line 30, delete "January" and insert -- January. --, therefor.

In Column 60, Line 2, after "components.", delete "The model may be".

In Column 61, Line 8, delete "iPad®)" and insert -- iPad®), --, therefor.

In Column 62, Line 53, delete "Networks(s)" and insert -- Network(s) --, therefor.

In Column 62, Line 55, delete "Networks(s)" and insert -- Network(s) --, therefor.

In Column 65, Line 35, delete "on-line" and insert -- online --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*